US012695537B2

(12) United States Patent
Rastegardoost et al.

(10) Patent No.: US 12,695,537 B2
(45) Date of Patent: Jul. 28, 2026

(54) SCHEDULING RANDOM ACCESS RESPONSE FOR REDUCED CAPABILITY DEVICE

(71) Applicant: Ofinno, LLC, Reston, VA (US)

(72) Inventors: Nazanin Rastegardoost, McLean, VA (US); Esmael Hejazi Dinan, McLean, VA (US); Yunjung Yi, Vienna, VA (US); Hua Zhou, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 402 days.

(21) Appl. No.: 18/210,927

(22) Filed: Jun. 16, 2023

(65) Prior Publication Data

US 2024/0031056 A1      Jan. 25, 2024

Related U.S. Application Data

(63) Continuation of application No. PCT/US2021/064698, filed on Dec. 21, 2021.

(Continued)

(51) Int. Cl.
*H04L 1/00*      (2006.01)
*H04W 74/00*      (2009.01)
(Continued)

(52) U.S. Cl.
CPC ......... *H04L 1/0007* (2013.01); *H04W 74/006* (2013.01); *H04W 74/0833* (2013.01); *H04W 74/0836* (2024.01); *H04W 74/0838* (2024.01)

(58) Field of Classification Search
CPC ... H04L 1/0007; H04L 1/1671; H04L 1/0003; H04L 1/0031; H04W 74/006;
(Continued)

(56) References Cited

U.S. PATENT DOCUMENTS 10,291,378 B1 *  5/2019  Bai ....................... H04W 68/02
10,631,340 B2   4/2020  Shao et al.
(Continued)

FOREIGN PATENT DOCUMENTS

EP          3100536 B1    11/2020
WO     2012177060 A2    12/2012
(Continued)

OTHER PUBLICATIONS

3GPP TS 36.321 V16.0.0 (Mar. 2020); Technical Specification; 3rd Generation Partnership Project; Technical Specification Group Radio Access Network; Evolved Universal Terrestrial Radio Access (E-UTRA); Medium Access Control (MAC) protocol specification; (Release 16).
(Continued)

*Primary Examiner* — Abdullahi Ahmed
(74) *Attorney, Agent, or Firm* — Brett K. Gardner; Kavon Nasabzadeh; Jacob L. Mangan

(57) ABSTRACT
A wireless device, having first features, receives at least one system information block (SIB) indicating random access resources for wireless devices having the first features. The random access resources are associated with a first set of transport block (TB) scaling factors among a plurality of sets of TB scaling factors. In response to transmission of a preamble indicated by the random access resources, a down-link control information (DCI) is received that indicates reception of a TB including a response to the preamble. The DCI includes a first field for scaling the TB. Based on the first scaling field and the wireless device having the first features, a TB scaling factor is determined from the first set of TB scaling factors. The TB is received based on the TB scaling factor.

20 Claims, 26 Drawing Sheets

100

Related U.S. Application Data

(60) Provisional application No. 63/128,267, filed on Dec. 21, 2020.

(51) Int. Cl.
    *H04W 74/0833*    (2024.01)
    *H04W 74/0836*    (2024.01)
    *H04W 74/0838*    (2024.01)

(58) Field of Classification Search
    CPC ......... H04W 74/0833; H04W 74/0836; H04W 74/0838; H04W 72/23; H04W 72/51
    See application file for complete search history.

(56) References Cited

U.S. PATENT DOCUMENTS

| | | | |
|---|---|---|---|
| 10,856,308 | B2 | 12/2020 | Lin et al. |
| 2019/0141742 | A1 | 5/2019 | Zhou et al. |
| 2019/0223160 | A1 | 7/2019 | He et al. |
| 2019/0312708 | A1* | 10/2019 | Bai ....................... H04W 68/02 |
| 2022/0232638 | A1* | 7/2022 | Zhang ............... H04W 74/0836 |
| 2023/0269778 | A1* | 8/2023 | Dai ....................... H04W 74/04 |
| | | | 370/329 |
| 2023/0421310 | A1* | 12/2023 | Ying ..................... H04W 72/51 |
| 2025/0119249 | A1* | 4/2025 | Zhao ..................... H04L 5/0044 |

FOREIGN PATENT DOCUMENTS

| | | |
|---|---|---|
| WO | 2015139318 A1 | 9/2015 |
| WO | 2018175809 A1 | 9/2018 |
| WO | 2020192700 A1 | 10/2020 |

OTHER PUBLICATIONS

3GPP TS 36.331 V16.0.0 (Mar. 2020); Technical Specification; 3rd Generation Partnership Project; Technical Specification Group Radio Access Network; Evolved Universal Terrestrial Radio Access (E-UTRA); Radio Resource Control (RRC); Protocol specification; (Release 16).

3GPP TS 38.211 V16.3.0 (Sep. 2020); Technical Specification; 3rd Generation Partnership Project; Technical Specification Group Radio Access Network; NR; Physical channels and modulation; (Release 16).

3GPP TS 38.212 V16.3.0 (Sep. 2020); Technical Specification; 3rd Generation Partnership Project; Technical Specification Group Radio Access Network; NR; Multiplexing and channel coding; (Release 16).

3GPP TS 38.213 V16.3.0 (Sep. 2020); Technical Specification; 3rd Generation Partnership Project; Technical Specification Group Radio Access Network; NR; Physical layer procedures for control; (Release 16).

3GPP TS 38.214 V16.3.0 (Sep. 2020); Technical Specification; 3rd Generation Partnership Project; Technical Specification Group Radio Access Network; NR; Physical layer procedures for data; (Release 16).

3GPP TS 38.321 V16.2.1 (Sep. 2020); Technical Specification; 3rd Generation Partnership Project; Technical Specification Group Radio Access Network; NR; Medium Access Control (MAC) protocol specification; (Release 16).

3GPP TS 38.331 V16.2.0 (Sep. 2020); Technical Specification; 3rd Generation Partnership Project; Technical Specification Group Radio Access Network; NR; Radio Resource Control (RRC) protocol specification; (Release 16).

R1-2007533; 3GPP TSG-RAN WG1 Meeting #103-e; e-Meeting, Oct. 26-Nov. 13, 2020; Agenda Item: 3.6.5; Source: Ericsson; Title: UE identification and access restriction for RedCap; Document for: Discussion, Decision.

R1-2007672; 3GPP TSG RAN WG1 #103-e; e-Meeting, Oct. 26-Nov. 13, 2020; Source: vivo, Guangdong Genius; Title: RRM relaxation for Reduced Capability NR devices; Agenda Item: 8.6.5; Document for: Discussion and Decision.

R1-2007719; 3GPP TSG RAN WG1 #103-e; e-Meeting, Oct. 26-Nov. 13, 2020; Source: ZTE; Title: Access control and identification for Reduced Capability NR devices; Agenda item: 8.6.5; Document for: Discussion and Decision.

R1-2007951; 3GPP TSG RAN WG1 Meeting #103-E; e-Meeting, Oct. 26-Nov. 13, 2020; Agenda Item: 8.6.5; Source: Intel Corporation; Title: On identification of and access control for RedCap UEs; Document for: Discussion/Decision.

R1-2008052; 3GPP TSG RAN WG1 Meeting #103-e; Online, Oct. 26-Nov. 13, 2020; Agenda Item: 8.6.5; Source: LG Electronics Inc.; Title: Other aspects for reduced capability NR devices; Document for: Discussion and decision.

R1-20008072; 3GPP TSG-RAN WG1 Meeting #103-e; e-Meeting, Oct. 26-Nov. 13; Agenda item: 8.6.5; Title: Initial access for REDCAP UEs; Source: Nokia, Nokia Shanghai Bell; Document for: Discussion and Decision.

R1-2008174; 3GPP TSG RAN WG1 #103-e; e-Meeting, Oct. 26-Nov. 13, 2020; Agenda Item: 8.6.5; Source: Samsung; Title: UE identification and access barring; Document for: Discussion and decision.

R1-2008183; 3GPP TSG RAN WG1 #103-e; e-Meeting, Oct. 26-Nov. 13, 2020; Agenda Item: 8.8.2.3; Source: Samsung; Title: Coverage enhancement for channels other than PUSCH and PUCCH; Document for: Discussion.

R1-2008264; 3GPP TSG RAN WG1 #103-e; e-Meeting, Oct. 26-Nov. 13, 2020; Source: OPPO; Title: Other considerations for reduced UE capability; Agenda Item: 8.6.5; Document for: Discussion.

R1-2008291; 3GPP TSG RAN WG1 Meeting #103-e; e-Meeting, , Oct. 26-Nov. 6, 2020; Source: Panasonic; Title: On RedCap device identification; Agenda item: 8.6.5; Document for: Internal Discussion.

R1-2008329; 3GPP TSG RAN WG1 Meeting #103-e; E-meeting, Oct. 26-Nov. 13, 2020; Agenda Item: 8.6.5; Source: Huawei, HiSilicon; Title: Other aspects for reduced capability devices; Document for: Discussion and Decision.

R1-2008556; 3GPP TSG RAN WG1 #103-e; e-Meeting, Oct. 26-Nov. 13, 2020; Source: NTT DOCOMO, Inc.; Title: Discussion on UE identification for RedCap; Agenda Item: 8.6.5; Document for: Discussion and Decision.

R1-2008585; 3GPP TSG RAN WG1 #103-e; e-Meeting, Oct. 26-Nov. 13, 2020; Agenda Item: 8.6.5; Source: ASUSTek; Title: Discussion on identification of reduced capability UE; Document for: Discussion and Decision.

R1-2008688; 3GPP TSG RAN WG1 #103-e; e-Meeting, Oct. 26-Nov. 13, 2020; Agenda Item: 8.6.5; Source: InterDigital, Inc.; Title: Device identification and access restriction for RedCap; Document for: Discussion.

R1-2009317; 3GPP TSG RAN WG1 Meeting #103-E; e-Meeting, Oct. 26-Nov. 13, 2020; Source: Moderator (Intel Corporation); Title: Moderator summary on RedCap—Others; Agenda item: 8.6. 5; Document for: Discussion and Decision.

R1-2009322; 3GPP TSG RAN WG1 #103-e; e-Meeting, Oct. 26-Nov. 13, 2020; Agenda item: 8.8.2.3; Title: Feature lead summary on coverage enhancement for channels other than PUSCH and PUCCH; Source: Moderator (ZTE Corporation); Document for: Discussion and Decision.

R1-2009404; 3GPP TSG RAN WG1 Meeting #103-E; e-Meeting, Oct. 26-Nov. 13, 2020; Source: Moderator (Intel Corporation); Title: Moderator summary #2 on RedCap—Others; Agenda item: 8.6.5; Document for: Discussion and Decision.

R1-2009608; 3GPP TSG RAN WG1 Meeting #103-E; e-Meeting, Oct. 26-Nov. 13, 2020; Source: Moderator (Intel Corporation); Title: Moderator summary #3 on RedCap—Others; Agenda item: 8.6.5; Document for: Discussion and Decision.

R1-2009735; 3GPP TSG RAN WG1 Meeting #103-E; e-Meeting, Oct. 26-Nov. 13, 2020; Source: Moderator (Intel Corporation); Title: Moderator summary #4 on RedCap—Others; Agenda item: 8.6.5; Document for: Discussion and Decision.

R1-2009771; 3GPP TSG RAN WG1 Meeting #103-E; e-Meeting, Oct. 26-Nov. 13, 2020; Source: Moderator (Intel Corporation);

(56) References Cited

OTHER PUBLICATIONS

Title: Moderator summary #5 on RedCap—Others; Agenda item: 8.6.5; Document for: Discussion and Decision.

R1-2009780; 3GPP Tsg Ran WG1 Meeting #103-E; e-Meeting, October 26th - Nov. 13, 2020; Source: Moderator (Intel Corporation); Title: Moderator summary #6 on RedCap - Others; Agenda item: 8.6.5; Document for: Discussion and Decision.

R2-1915607; 3GPP TSG-RAN WG2 #108; Reno, Nevada, USA, Nov. 18-22, 2019; Agenda Item: 6.13.2; Source: Ericsson; Title: RNTI design for 2-step RA; Document for: Discussion, Decision.

3GPP TSG RAN WG1 Meeting #103-e; e-Meeting, Oct. 26-Nov. 13, 2020; Title: RAN1 Chairman's Notes.

R2-2010702; 3GPP TSG-RAN WG2 Meeting #112 electronic; Online, Nov. 2-13, 2020; Agenda item: 10.2; Source: Vice Chairman (ZTE Corporation); Title: Report from Break-out session on R16 eMIMO, CLI, PRN, RACS and R17 NTN and REDCAP; Document for: Approval.

Rohde & Schwarz; Narrowband Internet of Things Whitepaper; Aug. 8, 2016.

R1-2006813; 3GPP TSG-RAN WG1 Meeting #102-e; e-Meeting, Aug. 17-28, 2020; Agenda item: 8.6.3; Source: Qualcomm Incorporated; Title: Coverage Recovery for RedCap Devices; Document for: Discussion/Decision.

R1-2100823; 3GPP TSG RAN WG1 #104-e; e-Meeting, Jan. 25-Feb. 5, 2021; Agenda Item: 8.6.1; Source: Spreadtrum Communications; Title: Discussion on UE complexity reduction features; Document for: Discussion and decision.

International Search Report and Written Opinion of the International Searching authority mailed May 12, 2022, in International Application No. PCT/US2021/064698.

3GPP TR 38.875 V1.0.0 (Dec. 2020); Technical Report; 3rd Generation Partnership Project; Technical Specification Group Radio Access Network; Study on support of reduced capability NR devices; (Release 17).

R1-2009310; 3GPP TSG-RAN WG1 Meeting #103-e; e-Meeting, Oct. 26-Nov. 13, 2020; Agenda item: 8.6.3; Source: Qualcomm Incorporated; Title: Coverage Recovery for RedCap Devices; Document for: Discussion/Decision.

* cited by examiner

Figure 3:
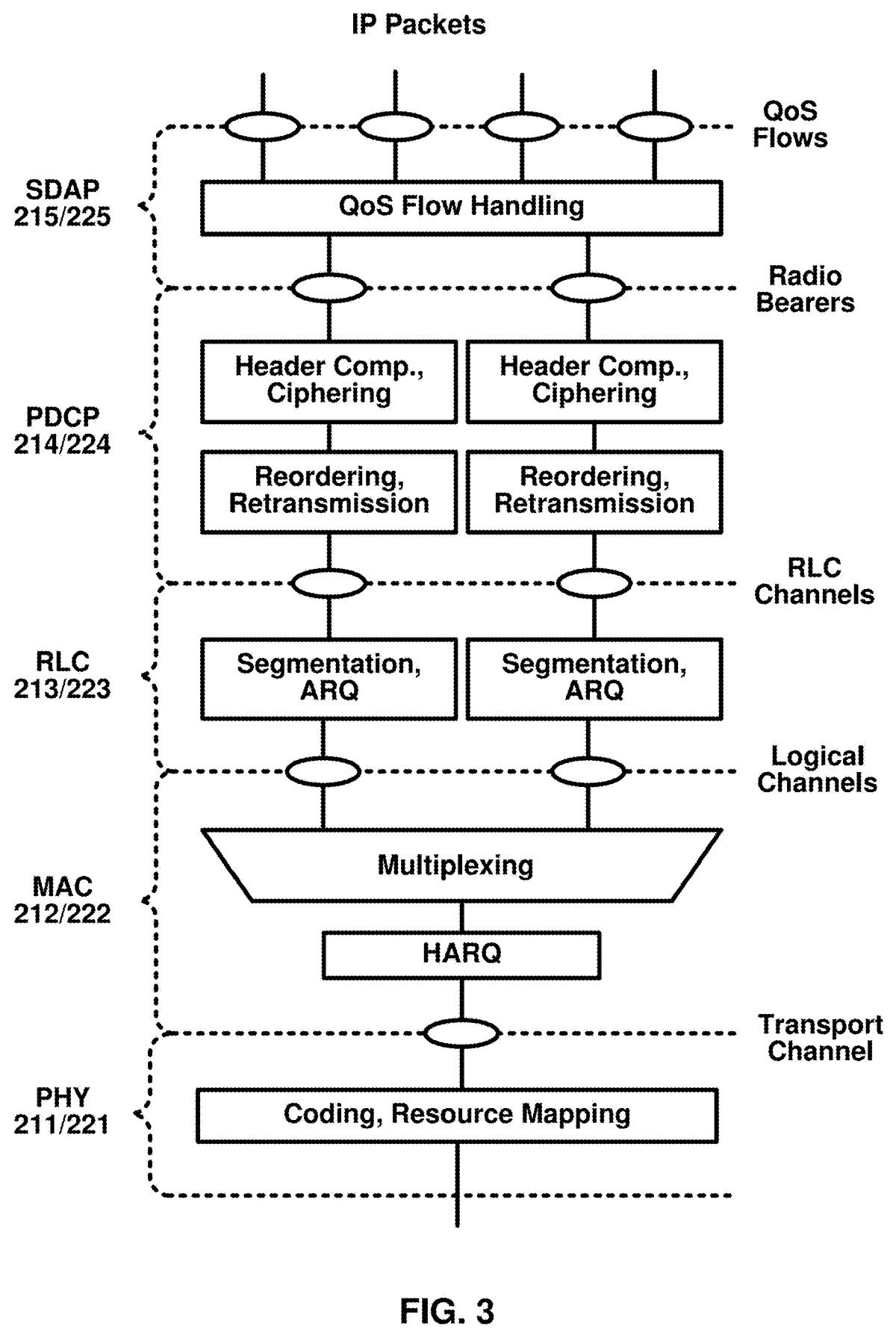

IP Packets

| | |
|---|---|
| SDAP 215/225 | QoS Flow Handling |

QoS Flows

Radio Bearers

PDCP 214/224
- Header Comp., Ciphering
- Reordering, Retransmission

RLC Channels

RLC 213/223
- Segmentation, ARQ

Logical Channels

MAC 212/222
- Multiplexing
- HARQ

Transport Channel

PHY 211/221
- Coding, Resource Mapping

Uplink

FIG. 5A

Downlink

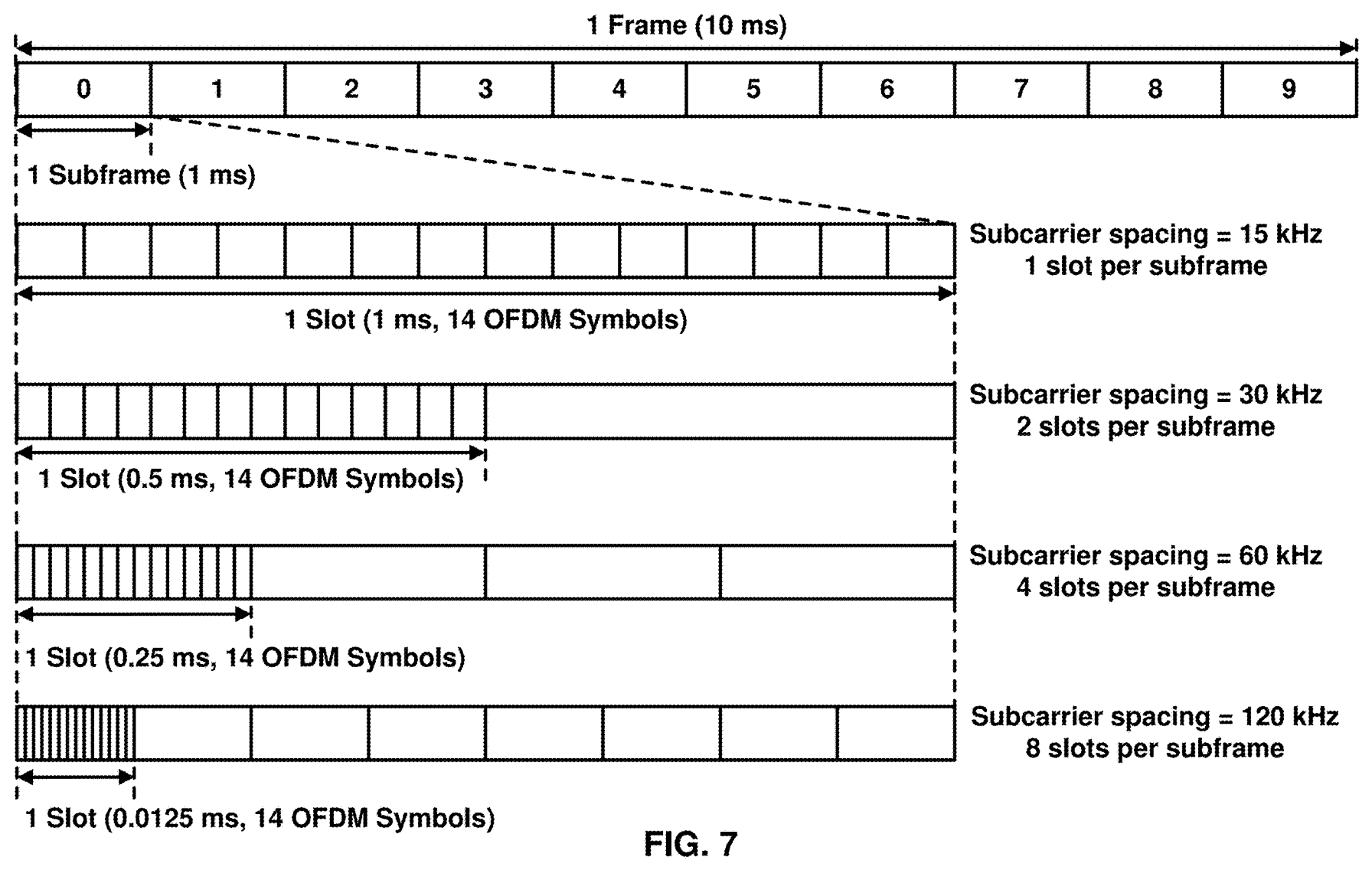

1 Frame (10 ms)

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

Component Carrier

Intraband, contiguous 1002

Freq. Band A    Freq. Band B

Intraband, non-contiguous 1004

Freq. Band A    Freq. Band B

Interband 1006

Freq. Band A    Freq. Band B

PUCCH Group 1010    PUCCH Group 1050

Downlink Component Carriers

PCell 1011    SCell 1012    SCell 1013    PSCell 1051    SCell 1052    SCell 1053

UCI 1032    UCI 1072

UCI 1031    UCI 1071

UCI 1033    UCI 1073

Uplink Component Carriers

PCell 1021    SCell 1022    SCell 1023    PSCell 1061    SCell 1062    SCell 1063

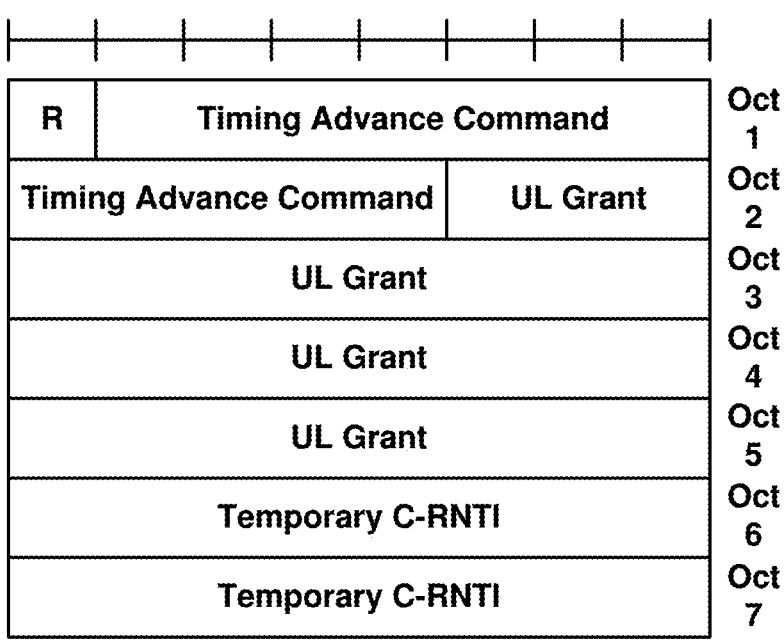

| R | Timing Advance Command | | Oct 1 |
| --- | --- | --- | --- |
| Timing Advance Command | | UL Grant | Oct 2 |
| UL Grant | | | Oct 3 |
| UL Grant | | | Oct 4 |
| UL Grant | | | Oct 5 |
| Temporary C-RNTI | | | Oct 6 |
| Temporary C-RNTI | | | Oct 7 |

FIG. 20A

| RAR grant field | Number of bits |
| --- | --- |
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

FIG. 20B

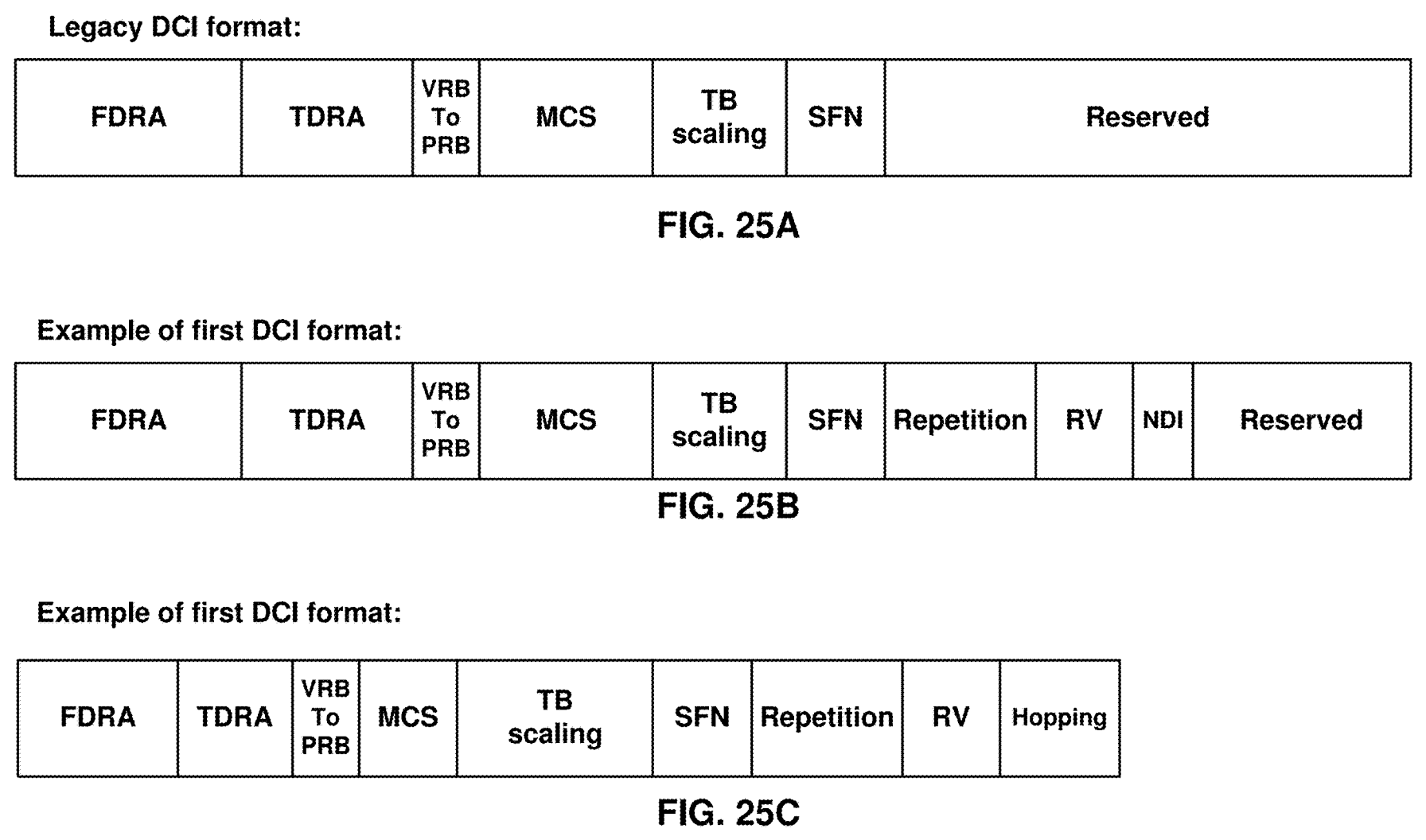

Legacy DCI format:

| FDRA | TDRA | VRB To PRB | MCS | TB scaling | SFN | Reserved |
|------|------|------------|-----|------------|-----|----------|

FIG. 25A

Example of first DCI format:

| FDRA | TDRA | VRB To PRB | MCS | TB scaling | SFN | Repetition | RV | NDI | Reserved |
|------|------|------------|-----|------------|-----|------------|-----|-----|----------|

FIG. 25B

Example of first DCI format:

| FDRA | TDRA | VRB To PRB | MCS | TB scaling | SFN | Repetition | RV | Hopping |
|------|------|------------|-----|------------|-----|------------|-----|---------|

FIG. 25C

DCI format, e.g., when the first parameter is not configured:

| FDRA | TDRA | VRB To PRB | MCS | TB scaling | SFN | Reserved |
|------|------|-----------|-----|-----------|-----|----------|

FIG. 26A

Example DCI format when the first parameter is configured:

| FDRA | TDRA | VRB To PRB | MCS | TB scaling | SFN | Repetition | RV | Reserved |
|------|------|-----------|-----|-----------|-----|-----------|-----|----------|

FIG. 26B

Example DCI format when the first parameter is configured:

| FDRA | TDRA | VRB To PRB | MCS | TB scaling | SFN | Repetition | RV | Hopping | Info-1 | Info-2 |
|------|------|-----------|-----|-----------|-----|-----------|-----|---------|--------|--------|

FIG. 26C

SCHEDULING RANDOM ACCESS RESPONSE FOR REDUCED CAPABILITY DEVICE

CROSS-REFERENCE TO RELATED APPLICATIONS

This application is a continuation of International Application No. PCT/US2021/064698, filed Dec. 21, 2021, which claims the benefit of U.S. Provisional Application No. 63/128,267, filed Dec. 21, 2020, all of which are hereby incorporated by reference in their entireties.

BRIEF DESCRIPTION OF THE DRAWINGS

Examples of several of the various embodiments of the present disclosure are described herein with reference to the drawings.

FIG. 3 illustrates an example of services provided between protocol layers of the NR user plane protocol stack of FIG. 2A.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

FIG. 20A shows an example of a MAC RAR, according to some embodiments.

FIG. 20B shows an example of random access response (RAR) uplink grant contents, according to some embodiments.

FIG. 25A shows an example of a DCI format, according to some embodiments.

FIG. 25B shows an example of a DCI format for a first-type UE, according to some embodiments.

FIG. 25C shows an example of a DCI format for a first-type UE, according to some embodiments.

FIG. 26A shows an example of a DCI format, according to some embodiments.

FIG. 26B shows an example of information fields of a DCI format for a first-type UE, according to some embodiments.

FIG. 26C shows an example of information fields of a DCI format for a first-type UE, according to some embodiments.

DETAILED DESCRIPTION

Figures 1A, 1B:
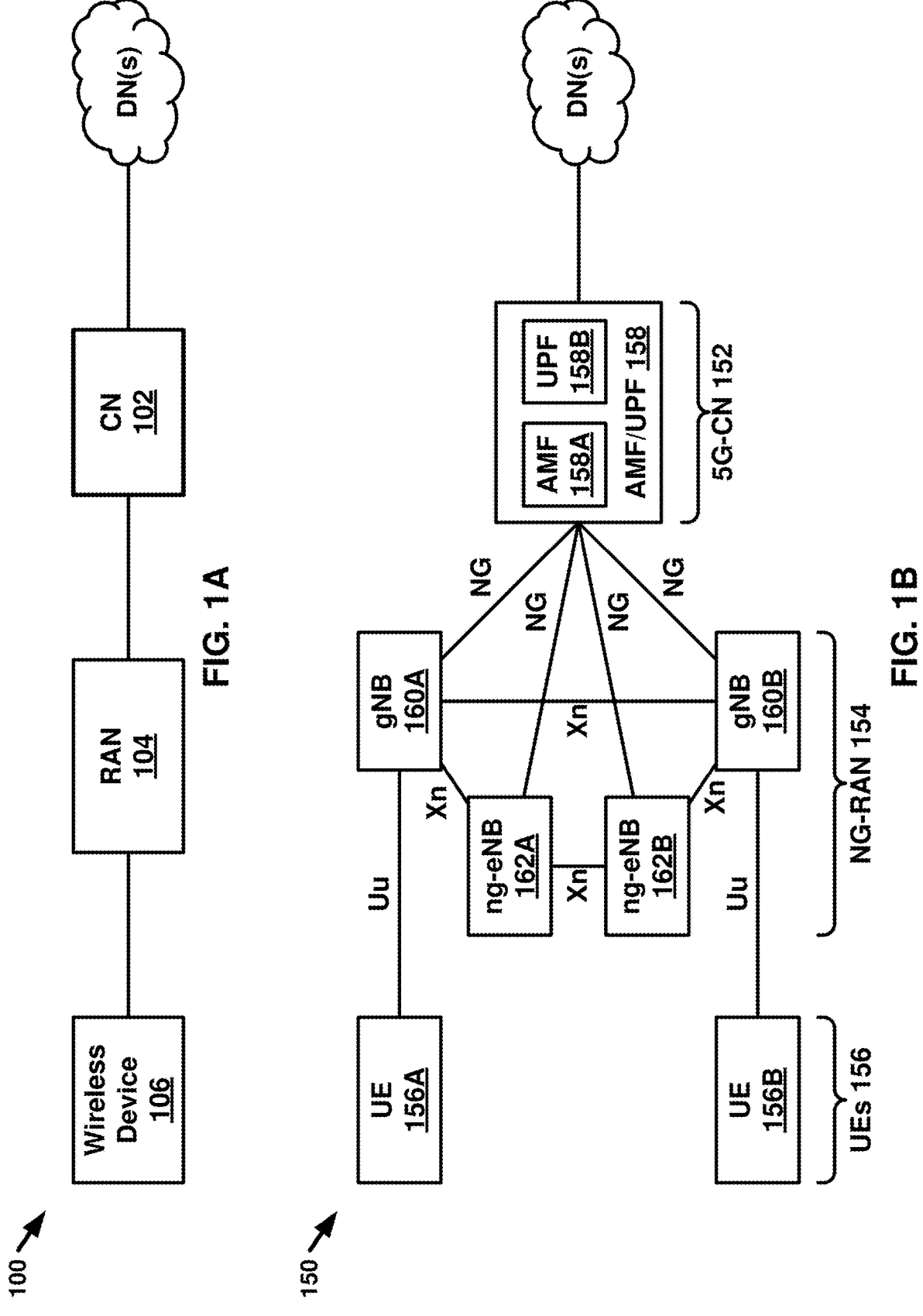
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNB s 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-GN 152 by means of an NG interface and to other base stations by an Xn interface. The NG and Xn interfaces may be established using direct physical connections and/or indirect connections over an underlying transport network, such as an Internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
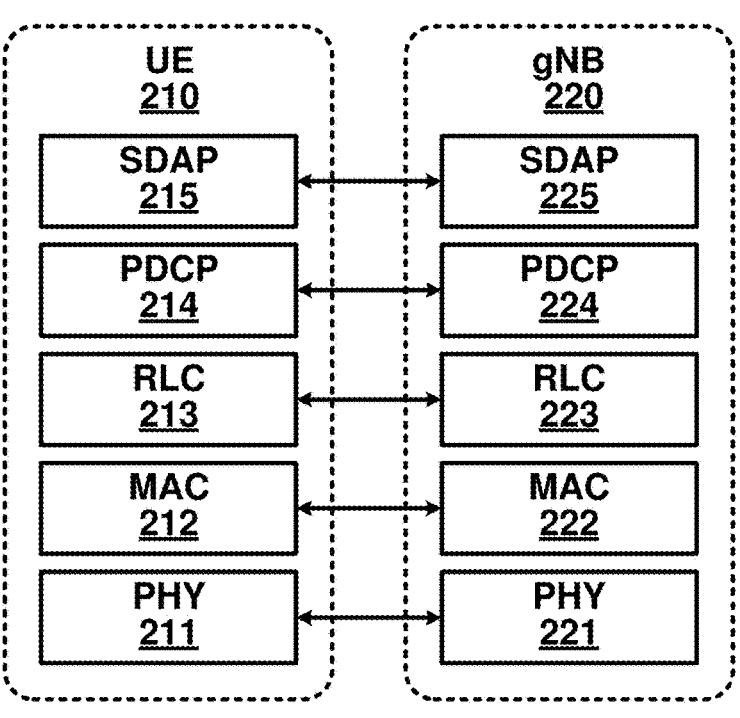
FIG. 2A and FIG. 2B respectively illustrate a New Radio (NR) user plane and control plane protocol stack.
Figure 2B:
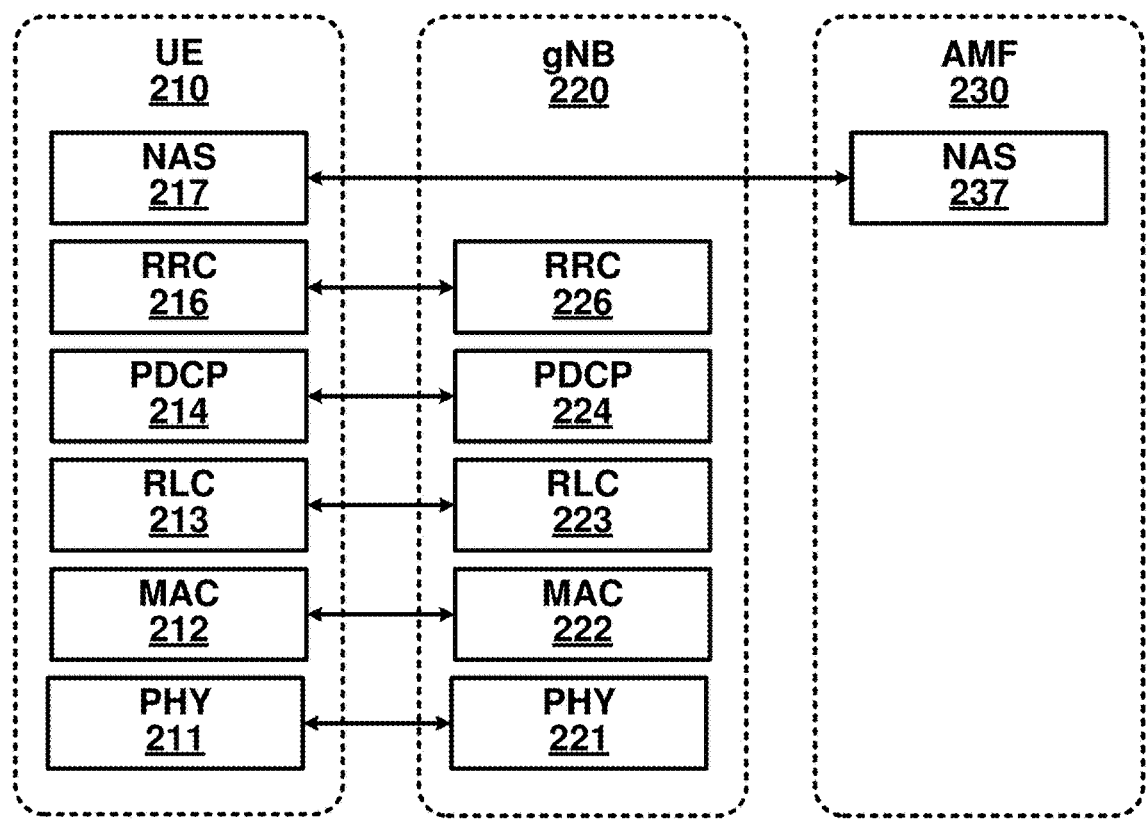

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling.

Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
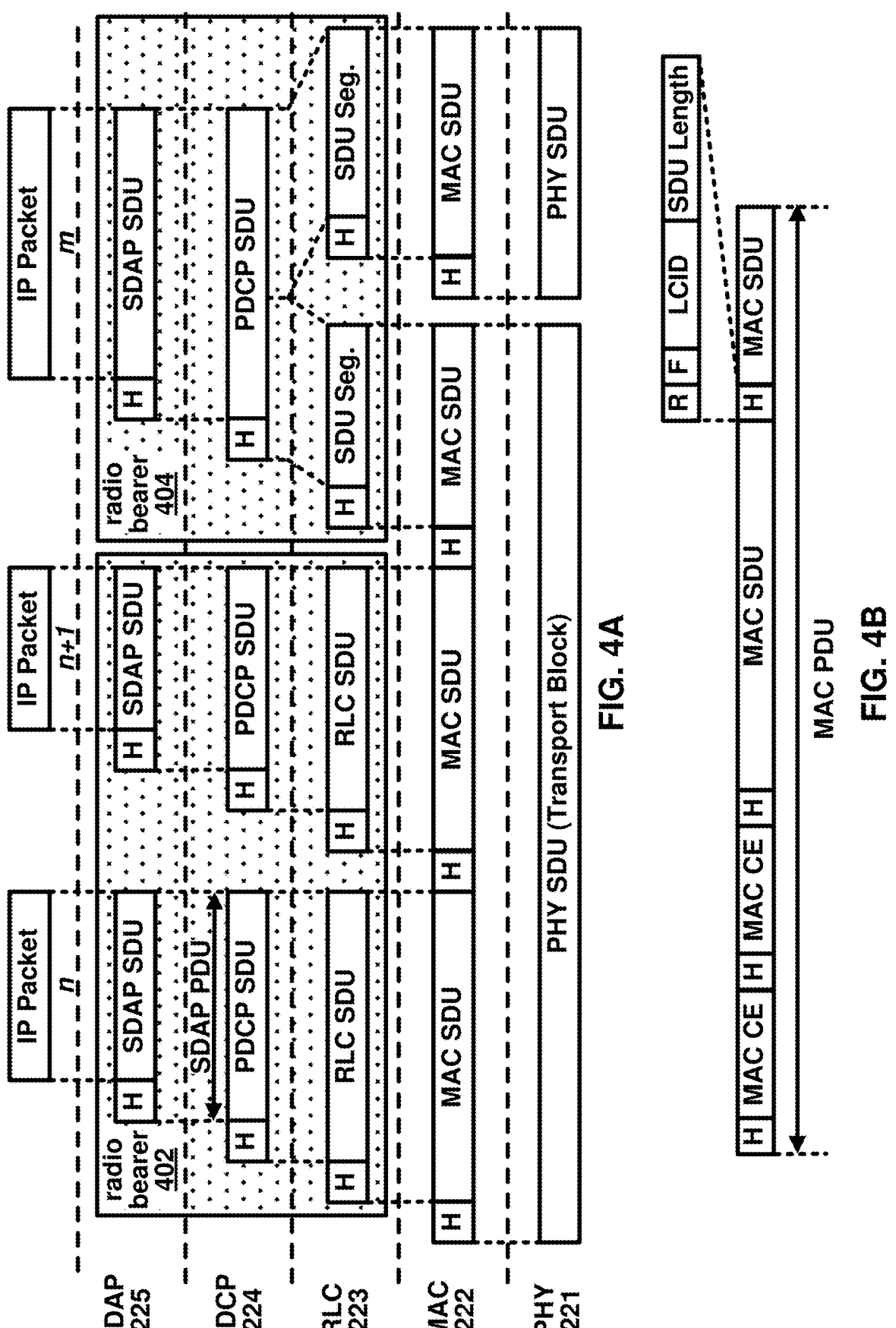
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
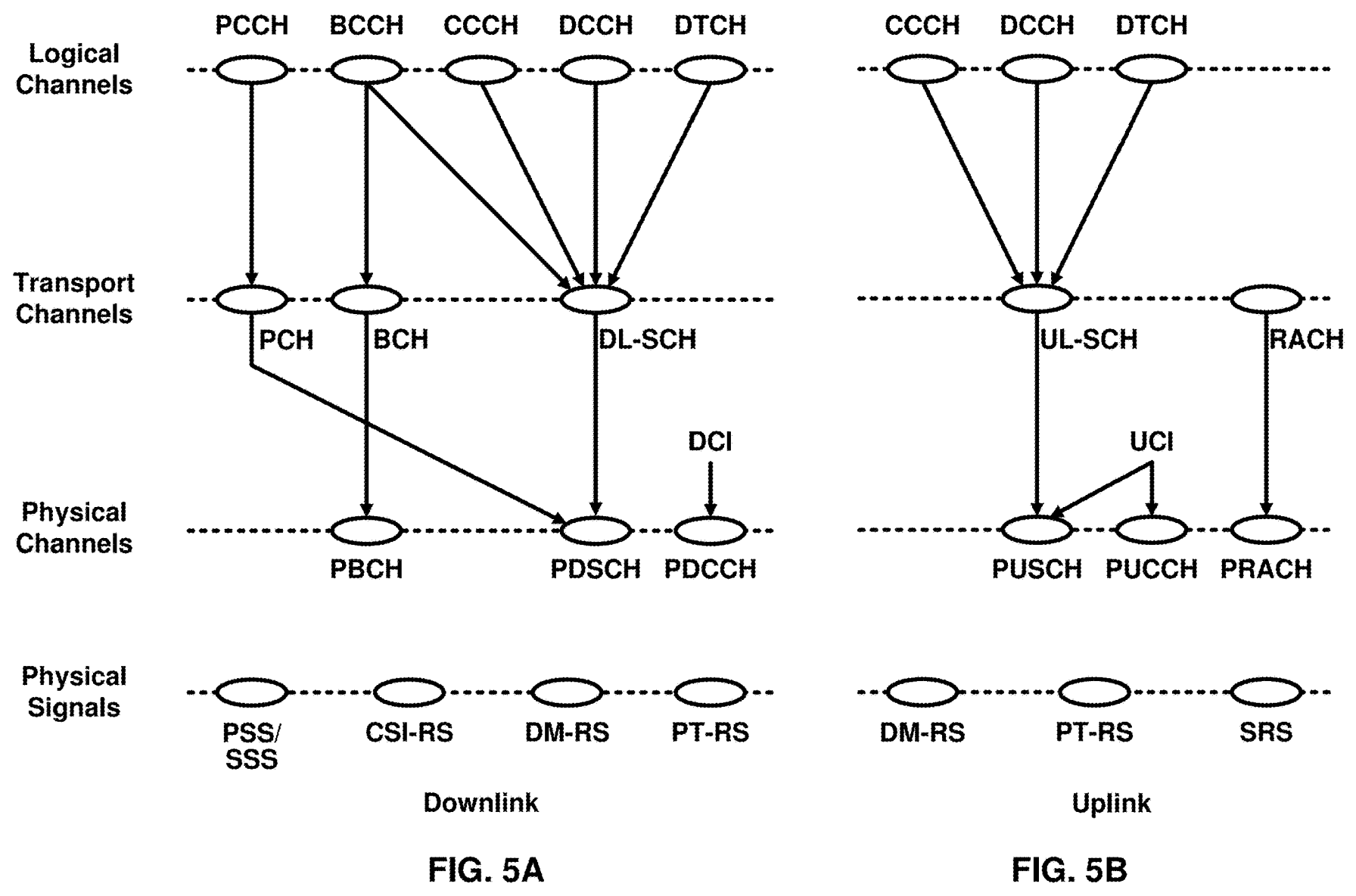

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
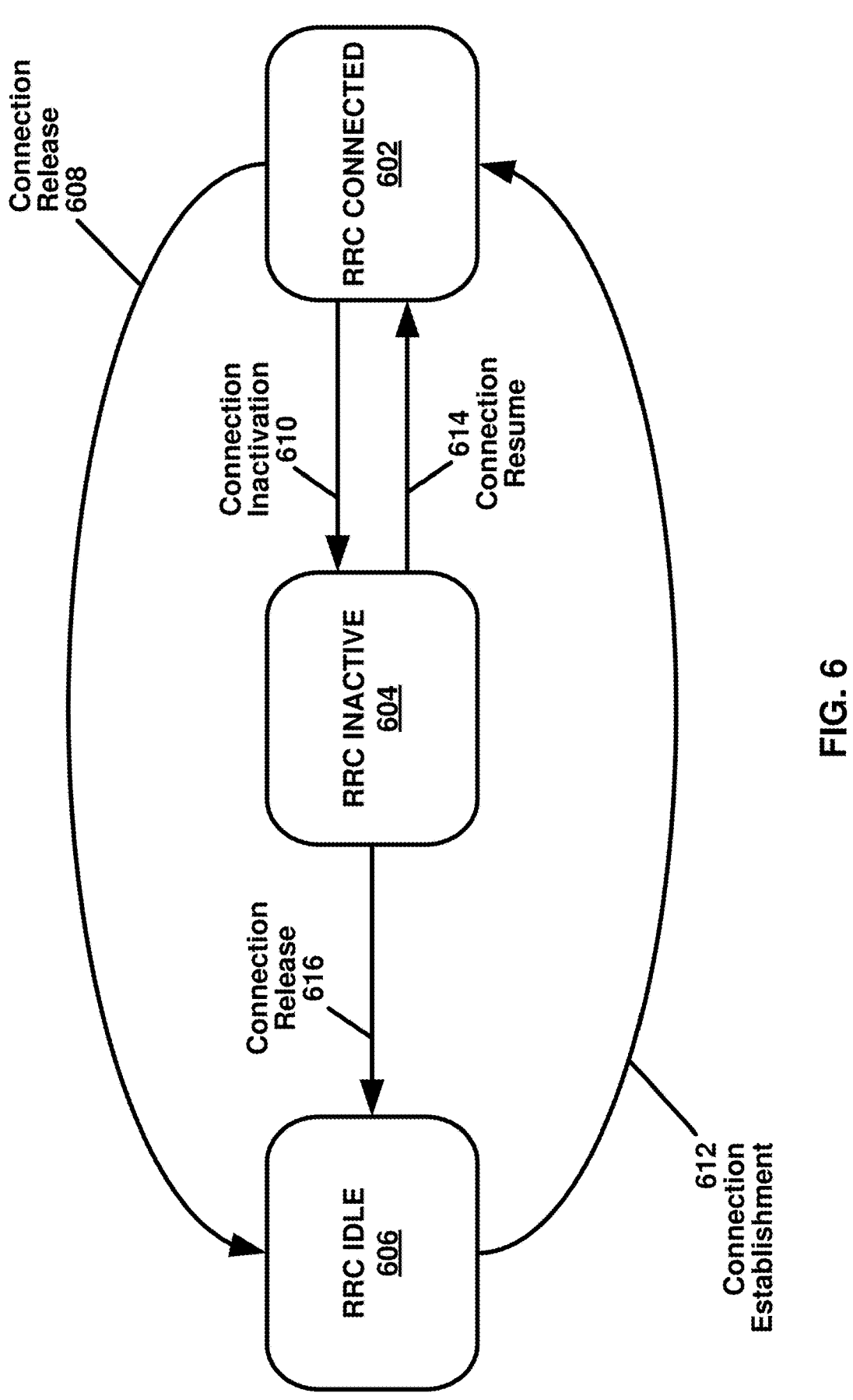
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNB s 160 or ng-eNB s 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
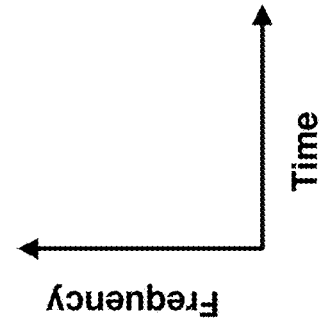
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
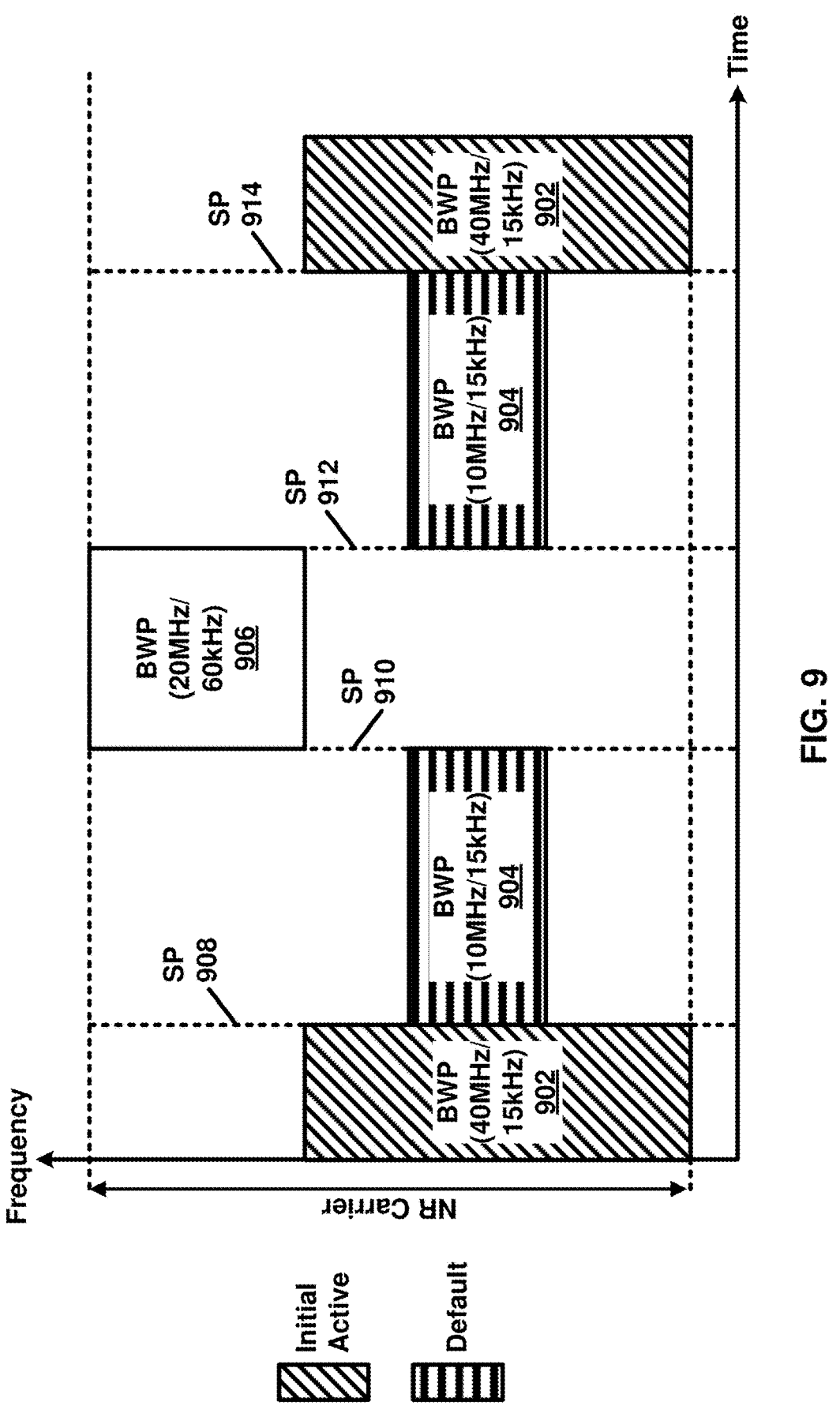
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
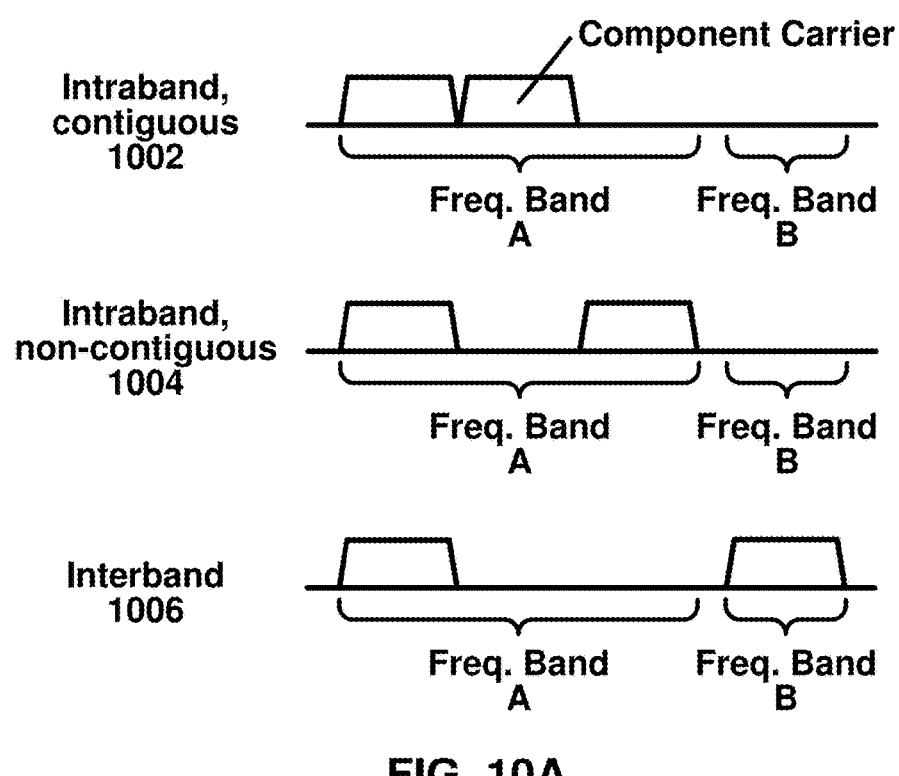
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
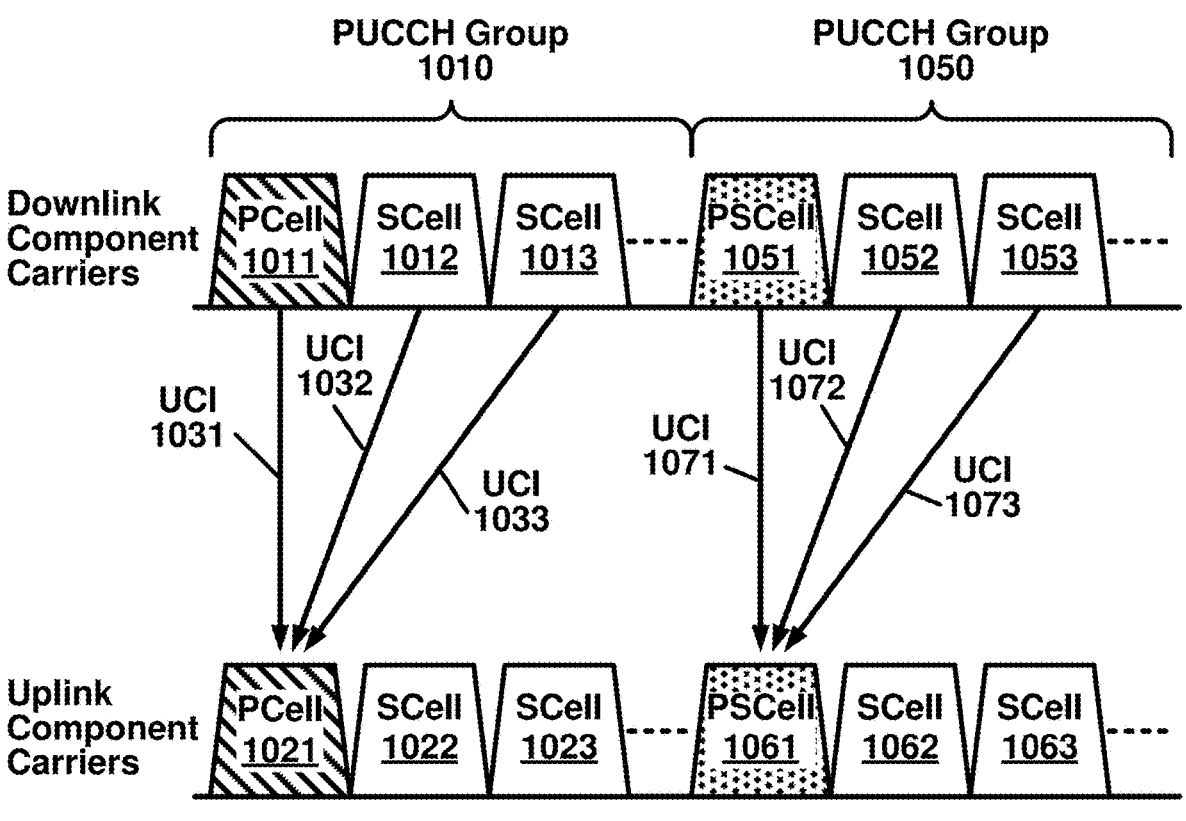
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, over-loading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
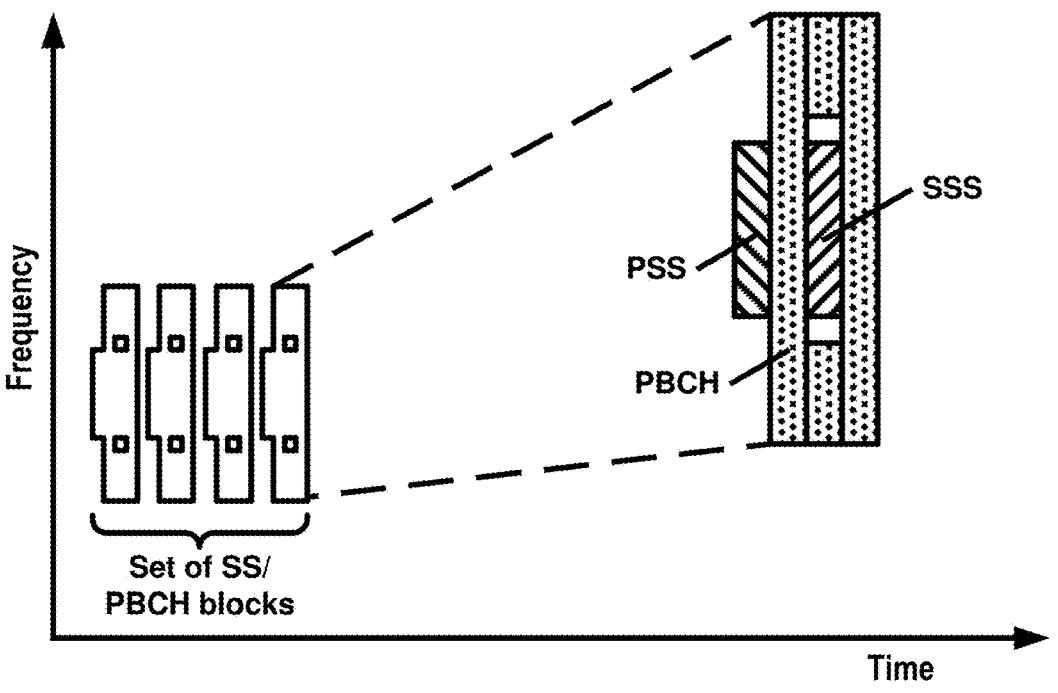
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
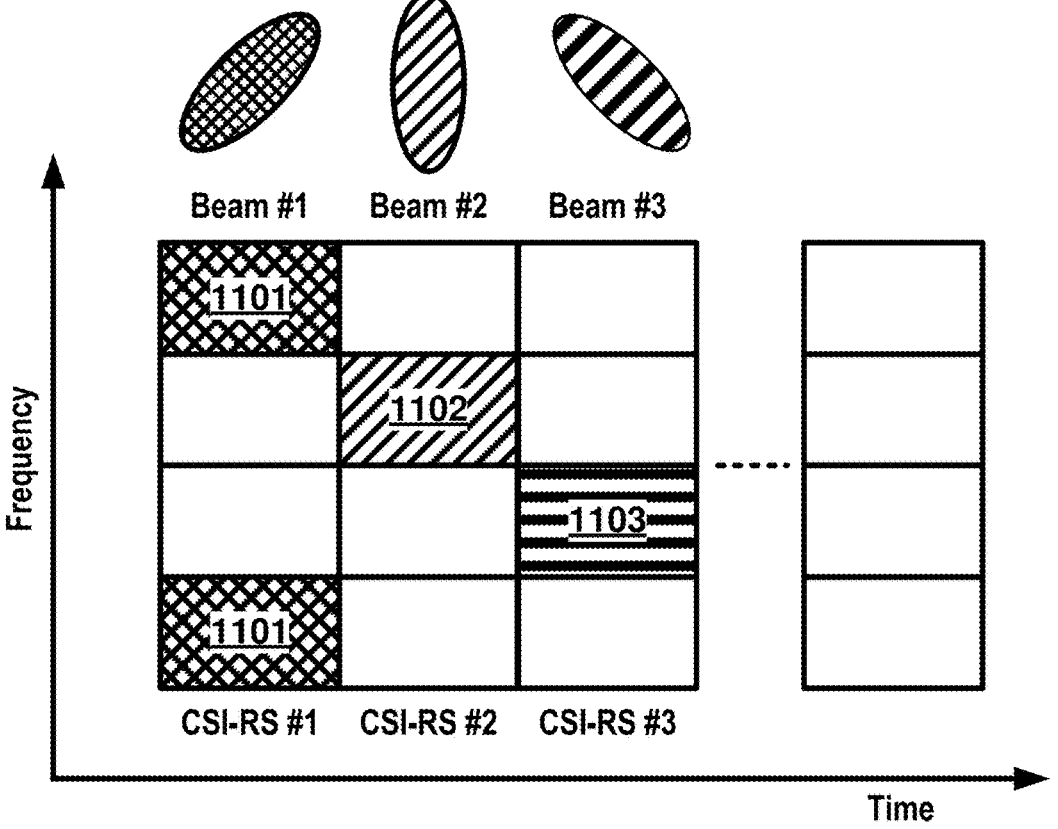
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RS s. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RS s such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
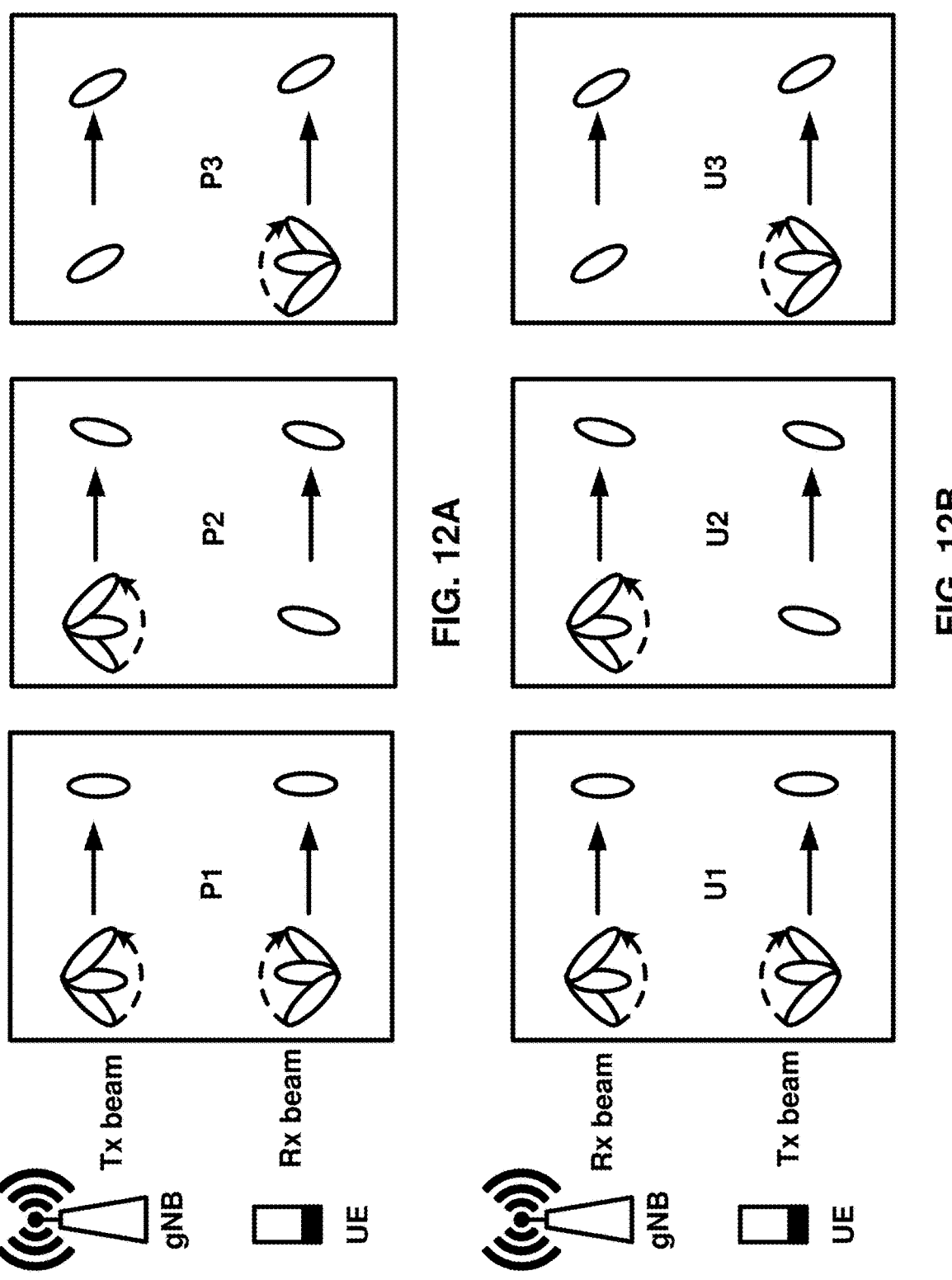
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RS s) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RS s of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIB s) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
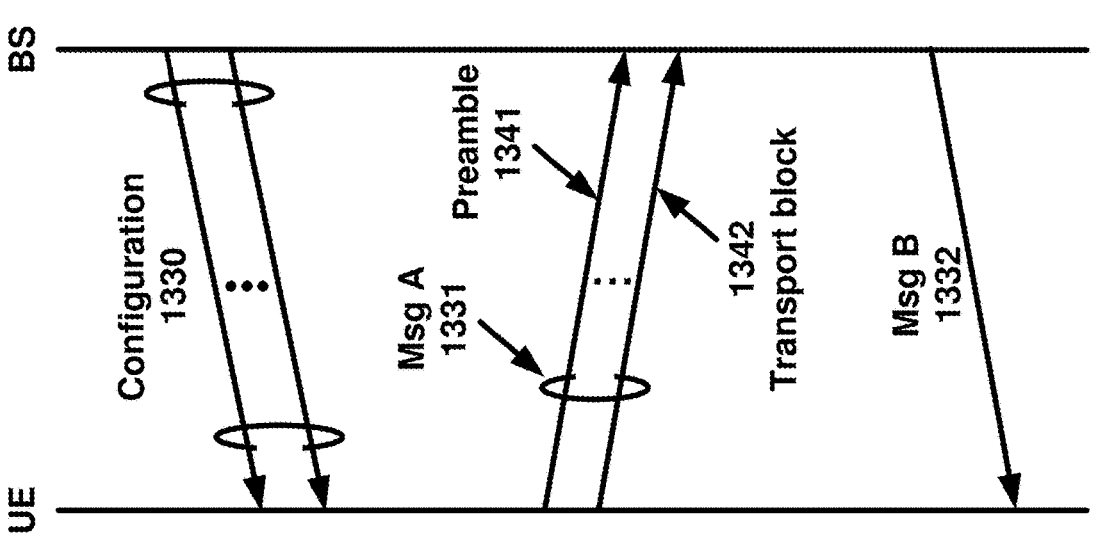
FIG. 13A, FIG. 13B, and FIG. 13C respectively illustrate a four-step contention-based random access procedure, a two-step contention-free random access procedure, and another two-step random access procedure.
Figure 13B:
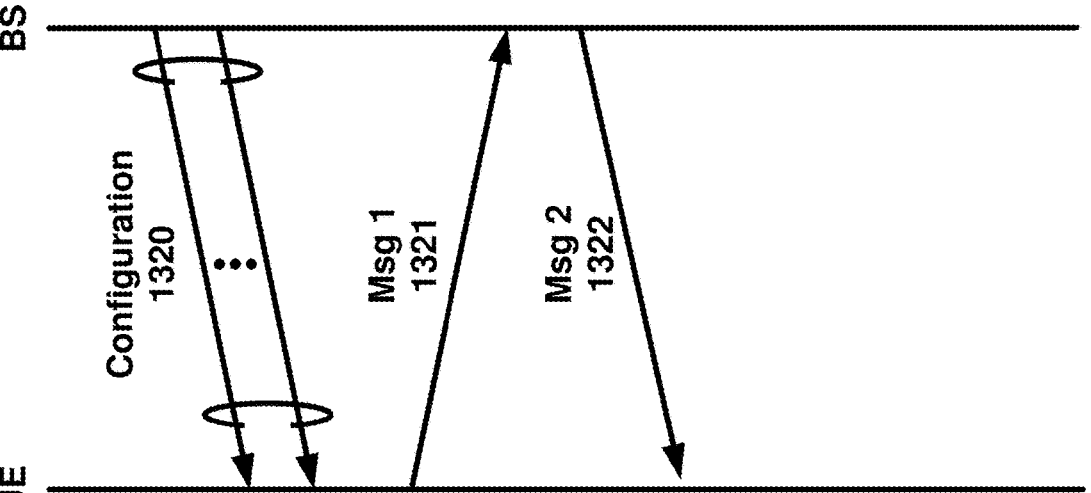
Figure 13A:
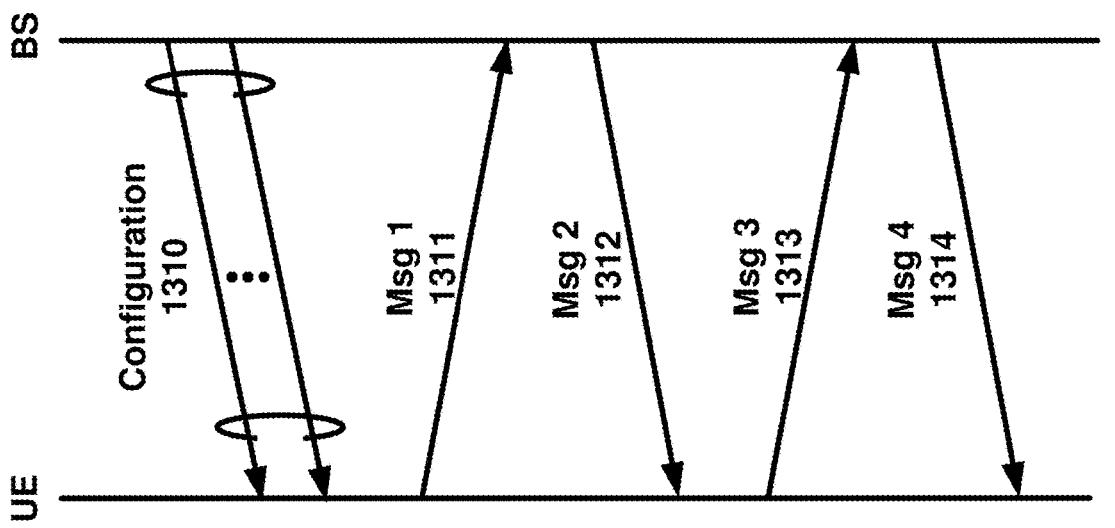

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RS s. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE POWER RAMPING STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE TRANSMISSION COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier). The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
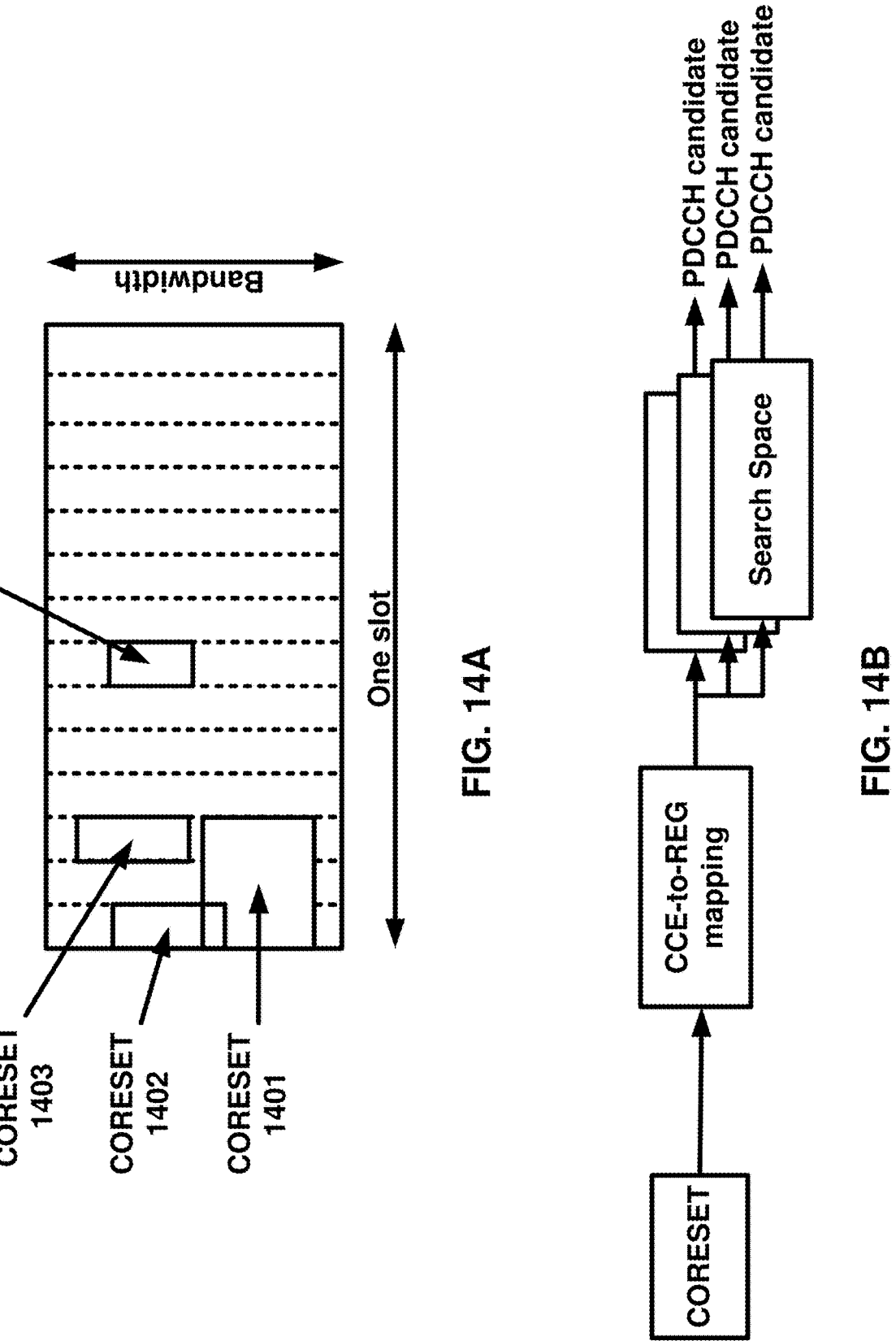
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
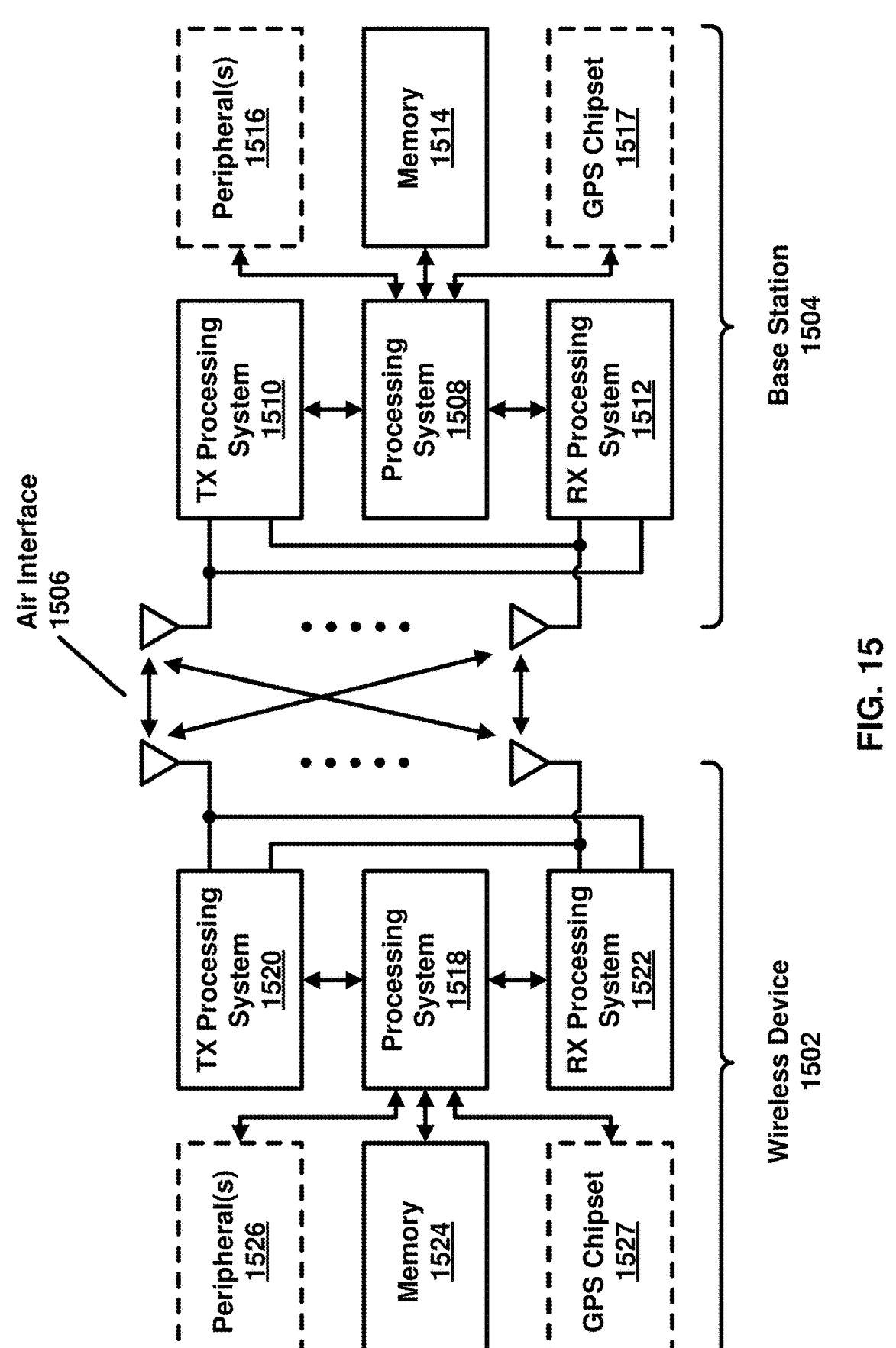
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
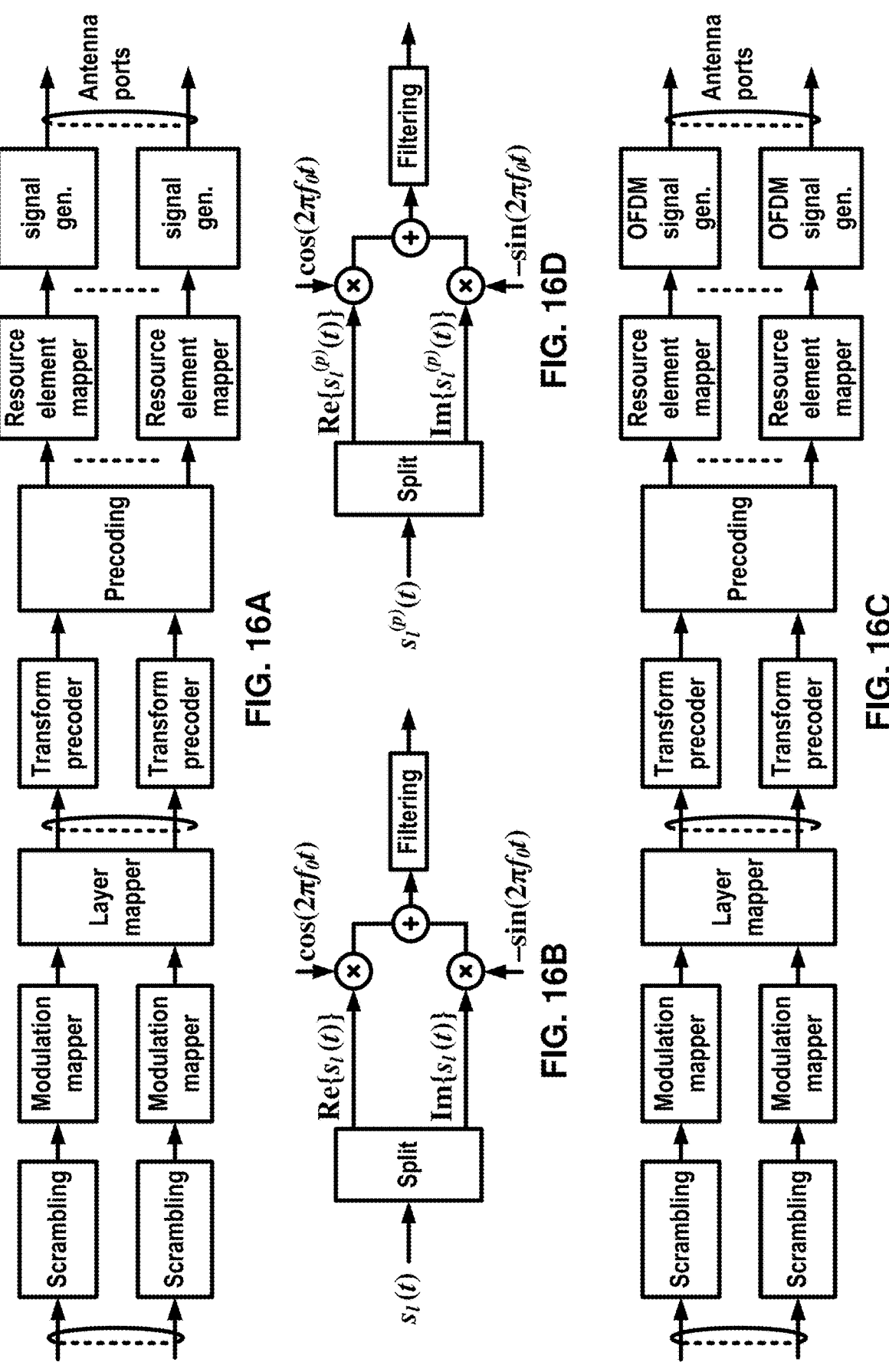
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP- OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A random access procedure (e.g., a four-step RACH) may comprise four steps for preamble transmission (Msg1), random access response reception (RAR/Msg2), uplink data transmission with a wireless device identity (Msg3), and contention resolution (Msg4). A random access procedure may comprise only two steps, e.g., a two-step RACH. In a two-step random access procedure, the wireless device may transmit a preamble sequence and a data signal in one transmission (MsgA; the first step). In response to detecting a MsgA, the base station may respond to the wireless device via a MsgB. The MsgB may comprise the detected preamble index, the wireless device identity, and a timing advance. A two-step RACH procedure may result in reduced delay for RACH transmission and/or reduced signaling overhead, for both licensed and unlicensed bands.

FIG. 13C is an example of a two-step RA procedure that may comprise an uplink (UL) transmission of a two-step MsgA 1331 that may comprise a random access preamble (RAP) transmission 1341 and one or more transport blocks transmission 1342, followed by a downlink (DL) transmission of a two-step MsgB 1332 that may comprise a response, e.g., random access response (RAR), corresponding to the uplink transmission. The response may comprise contention resolution information.

A two-step RACH procedure may be able to operate regardless of whether the wireless device has a valid TA or not. A two-step RACH procedure may be applicable to any cell size. A two-step RACH procedure may be applied for RRC_INACTIVE and/or RRC_CONNECTED and/or RRC_IDLE states. A two-step RACH procedure may support contention-based random access. Channel structure of MsgA may comprise preamble and PUSCH carrying payload. For example, existing PRACH preamble design may be used for a two-step RACH procedure. For example, PUSCH including DMRS for transmission of payload of MsgA may be used for a two-step RACH procedure. The PRACH preamble and the PUSCH in a MsgA may be TDMed. It may be important for the wireless device operating in unlicensed bands, that the gap between the preamble and PUSCH short enough such that the MsgA can be transmitted using one LBT. The PRACH preamble and/or PRACH occasion and the time-frequency resource of PUSCH in MsgA plus DMRS may be mapped. The MsgA configuration in two-step RACH may be broadcast by the base station to the wireless device (e.g., via system information) and/or configured using dedicated signaling (e.g., RRC signaling). For example, a base station may transmit one or more RRC messages to configure a wireless device with one or more parameters of a two-step RACH configuration. The one or more RRC messages may comprise parameters required for transmitting a two-step RACH MsgA. For example, the parameters may indicate at least one of followings: PRACH resource allocation, preamble format, SSB information (e.g., total number of SSBs, downlink resource allocation of SSB transmission, transmission power of SSB transmission, and/or other information), and uplink radio resources for one or more transport block transmissions (e.g., UL grant). The same PRACH resources may be shared for a four-step RACH procedure and a two-step RACH procedure. Four-step RACH resources may be configured regardless whether two-step RACH is configured or not. The configuration of two-step RACH may reuse the configuration of four-step RACH with one or more additional information (e.g., UL grant, and/or UL grant to SSB association, and/or UL grant to PRACH occasion mapping, and/or UL grant to preamble mapping, etc.), for example to save duplicated signaling. Two-step RACH resources may be configured separately from four-step RACH resources, e.g., 2-step RACH occasions (ROs) may be separate from 4-step ROs (no shared ROs), and/or 2-step preambles may be separate from 4-step preambles. Network may indicate (e.g., via broadcast signaling) to the wireless devices whether the 4-step RACH and 2-step RACH resources (e.g., ROs, preambles, etc.) are shared or not.

Figure 17:
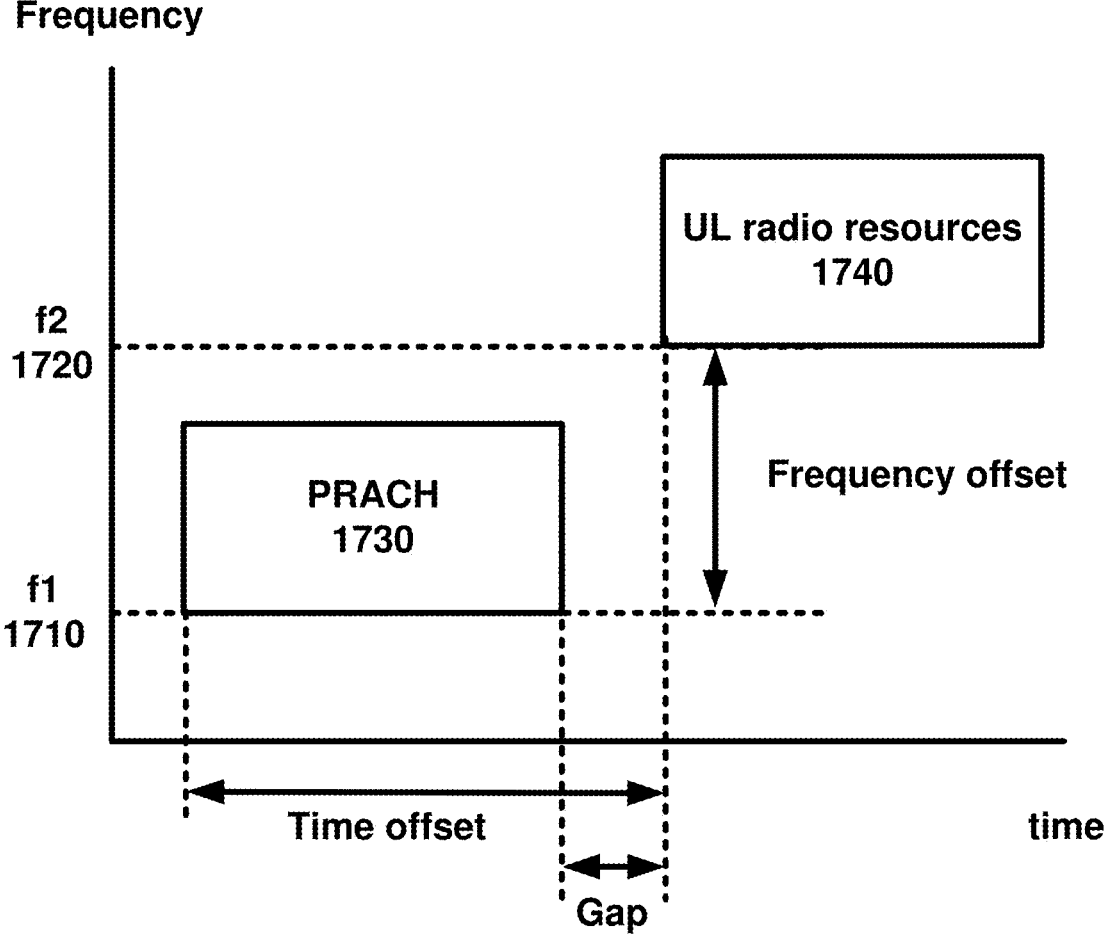
FIG. 17 shows an example of radio resource allocation for a two-step RA procedure, according to some embodiments.

FIG. 17 is an example of radio resource allocation for a two-step RA procedure, according to some embodiments. If a frequency offset (as shown in FIG. 17) is zero, PRACH 1730 and UL radio resources 1740 may be time-multiplexed. If a time offset (as shown in FIG. 17) is zero, PRACH 1730 and UL radio resources 1740 may be frequency-multiplexed. The frequency offset (as shown in FIG. 17) may be an absolute number in units of Hz, MHz, and GHz, and/or a relative number, e.g., one of frequency indices predefined/preconfigured. The time offset (as shown in FIG. 17) may be an absolute number in units of micro-second, milli-second, or second and/or a relative number, e.g., in terms of sub-frame, slot, mini-slot, OFDM symbol.

In two-step RACH procedure, preamble and payload may be both transmitted in MsgA. However, the receiver sensitivity for the preamble and payload may be different. Hence, it is possible that the base station may detect the preamble successfully but fail to detect the payload part, although the base station may configure the payload transmitting power offset to the preamble to compensate the different receiver sensitivity. In this situation, there may be two possible alternatives for the next step: fall back to a four-step RACH procedure, or retransmission of payload in MsgA.

Fallback from two-step RACH procedure to four-step RACH procedure may work as follows: when the base station only detects the preamble and has no correct knowledge of the payload, the base station may send the content identical with the Msg2 to the wireless device at the second step. The Msg2 transmission may be identical to Msg2 transmission of 4-step RACH. The Msg2 PDCCH may be scrambled by/addressed to RA-RNTI. The RA-RNTI may be calculated based on the resources used for preamble transmission in MsgA. The remainder of the procedure may be identical to 4-step RACH. The wireless device may take the same behavior on the reception of message at second step as the Msg2 reception in a four-step RACH procedure. Once the MsgB identical with Msg2 is received by the wireless device, the wireless device may transmit the Msg3 according to the UL grant in the received RAR of Msg2. The fallback mechanism may avoid the retransmission of contention-based RA (CBRA) preamble and keep the same latency of the four-step RA procedure.

Once MsgA preamble is transmitted, the wireless device may start a MsgB-ResponseWindow (configured by RRC), at a first PDCCH occasion. The wireless device may monitor the PDCCH of the SpCell for a random access response identified by MsgB-RNTI while the MsgB response window is running. In response to a transmission of a PRACH and a PUSCH, or to a transmission of only a PRACH if the PRACH preamble is mapped to a valid PUSCH occasion, the wireless device may attempt to detect a DCI (e.g. DCI format 1_0) with CRC scrambled by a corresponding MsgB-RNTI during the MsgB response window. The window may start at a first symbol of an earliest CORESET the UE is configured to receive PDCCH (e.g., for Type1-PDCCH CSS set), that is at least one symbol, after a last symbol of the PUSCH occasion corresponding to the PRACH transmission. The symbol duration may correspond to the SCS for Type1-PDCCH CSS set. The length of the window in number of slots, based on the SCS for Type1-PDCCH CSS set, may be provided by msgB-Response Window.

A MsgB-RNTI associated with a PRACH occasion in which a random access preamble is transmitted, may be computed as:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The wireless device may monitor the PDCCH of the SpCell for Random Access Response identified by the C-RNTI while the msgB-Response Window is running, e.g., if C-RNTI MAC CE was included in the MSGA. If notification of a reception of a PDCCH transmission of the SpCell is received from lower layers, and if a valid downlink assignment has been received on the PDCCH for the MSGB-RNTI and the received TB is successfully decoded, the wireless device may set a preamble backoff value to the backoff indicator (if present in MsgB, otherwise, zero). If the MsgB contains a fall-back RAR with a RAPID matching the transmitted preamble index, the wireless device may take the TC-RNTI received in the fallback RAR and/or process the UL grant in the fallback RAR and proceed with Msg3 transmission. If the MsgB contains a success RAR, the wireless device may take the C-RNTI received in the success RAR and/or apply the timing advance and/or consider the random access procedure successfully completed.

If msgB-ResponseWindow expires, and the Random Access Response Reception has not been considered as successful based on descriptions above, the wireless device may increment PREAMBLE TRANSMISSION COUNTER by 1. If the PREAMBLE TRANSMISSION COUNTER reaches a maximum value, the wireless device may fallback to 4-step RACH.

MsgB may be sent when the preamble in MsgA is detected. MsgA PUSCH contents may be same as Msg3 contents of 4-step RACH. MsgB contents may be similar to that of combined Msg2 and Msg4 contents of 4-step RA type. The content of MsgB may be different depending on whether the payload in MsgA is successfully decoded or not. For the case both the MsgA preamble and payload are successfully detected and decoded, the message of the second step is the MsgB for two-step RACH contention resolution. The RAPID in RAR may be redundant as contention resolution ID e.g. C-RNTI disclosed in the payload may fulfill contention resolution purpose. The UL grant may be optional in this case and may be used to schedule the possible uplink data packets after the RACH procedure, for example when Buffer Status Report (BSR) is reported in MsgA. For the case that the preamble is successfully detected but the payload is not successfully decoded, the wireless device may fall back to four-step RACH, where the message of second step may be identical to Msg2, comprising RAR that indicates RAPID and a TC-RNTI, and an UL grant for Msg3. The wireless device may alternatively retransmit the payload in MsgA. In this case a NACK may be indicated in the message of the second step. The message may further comprise an UL grant for retransmission, TA (timing advance) command, TC-RNTI, power control command and other HARQ information if necessary.

Triggers for a four-step RACH procedure may be applied for a two-step RACH procedure as well. The most promising use cases for two-step RACH may comprise unlicensed band, small cell, and handover. In unlicensed band, a wireless device may need to perform LBT before accessing the channel. When the four-step RACH is adopted, there may be multiple LBT at either wireless device and/or base station side, which also results in higher channel access failure probability during random access procedure. Therefore, it is important to simplify RACH procedure to reduce the number of LBT in unlicensed band. Two-step RACH was proposed to apply for unlicensed band. Different from the four-step RACH, the simplified procedure of two-step RACH can be beneficial to complete RACH procedure more quickly. In a small cell, the transmission propagation delay of the wireless devices may be small, such that it may be compensated by normal cyclic prefix (CP) for data transmission. In such case, two-step RACH can be useful to reduce the signaling overhead of RACH procedure. Besides, there may be no TA issue for wireless devices operating in small cell, for example because TA is zero/negligible. For these wireless devices, two-step RACH may be beneficial to quickly get ready for data transmission. Moreover, in unlicensed band, small cells are most likely to be deployed. Therefore, two-step RACH may be most promising in this case.

In an example, a wireless device may receive RRC configuration of RACH parameters with coverage enhancement. In an example, a base station may transmit to a wireless device one or more RRC messages comprising configuration parameters of a PRACH configuration (e.g., PRACH-Config IE) for a RA procedure. The configuration parameters may comprise a frequency hopping parameter (e.g., prach-HoppingOffset), an initial PRACH CE level (e.g., initial-CE-level), a list of RSRP thresholds (e.g., rsrp-ThresholdsPrachInfoList) for PRACH resource set selection, and one or more PDCCH configuration parameters (e.g., mpdcch-startSF-CSS-RA). The list of RSRP thresholds may comprise a number of RSRP threshold values for determining a CE level, from a plurality of CE levels, for PRACH. The first element may correspond to RSRP threshold 1, the second element correspond to RSRP threshold 2 and so on. The number of RSRP thresholds present in rsrp-ThresholdsPrachInfoList may be equal to a number of CE levels configured in prach-ParametersListCE minus one. The configuration parameters may indicate a list of PRACH resource sets (e.g., PRACH-ParametersListCE), each PRACH resource set corresponding to a respective CE level of the plurality of CE levels and being associated with one or more PRACH parameters (e.g., in PRACH-ParametersCE IE). The one or more PRACH parameters, for a CE level, may comprise: a PRACH configuration index (e.g., prach-ConfigIndex), a number of PRACH repetitions per attempt for the CE level (e.g., numRepetitionPerPreamble-Attempt), a maximum number of preamble transmission attempts for the CE level (e.g., maxNumPreambleAttemptCE), an initial PRACH CE level (e.g., initial-CE-level), a frequency offset parameter (e.g., prach-FreqOffset), a starting subframe indication (e.g., prach-StartingSubframe), a frequency hopping parameter (e.g., prach-HoppingConfig), one or more PDCCH configuration parameters (e.g., mpdcch-NumRepetition-RA indicating a number of repetition of PDCCH transmission) and etc. In an example, the base station may transmit to the wireless device one or more RRC messages of a RA procedure comprising configuration parameters indicating a maximum number of preamble transmission (e.g., preambleTransMax, or pre-ambleTransMax-CE) for performing RA preamble transmissions before declaring a failure.

Figures 18A, 18B:
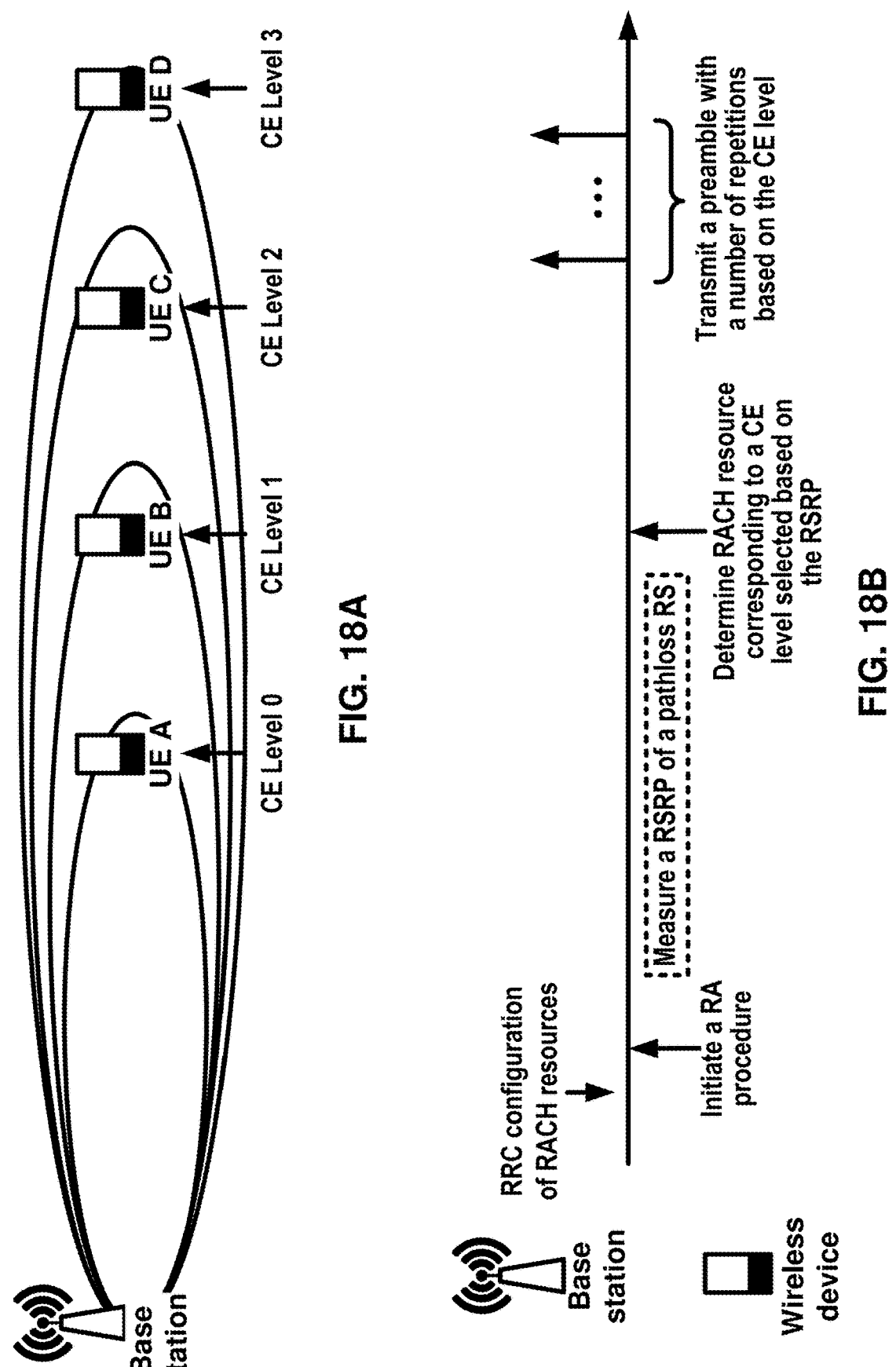
FIG. 18A shows an example of coverage enhancement levels, according to some embodiments.
FIG. 18B shows an example of a RACH procedure with coverage enhancement, according to some embodiments.

FIG. 18A shows an example of coverage enhancement levels, according to some embodiments. In an example, a base station may transmit to a wireless device one or more RRC messages comprising configuration parameters of a RA procedure for coverage enhancement. As shown in FIG. 18A, the wireless device may be one of: a first wireless device (e.g., UE A) located in a cell coverage of a first CE level (e.g., CE Level 0), a second wireless device (e.g., UE B) located in a cell coverage of a second CE level (e.g., CE Level 1), a third wireless device (e.g., UE C) located in a cell coverage of a third CE level (e.g., CE Level 2), a fourth wireless device (e.g., UE D) located in a cell coverage of a fourth CE level (e.g., CE Level 3), and etc. The wireless device may determine a CE level, for the RA procedure, based on a RSRP of a pathloss RS and a RSRP threshold corresponding to the CE level and perform the RA procedure based on the determined CE level.

FIG. 18B shows an example of RACH procedure with coverage enhancement, according to some embodiments. In an example, each RACH resource set is associated with a respective CE level of a plurality of CE levels. The wireless device may determine a CE level, for the RA procedure, based on comparing a measured RSRP and a RSRP threshold, of the plurality of RSRP thresholds, corresponding to the CE level of the plurality of CE levels. In an example, if a RSRP threshold, of the plurality of RSRP thresholds, corresponding to CE level 3 is configured and the measured RSRP is less than the RSRP threshold of CE level 3 and the wireless device is capable of supporting CE level 3, the wireless device may determine the CE level as CE level 3 for the RA procedure. If a RSRP threshold, of the plurality of RSRP thresholds, corresponding to CE level 2 is configured and the measured RSRP is less than the RSRP threshold of CE level 2 and greater than the RSRP threshold of CE level 3, and the wireless device is capable of supporting CE level 2, the wireless device may determine the CE level as CE level 2 for the RA procedure. If a RSRP threshold, of the plurality of RSRP thresholds, corresponding to CE level 1 is configured and the measured RSRP is less than the RSRP threshold of CE level 1 and greater than the RSRP threshold of CE level 3 and the RSRP threshold of CE level 2, and the wireless device is capable of supporting CE level 1, the wireless device may determine the CE level as CE level 1 for the RA procedure. If the measured RSRP is higher than the RSRP threshold of CE level 1, the wireless device may determine the CE level as CE level 0.

Based on the determined CE level (e.g., CE level 3, CE level 2, CE level 1 and/or CE level 0), the wireless device may determine a RACH resource (e.g., a preamble and/or a RACH occasion) for the RA procedure. The wireless device may transmit the preamble with a number of repetitions (e.g., numRepetitionPerPreambleAttempt) by using the RACH occasion. The number (e.g., numRepetitionPerPreambleAttempt) may be configured for the CE level in the RRC messages. In response to transmitting the preamble with the number of repetitions, the wireless device may monitor PDCCH for receiving a RA response (e.g., after a last preamble repetitions).

The wireless device may monitor a PDCCH for receiving a response for the transmitting the preamble. The wireless device may monitor the PDCCH after a last repetition of the preamble transmission. The wireless device may determine whether the response is received during the monitoring the PDCCH (e.g., when a RAR response window is running). In response to the response being received, the wireless device may perform Message 3 transmission, based on example of FIG. 13A. The wireless device may select the RAR window (ra-ResponseWindowSize) and Contention resolution window (mac-ContentionResolution Timer) corresponding to the selected CE level and PRACH.

In an example, the size of RAR window may increase with the number of preamble repetitions increasing per CE level. Once the Random Access Preamble is transmitted, the UE may monitor the PDCCH of the SpCell for Random Access Response(s) identified by the RA-RNTI defined below, in the RA Response window. The RA Response window for CE UE may start at the subframe that contains the end of the last preamble repetition plus three subframes, and has length ra-ResponseWindowSize for the corresponding enhanced coverage level.

For CE, RA-RNTI associated with the PRACH in which the Random Access Preamble is transmitted, is computed as:

$$RA\text{-}RNTI = 1 + t\_id + 10 * f\_id + 60 * (SFN\_id \bmod(Wmax/10))$$

where t_id may be an index of a first subframe of the specified PRACH ($0 \leq t\_id < 10$), f_id may be an index of the specified PRACH within that subframe, in ascending order of frequency domain ($0 \leq f\_id < 6$), SFN_id may be an index of a first radio frame of the specified PRACH, and Wmax may be 400, maximum possible RAR window size in subframes for UEs in enhanced coverage.

Increased RAR window may extend beyond a duration of a system frame. The offset added to the RA-RNTI formula compared to legacy LTE UE ($60 * (SFN\ id \bmod(Wmax/10))$) is to avoid collision between DCIs addressed to CE UEs in different system frames.

The usage scenarios that have been identified for 5G are enhanced mobile broadband (eMBB), massive machine-type communication (mMTC), and Ultra-Reliable and Low Latency communication (URLLC). Yet another identified area to locate the boundary between mMTC and URLLC would be time sensitive communication (TSC). In particular, mMTC, URLLC, and TSC are associated with novel IoT use cases that are targeted for vertical industries. It is envisaged that eMBB, mMTC, URLLC, and TSC use cases may all need to be supported in the same network.

One objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such an environment include, e.g., pressure sensors, humidity sensors, thermometers, motion sensors, accelerometers, actuators, etc. It is desirable to connect these sensors and actuators to 5G radio access and core networks. The massive industrial wireless sensor network (IWSN) use cases and requirements described in 3GPP TR 22.804, TS 22.104, TR 22.832 and TS 22.261 include not only URLLC services with very high requirements, but also relatively low-end services with the requirement of small device form factors, and/or being completely wireless with a battery life of several years.

Similar to connected industries, 5G connectivity can serve as a catalyst for the next wave of smart city innovations. As an example, 3GPP TS 22.804 describes smart city use cases and requirements for smart city use cases. The smart city vertical covers data collection and processing to more efficiently monitor and control city resources and to provide services to city residents. The deployment of surveillance cameras is an essential part of the smart city but also of factories and industries.

Finally, the wearables use case includes smart watches, rings, eHealth related devices, medical monitoring devices, etc. One characteristic for the wearables use case is that the device is small in size.

As a baseline, the requirements for these use cases, also known as NR-Light, are device complexity, device size, and deployment scenarios. For device complexity, the main motivation for the new device type is to lower the device cost and complexity as compared to high-end eMBB and URLLC devices of Rel-15/Rel-16. This is the case for industrial sensors. For device size, the requirement for most use cases is that the standard enables a device design with compact form factor. For deployment scenarios, the system should support all FR1/FR2 bands for FDD and TDD. Use case specific requirements may include industrial wireless sensors, for which communication service availability is 99.99% and end-to-end latency less than 100 ms; the reference bit rate is less than 2 Mbps (potentially asymmetric, e.g., UL heavy traffic) for all use cases and the device is stationary; the battery should last at least few years; for safety related sensors, latency requirement is lower than, e.g., 5-10 ms. Use case specific requirements may include video surveillance, for which reference economic video bitrate would be 2-4 Mbps, latency <500 ms, reliability 99%-99.9%. High-end video (e.g., for farming) would require 7.5-25 Mbps. It is noted that traffic pattern is dominated by UL transmissions. Use case specific requirements may include wearables. Reference bitrate for smart wearable application can be 10-50 Mbps in DL and minimum 5 Mbps in UL and peak bit rate of the device higher, 150 Mbps for downlink and 50 Mbps for uplink. Battery of the device should last multiple days (up to 1-2 weeks).

Recognizing UE features and parameters with lower end capabilities, relative to Release 16 eMBB and URLLC NR, may help to serve the use cases mentioned above. Potential UE complexity reduction features may include: reduced number of UE RX/TX antennas; reduced UE bandwidth (e.g. Rel-15 SSB bandwidth may be reused and L1 changes minimized); Half-Duplex-FDD; relaxed UE processing time; and relaxed UE processing capability.

UE power saving may be enabled and battery lifetime enhancements may be considered for reduced capability UEs (RedCap UEs) in applicable use cases (e.g., delay tolerant use case). For example, by enabling reduced PDCCH monitoring by smaller numbers of blind decodes and CCE limits; and/or by enabling extended DRX for RRC Inactive and/or Idle; and/or enabling RRM relaxation for stationary devices. Functionalities may be enabled that mitigate or limit the performance degradation of such features and complexity reductions, e.g., coverage recovery to compensate for potential coverage reduction due to the device complexity reduction. Standardization framework and principles may be studied for how to define and constrain such reduced capabilities, considering the definition of a limited set of one or more device types and considering how to ensure those device types are used for the intended use cases. Functionalities may be studied that will allow devices with reduced capabilities (RedCap UEs) to be explicitly identifiable to networks and network operators and allow operators to restrict their access if desired.

As described above, many types of use scenarios are being envisaged and enabled for interfacing with 5G technologies. In some embodiments, these use scenarios are enabled through UEs that have different capabilities. For example, a UE may be one of and/or a variation/combination of the following types of wireless devices: an NB-IoT device, an eMTC device, an NR-Light (sometimes referred to as NR-Lite) device, a URLLC device, or an eMBB device. The NB-IoT device type and the eMTC device type may be part of the lower-power wide area IoT use case whereas the URLLC device type and the eMBB device type are for the full NR use case. For example, the eMBB device type may be a legacy UE such as a smartphone. In some embodiments, the RedCap UEs described above may be an NR-Light device type. In some embodiments, the RedCap UEs may be an NB-IoT device type or an eMTC device type. Unlike UEs of the URLLC device type or the eMBB device types, RedCap UEs may have limited hardware and related capabilities.

In some embodiments, Reduction of UE bandwidth may be beneficial in terms of UE complexity reduction, e.g., in frequency range 1 and/or frequency range 2 (FR1 and/or FR2). For determining a RedCap UE bandwidth, one or more of the following may be considered: reusing legacy initial access scheme, SSB bandwidth, CORESET #0 configurations, initial BWP bandwidth, data rates needed for RedCap use cases, leverage of the LTE ecosystem (e.g., using the same bandwidth as LTE), UE cost saving consideration, UE power saving consideration, PDCCH performance (e.g., implication on the aggregation level), scheduling flexibility, or a combination thereof.

For example, a UE bandwidth reduction to 20 MHz or lower (e.g., 5/10/15 MHz) in FR1 may be considered. The lowest bandwidth capability may not be less than LTE Category ibis modem (20 MHz). For example, for low-end use cases, a 20 MHz UE bandwidth may be enough to achieve a data rate requirement. For example, for high-end use cases, such as small size wearables, 20 MHz may not be enough to achieve the 150 Mbps DL peak data rate for single antenna case. Considering that initial access should support different RedCap UEs, a 20 MHz bandwidth may be considered as the baseline for initial access in FR1. For example, 20 MHz may be useful for future RedCap unlicensed devices to support a Listen-Before-Talk (LBT) bandwidth of 20 MHz. For example, RedCap UEs may support at least a maximum of MHz bandwidth in FR1. In FR1, the existing configuration options for SSB and CORESET #0 may be preserved, while reducing the specification impact when RedCap is introduced in Rel-17. The market acceptance of RedCap may be weakened if enabling RedCap support in the network comes at the cost of losing certain configuration options for SSB or CORESET #0. In FR1, CORESET #0 bandwidth can be up to 17.28 MHz. Therefore, a RedCap UE can be expected to support at least 20 MHz maximum channel bandwidth, at least during initial access. 20 MHz may also be considered as a sweet spot that balances device cost and required data rate for various services. Further reduction of maximum UE bandwidth may lead to diminishing gain in cost reduction and power saving, but significant loss in coverage, data rates, latency, scheduling flexibility, and coexistence with legacy NR UEs. For example, a 10 MHz bandwidth may be considered because it does not require specification change for initial access. For the low-to-mid end data rate services, no MIMO is needed if 20 MHz is assumed, which is beneficial for devices with small form factors. If a smaller bandwidth is used, e.g. 10 MHz, MIMO or CA might be needed for low-to-mid end data rate services, which can be challenging for certain devices. For example, 20 MHz channel bandwidth may be supported, and smaller bandwidth such as 10 MHz may also be considered at least for use cases not requiring high peak data rate such as low-end wearables.

In FR2, even more than in FR1, UE bandwidth reduction is a key feature to significantly reduce UE complexity and cost. For FR2, the RedCap UE may support 50 MHz and/or 100 MHz maximum UE bandwidth at least for initial access. A supported bandwidth of less than may have impacts due to PBCH and coreset selection. A supported bandwidth of may not provide significant UE cost savings and going below 80 MHz may have large specification impacts and legacy network impacts. 50 MHz and 100 MHz bandwidths are already specified for FR2, and may be preferred over the other proposals in order to minimize the impacts on specifications, implementations and deployments. In FR2, even though the maximum SSB bandwidth can be up to 57.6 MHz and CORESET #0 bandwidth can be up to 69.12 MHz, these SSB and CORESET #0 configuration options can still be used in cells supporting 50 MHz RedCap UEs. For example, a UE may need to skip certain SSB or PDCCH subcarriers outside of the UE receive bandwidth. This will result in some coverage loss that should be studied and that can be mitigated through suitable coverage recovery solution should SSB and PDCCH become the coverage limiting channels.

The legacy mobile broadband networks were designed to optimize performance mainly for human type of communications and thus, are not designed or optimized to meet the machine type communications (MTC) related requirements. The primary objective of MTC specific designs is to focus on the lower device cost, enhanced coverage, and reduced power consumption. To further reduce the cost and power consumption, it may be beneficial to further reduce the transmission/reception bandwidth of legacy systems (e.g., LTE or New Radio). The transmission/reception bandwidth for both control and data channels may be reduced (e.g., to 5 MHz or 10 MHz or 20 MHz or 50 MHz or 100 MHz). In general, it is envisioned that a large number of MTC/RedCap devices will be deployed for specific services within one cell in near future. When such a massive number of MTC/RedCap devices attempt to access and communicate with the network, multiple MTC regions/bandwidths (e.g., 20 MHz bandwidths) may be allocated by the base station.

A baseline UE bandwidth capability in FR1 may be 20 MHz. This bandwidth may be assumed during the initial access procedure and/or after the initial access procedure. An FR1 RedCap UE may optionally support a maximum bandwidth larger than 20 MHz after initial access. A baseline UE bandwidth capability in FR2 may be 100 MHz. This bandwidth may be assumed during the initial access procedure and/or after the initial access procedure. A same maximum UE bandwidth capability in a band may apply to radio frequency (RF) and/or baseband. The maximum UE bandwidth capability in a band may apply to data and/or control channels. The maximum UE bandwidth capability in a band may apply to DL and/or UL.

For FR1 FDD bands and FR2 bands where a non-RedCap UE is required to be equipped with a minimum of 2 Rx branches, a minimum number of Rx branches supported by a RedCap UE may be 1. A maximum number of DL MIMO layers may be 1 for a RedCap UE with 1 Rx branch. 2 Rx branches may be supported by a RedCap UE. A maximum number of DL MIMO layers may be 1 or 2 for a RedCap UE with 2 Rx branch. For FR1 TDD bands where a non-RedCap UE is required to be equipped with a minimum of 4 Rx branches, a minimum number of Rx branches supported by a RedCap UE may be one or two. A maximum number of DL MIMO layers may be 1 for a RedCap UE with 1 Rx branch. A maximum number of DL MIMO layers may be 1 or 2 for a RedCap UE with 2 Rx branch. For FR2 bands where a non-RedCap UE is required to be equipped with a minimum of 2 Rx branches, for a RedCap UE with 1 Rx branch, the maximum number of DL MIMO layers may be 1. For a RedCap UE with 2 Rx branches, the maximum number of DL MIMO layers may be 1 or 2.

A maximum mandatory modulation for RedCap may be relaxed, e.g., 64 QAM instead of 256 QAM for FR1 DL, 16 QAM instead of 64QAM for FR1 UL, 16 QAM instead of 64 QAM for FR2 DL, and 16 QAM instead of 64 QAM for FR2 UL.

MIMO layer for RedCap may be restricted to one or two layers. Transport block size (TBS) may implicitly be restricted due to reduced UE bandwidth and/or reduced number of MIMO layers. Other TBS restrictions may or may not be considered for RedCap UE.

For FR1, under the consideration of potential reduced antenna efficiency due to device size limitations, a loss (e.g., maximum isotropic loss (MIL)) of PUSCH and/or Msg3 may be worse than that of the bottleneck channel for the reference NR UE and coverage recovery may be needed. The amount of coverage recovery may be up to 3 dB. For other UL channels, coverage recovery may not be needed. For FR1 including both FDD and TDD bands and RedCap UE with 2 Rx and reduced antenna efficiency, the losses of all the downlink channels may be better than that of the bottleneck channel for the reference NR UE and coverage recovery may not be needed. For RedCap UE with 1 Rx and reduced antenna efficiency, dependent on frequency bands and the assumption of DL power spectral density (PSD), the need for coverage recovery can be different. For example, for carrier frequency of 4 GHz with DL PSD 24 dBm/MHz, coverage recovery may be needed for the downlink channels of Msg2, Msg4 and PDCCH CSS. For other carrier frequencies or DL PSD other than 24 dBm/MHz, coverage recovery may not be needed for the downlink channels. For FR2, there may be no assumption of reduced antenna efficiency for RedCap UE and the losses of the UL channels may be the same as the reference NR UE and coverage recovery for UL channels may not be needed. For RedCap UE with 100 MHz BW and 1Rx, although there may be performance loss from reducing the number of Rx branches to 1, the losses of the DL channels may be better that that of the bottleneck channel for the reference NR UE and coverage recovery for DL channels may not be needed. For RedCap UE with 50 MHz BW and 1 Rx, coverage recovery may be needed for PDSCH, e.g., when the same target data rate as the reference NR UE is assumed, and the amount of coverage recovery to be considered may be approximately [2-3 dB].

Coverage recovery for broadcast PDCCH (e.g., PDCCH monitored in a Type0/0A/1/2/3-PDCCH CSS) may comprise PDCCH repetition, compact DCI, new aggregation level (AL) [e.g., 12, 24 or 32], PDCCH transmission via CORE-SET or search space bundling, PDCCH-less mechanism for SIB1 and/or SI message. Coverage recovery for PUSCH may comprise cross-slot or cross-repetition channel estimation, lower DM-RS density in time domain, enhancements on PUSCH repetition Type A and/or Type B, frequency hopping or BWP switching across a larger system bandwidth. Coverage recovery for PDSCH may comprise the use of the lower-MCS table, larger aggregation factor for PDSCH reception, cross-slot or cross-repetition channel estimation, increasing the granularity of PRB bundling, frequency hopping or BWP switching across a larger system bandwidth. Coverage recovery for Msg2 PDSCH may comprise TBS scaling and/or Msg2 PDSCH repetition. A mechanism for differentiating enhanced UE (supporting coverage recovery) and legacy UE may be needed. The mechanism may comprise separate PRACH configurations (e.g., separate PRACH occasions and/or preambles). Coverage recovery for Msg3 may comprise repetition for Msg3 PUSCH initial and/or retransmission. Coverage recovery for Msg4 PDSCH may comprise a scaling factor for TBS determination, PDSCH repetition, and/or using a lower-MCS table.

Identification of RedCap UEs may be done during Msg1 (PRACH) transmission. The options may comprise separate initial UL BWP, and/or separate PRACH resources, and/or PRACH preamble partitioning. Identification of RedCap UEs may be done during Msg3 (PUSCH) transmission. The options may comprise using the spare bit in existing Msg3 definition; extending the Msg3 size to carry additional one or more bits, indicating RedCap UE type(s). Identification of RedCap UEs may be done after Msg4 acknowledgement, e.g., during Msg5 (PUCCH) transmission and/or part of UE capability reporting. Identification of RedCap UEs may be done during MsgA (PRACH+PUSCH) transmission, e.g., if 2-step RACH is supported for RedCap UEs.

Early identification of RedCap UE type(s) during transmission of Msg1 may be necessary for: coverage recovery (including link adaptation) for one or more of: Msg2 PDCCH/PDSCH, Msg3 PUSCH and PDCCH scheduling Msg3 reTx, Msg4 PDCCH/PDSCH or PUCCH in response to Msg4, Msg5 PUSCH and associated PDCCH (e.g., if it is determined that coverage recovery for RedCap UEs is necessary for one of more of these channels); identifying UE minimum processing times capabilities for PDSCH processing and PUSCH preparation (e.g., if relaxations to UE min processing times are defined for N1 and N2); identifying UE capability for UL modulation order for Msg3 and Msg5 scheduling (e.g., if relaxations to max UL modulation order (i.e., UL modulation order restricted to lower than 64 QAM) are introduced); identifying UE max bandwidth capability for Msg3 and Msg5 scheduling and PUCCH in response to Msg4. If early identification of RedCap UE type(s) during Msg1 transmission is not supported, identification of RedCap UE type(s) during transmission of Msg3 may be necessary for coverage recovery (including link adaptation) for one or more of: Msg4 PDCCH/PDSCH, Msg5 PUSCH and associated PDCCH.

Identification of RedCap UE type(s) during transmission of Msg1 may enable efficient handling of different UE minimum processing times between RedCap and non-RedCap UEs for: minimum timing between PDSCH carrying RAR and start of Msg3 PUSCH; minimum timing between PDSCH carrying Msg4 and the corresponding HARQ-ACK feedback; minimum timing between PDCCH with the reTx grant and the corresponding Msg3 PUSCH retransmission, if relaxed UE min processing times are introduced for RedCap UEs. Identification of RedCap UE type(s) during transmission of Msg1 may enable coverage recovery, including link adaptation, for any one or more of: broadcast PDCCH, PDSCH associated with Msg2, PDSCH associated with Msg4, and PUSCH associated with Msg3, if coverage recovery is needed for these channels. The option of configuring separate initial UL BWPs, in addition to the above pros, may enable addressing congestion (if congestion may occur) in the initial UL BWP that may otherwise need to be restricted to the mandatory required BW for RedCap UEs in the band/FR.

Identification of RedCap UE type(s) during transmission of Msg1 may result in potential reduction in PRACH user capacity (for the options based on separation of PRACH preambles), impacting both RedCap and non-RedCap UEs respectively, e.g., if the total PRACH resources in the cell is not increased. The exact impact may depend on numbers of device type(s)/sub-types/capabilities to be identified and exact details of PRACH preamble partitioning schemes. Identification of RedCap UE type(s) during transmission of Msg1 may result in potential increase in UL overhead from PRACH (for the options based on separation of PRACH resources), impacting both RedCap and non-RedCap UEs. Identification of RedCap UE type(s) during transmission of Msg1 may result in potential increase in UL overhead and complexity in configuration and maintenance of multiple initial UL BWP for the gNodeB, for the option of configuring separate initial UL BWPs. Identification of RedCap UE type(s) during transmission of Msg1 may result in higher impact to RAN1 and RAN2 specifications as well as increased SIB signaling overhead compared to other options. The indication mechanisms in this category may be limiting in terms of the number of further sub-types/capabilities within RedCap device type that may be distinguished, if such sub-types/capability indication are introduced.

Identification of RedCap UE type(s) during transmission of Msg3 may enable coverage recovery (if needed) and/or appropriate link adaptation for PDSCH (and associated PDCCH and PUCCH) for Msg4, and scheduling of Msg5. The option of extending Msg3 size may offer good scalability in the number of bits for such UE identification; e.g., if sub-types of RedCap device types (if defined) are to be indicated in Msg3. If only the spare bit in Msg3 is used, it would consume the single spare bit currently available in Msg3 payload, and this may not be desirable. The option of only using the spare bit in Msg3 scales poorly—limiting to a single-bit indication may not be sufficient if intending to distinguish between further sub-types/capabilities within RedCap device type, if RedCap UE sub-types/capabilities are defined in the context of RedCap UE identification. Cannot facilitate additional coverage recovery (including separate link adaptation) for broadcast PDCCH and/or Msg2 PDSCH, and/or Msg3 PUSCH (and associated PDCCH) for RedCap UEs. If extended Msg3 size is introduced, mechanisms to enable detection between use of legacy Msg3 and extended Msg3 definitions necessary. If UE minimum processing times are relaxed, cannot facilitate scheduling with separate minimum timing relationships for RedCap UEs (compared to non-RedCap UEs) between PDSCH carrying RAR and start of Msg3 PUSCH; minimum timing between PDCCH with the reTx grant and the corresponding Msg3 PUSCH retransmission. This could result in increased initial access latency for non-RedCap UEs. Extending Msg3 size may degrade reliability/coverage of Msg3. Extending Msg3 size may not address the issue where Msg3 is scheduled with a bandwidth/hopping range larger than the maximum RedCap UE bandwidth in the UL initial BWP.

Identification of RedCap UE type(s) during transmission of Msg5 or in UE capability report may offer a simple option for indication of RedCap UE type, including possibility of indicating further RedCap sub-types/capabilities if introduced. Identification of RedCap UE type(s) during transmission of Msg5 or in UE capability report may not facilitate additional coverage recovery (if needed) or separate link adaptation for broadcast PDCCH and/or Msg2 and/or Msg4 PDSCH, and/or Msg3 PUSCH for RedCap UEs. Too conservative scheduling and link adaptation for all UEs imply increased system overead for initial access in the initial DL and UL BWPs. If UE minimum processing times are relaxed, identification of RedCap UE type(s) during transmission of Msg5 or in UE capability report cannot facilitate scheduling with separate minimum timing relationships for RedCap UEs between PDSCH carrying RAR and start of Msg3 PUSCH; minimum timing between PDSCH carrying Msg4 and the corresponding HARQ-ACK feedback; minimum timing between PDCCH with the reTx grant and the corresponding Msg3 PUSCH retransmission. This could result in increased initial access latency for non-RedCap UEs. Identification of RedCap UE type(s) during transmission of Msg5 or in UE capability report cannot address the issue where Msg3 or PUCCH in response to Msg4 or Msg5 is scheduled with a bandwidth/hopping range larger than the maximum RedCap UE bandwidth in the UL initial BWP.

A wireless device may receive a DCI (e.g., DCI format 1_0) with CRC scrambled by RA-RNTI or MsgB-RNTI. The DCI may be received in response to a preamble transmission using a PRACH occasion associated with the RA-RNTI or MsgB-RNTI. The DCI may indicate a DL grant for receiving a Msg2/MsgB PDSCH comprising MAC PDU consisting of the random access response (e.g., RAR and/or fallbackRAR and/or successRAR). The DCI may comprise the following information: Frequency domain resource assignment which is indicated based on a size of CORESET 0 if CORESET 0 is configured for the cell or based on a size of initial DL bandwidth part if CORESET 0 is not configured for the cell; Time domain resource assignment; VRB-to-PRB mapping; Modulation and coding scheme; Transport Block (TB) scaling; LSB s of SFN; and/or Reserved bits.

Figure 19:
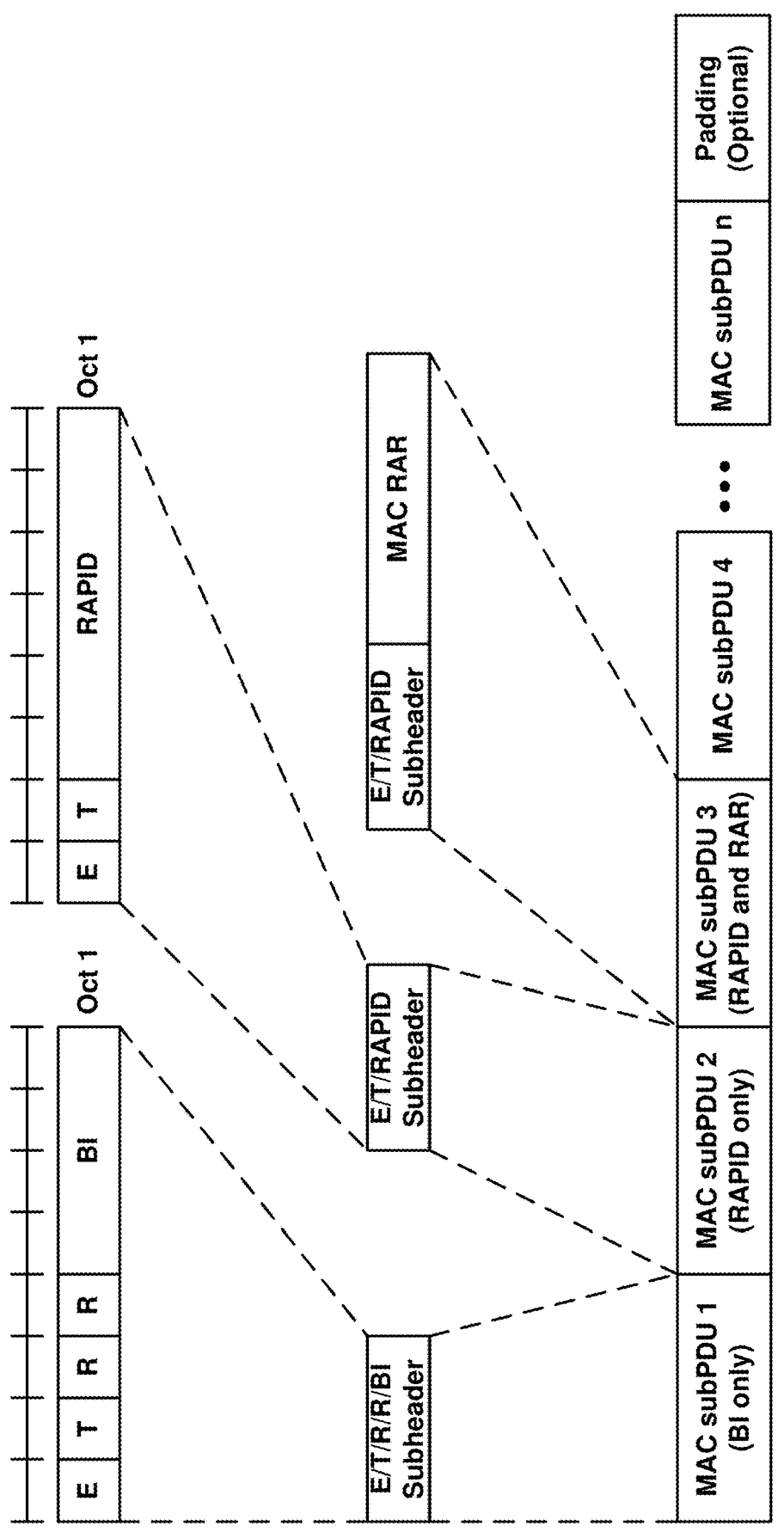
FIG. 19 shows an example of a MAC PDU including MAC RARs, according to some embodiments.

FIG. 19 shows an example of MAC PDU including MAC RARs, according to some embodiments. A MAC PDU may include one or more MAC subPDUs and optionally padding. Each MAC subPDU may include one of the following: a MAC subheader with Backoff Indicator only; a MAC subheader with RAPID only (e.g. acknowledgment for SI request); or a MAC subheader with random access preamble ID (RAPID) and MAC RAR. As shown in FIG. 19, a MAC subheader with Backoff Indicator may include five header fields E/T/R/R/BI. A MAC subPDU with Backoff Indicator only is placed at the beginning of the MAC PDU, if included. 'MAC subPDU(s) with RAPID only' and 'MAC subPDU(s) with RAPID and MAC RAR' may be placed anywhere between MAC subPDU with Backoff Indicator only (if any) and padding (if any). A MAC subheader with RAPID may include three header fields E/T/RAPID as shown in FIG. 19. Padding may be placed at the end of the MAC PDU if present. Presence and length of padding may be implicit based on TB size, and/or size of MAC subPDU(s).

The MAC subheader for RAR may include the following fields. E: The Extension field may be a flag indicating if the MAC subPDU including this MAC subheader is a last MAC subPDU or not in the MAC PDU. The E field may be set to "1" to indicate at least another MAC subPDU follows. The E field may be set to "0" to indicate that the MAC subPDU including this MAC subheader is the last MAC subPDU in the MAC PDU. T: The Type field may be a flag indicating whether the MAC subheader contains a Random Access Preamble ID or a Backoff Indicator. The T field may be set to "0" to indicate the presence of a Backoff Indicator field in the subheader (BI). The T field may be set to "1" to indicate the presence of a Random Access Preamble ID field in the subheader (RAPID). R: Reserved bit (e.g., set to "0"). BI: The Backoff Indicator field may identify the overload condition in the cell. The size of the BI field may be 4 bits. RAPID: The Random Access Preamble IDentifier field may identify the transmitted Random Access Preamble (see clause 5.1.3). The size of the RAPID field may be 6 bits. If the RAPID in the MAC subheader of a MAC subPDU corresponds to one of the Random Access Preambles configured for SI request, MAC RAR may not be included in the MAC subPDU.

FIG. 20A shows an example of a MAC RAR, according to some embodiments. The MAC RAR may be of fixed size as depicted in FIG. 20A, and include the following fields. R: Reserved bit (e.g., set to "0"). Timing Advance Command: The Timing Advance Command field may indicate an index value TA used to control the amount of timing adjustment that the MAC entity must apply. The size of the Timing Advance Command field may be 12 bits. UL Grant: The Uplink Grant field may indicate the resources to be used on the uplink, as shown in FIG. 20B. The size of the UL Grant field may be 27 bits. Temporary C-RNTI: The Temporary C-RNTI field may indicate the temporary identity that is used by the MAC entity during Random Access. The size of the Temporary C-RNTI field may be 16 bits.

FIG. 20B shows an example of random access response (RAR) uplink grant contents, according to some embodiments. A RAR UL grant may schedule a PUSCH transmission from the UE. Example contents of the RAR UL grant, starting with the MSB and ending with the LSB, are given in Table in FIG. 20B. If the value of the frequency hopping flag is 0, the UE may transmit the PUSCH without frequency hopping; otherwise, the UE may transmit the PUSCH with frequency hopping. The UE may determine the modulation and coding scheme (MCS) of the PUSCH transmission, e.g., from the first sixteen indexes of the applicable MCS index table for PUSCH. The TPC command value may be used for setting the power of the PUSCH transmission. The CSI request field may be reserved. The ChannelAccess-CPext field may indicate a channel access type and CP extension for operation with shared spectrum channel access.

Figure 21:
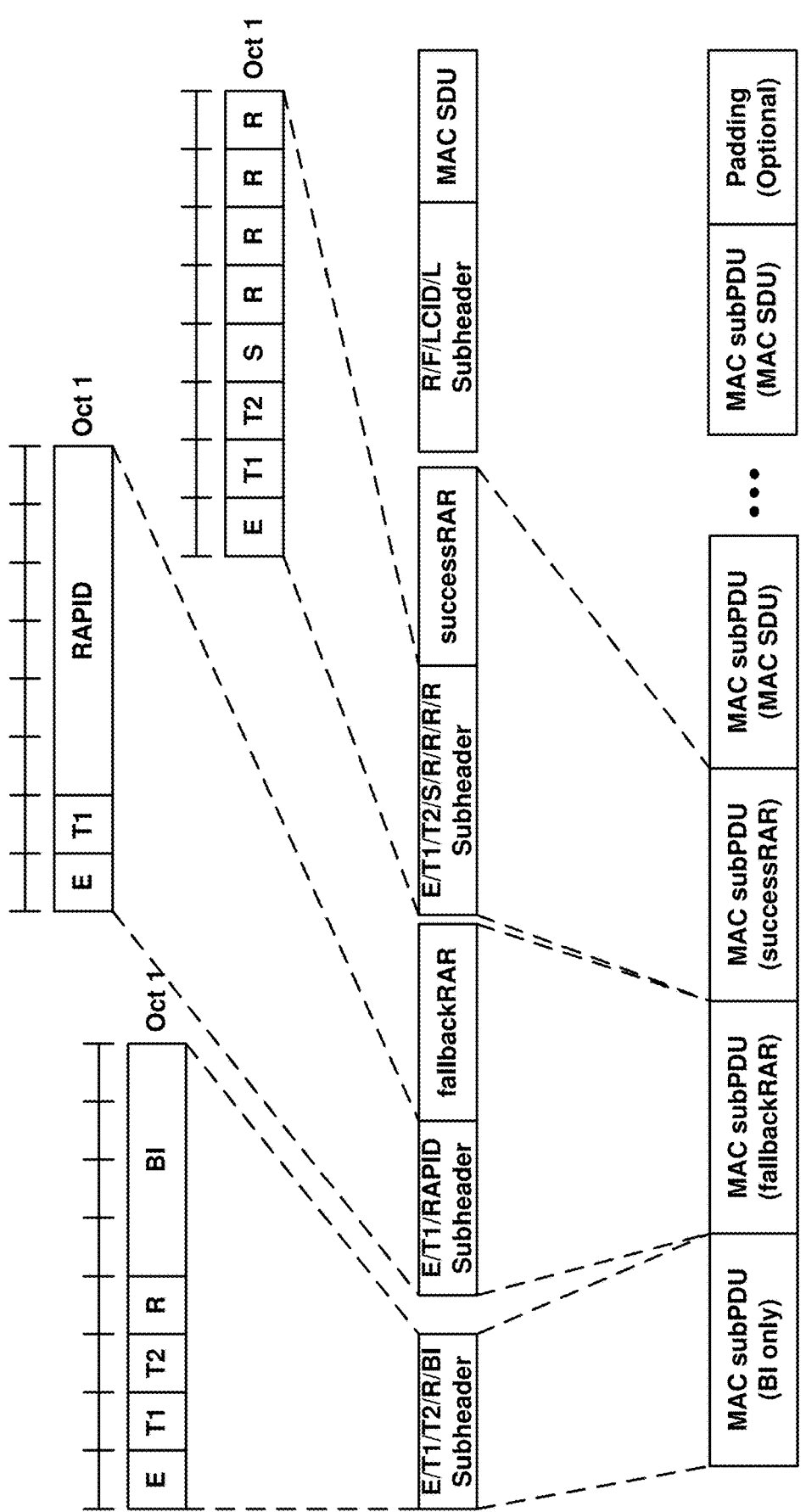
FIG. 21 shows an example of a MsgB MAC PDU, according to some embodiments.

FIG. 21 shows an example of a MsgB MAC PDU, according to some embodiments. A MAC PDU includes one or more MAC subPDUs and optionally padding. Each MAC subPDU MAY includes one of the following: a MAC subheader with Backoff Indicator only; a MAC subheader and fallbackRAR; a MAC subheader and successRAR; a MAC subheader and MAC SDU for CCCH or DCCH; or a MAC subheader and padding. A MAC subheader with Backoff Indicator may include five header fields E/T1/T2/R/BI as shown in FIG. 21. A MAC subPDU with Backoff Indicator only may be placed at the beginning of the MAC PDU, if included. A MAC subheader for fallbackRAR may include three header fields E/T1/RAPID as shown in FIG. 21. A MAC subheader for successRAR may include eight header fields E/T1/T2/S/R/R/R/R as shown in FIG. 21. A MAC subheader for MAC SDU may include the four header fields R/F/LCID/L as shown in FIG. 21. At most one 'MAC subPDU for successRAR' indicating presence of 'MAC subPDU(s) for MAC SDU' may be included in a MAC PDU. MAC subPDU(s) for MAC SDU may be placed immediately after the 'MAC subPDU for successRAR' indicating presence of 'MAC subPDU(s) for MAC SDU'. If MAC PDU includes MAC subPDU(s) for MAC SDU, the last MAC subPDU for MAC SDU may be placed before MAC subPDU with padding as depicted in FIG. 21. Otherwise, the last MAC subPDU in MAC PDU may be placed before padding. The MAC subPDU with padding may include R/R/LCID MAC subheader. The size of padding in the MAC subPDU with padding can be zero. The length of padding may be implicit based on TB size, and/or size of MAC subPDU(s).

The MAC subheader may include the following fields. E: The Extension field may be a flag indicating if the MAC subPDU including this MAC subheader is a last MAC subPDU (other than MAC subPDU for MAC SDU) or not in the MAC PDU. The E field may be set to "1" to indicate at least another MAC subPDU (other than MAC subPDU for MAC SDU) follows. The E field may be set to "0" to indicate that the MAC subPDU including this MAC subheader is the last MAC subPDU (other than MAC subPDU for MAC SDU) in the MAC PDU. T1: The T1 field may be a flag indicating whether the MAC subheader contains a Random Access Preamble ID or T2. The T1 field is set to "1" to indicate the presence of a Random Access Preamble ID field in the subheader (RAPID). The T1 field is set to "0" to indicate the presence of T2 field in the subheader. T2: The T2 field may be a flag indicating whether the MAC subheader contains a Backoff Indicator (BI) or a MAC SDU indicator (S). The T2 field is set to "0" to indicate the presence of a Backoff Indicator field in the subheader. The T2 field is set to "1" to indicate the presence of the S field in the subheader. S: This field may indicate whether 'MAC subPDU(s) for MAC SDU' follow the MAC subPDU including this MAC subheader or not; The S field is set to "1" to indicate presence of 'MAC subPDU(s) for MAC SDU'. The S field is set to "0" to indicate absence of 'MAC subPDU(s) for MAC SDU'. R: Reserved bit (e.g., set to "0"). BI: The Backoff Indicator field may identify the overload condition in the cell. RAPID: The Random Access Preamble IDentifier field may identify the transmitted Random Access Preamble.

Figure 22A:
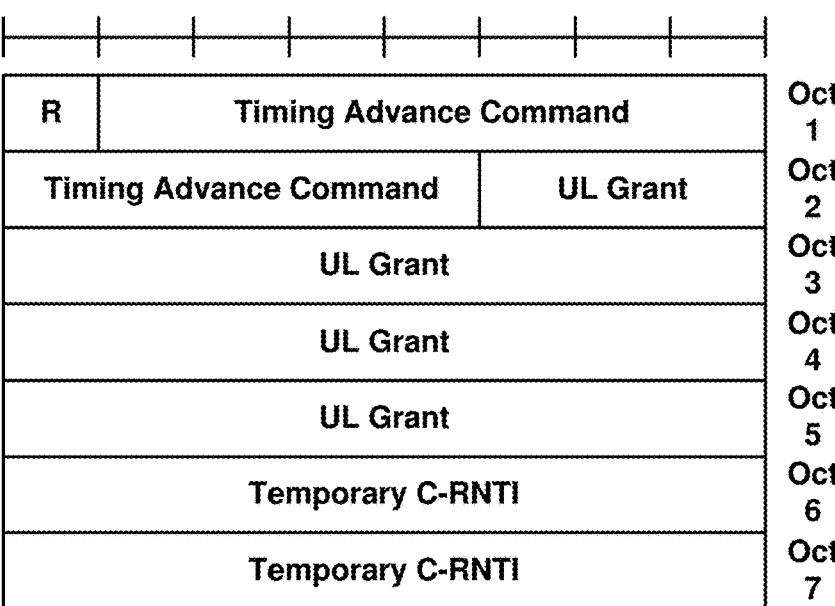
FIG. 22A shows an example of a fallbackRAR, according to some embodiments.

FIG. 22A shows an example of fallbackRAR, according to some embodiments. The fallbackRAR may be of fixed size as depicted in FIG. 22A, and include the following fields. R: Reserved bit (e.g., set to "0"). Timing Advance Command: The Timing Advance Command field may indicate an index value TA used to control the amount of timing adjustment that the MAC entity must apply. The size of the Timing Advance Command field may be 12 bits. UL Grant: The Uplink Grant field may indicate the resources to be used on the uplink, as shown in FIG. 20B. The size of the UL Grant field may be 27 bits. Temporary C-RNTI: The Temporary C-RNTI field may indicate the temporary identity that is used by the MAC entity during Random Access. The size of the Temporary C-RNTI field may be 16 bits.

Figure 22B:
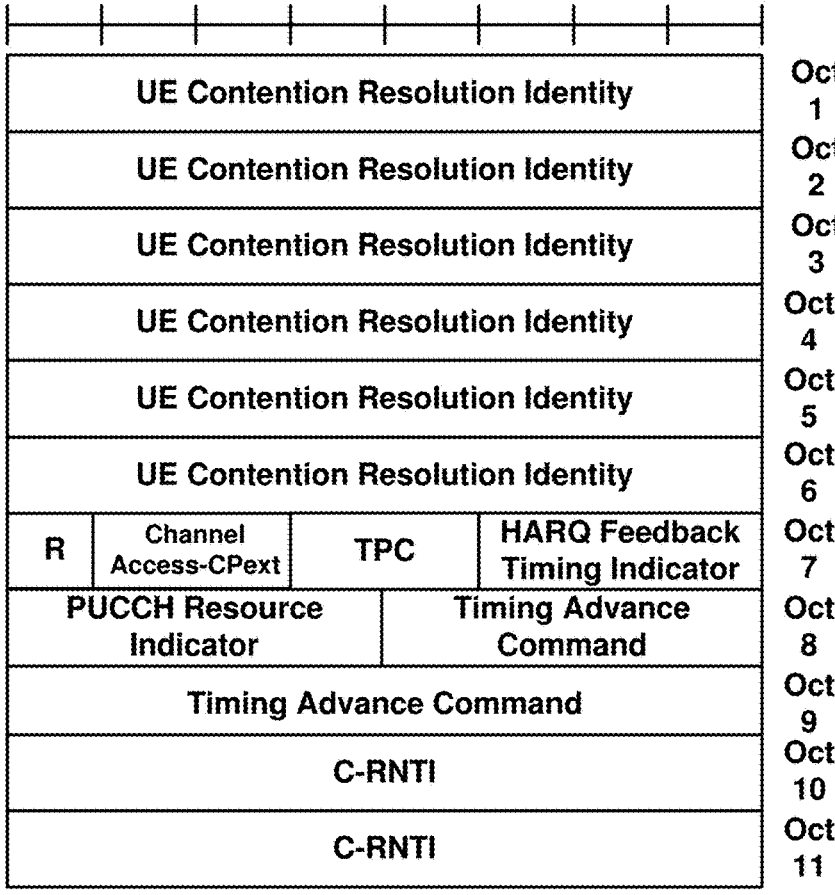
FIG. 22B shows an example of a successRAR, according to some embodiments.

FIG. 22B shows an example of successRAR, according to some embodiments. The successRAR may be of fixed size, and include the following fields. UE Contention Resolution Identity: This field may contain the UL CCCH SDU. If the UL CCCH SDU is longer than 48 bits, this field contains the first 48 bits of the UL CCCH SDU. R: Reserved bit (e.g., set to "0"). ChannelAccess-CPext: The channel access type and CP extension for the PUCCH resource containing the HARQ feedback for MSGB in shared spectrum channel access. The field may only be present when the MSGB HARQ feedback is to be transmitted with shared spectrum channel access. Otherwise, the field may not be present and R bits are present instead. The size of the ChannelAccess-CPext field may be 2 bits. TPC: The TPC command for the PUCCH resource containing HARQ feedback for MSGB. The size of the TPC field may be 2 bits. HARQ Feedback Timing Indicator: The PDSCH-to-HARQ feedback timing indicator field for MSGB HARQ feedback. The size of the HARQ Feedback Timing Indicator field may be 3 bits. PUCCH Resource Indicator: The PUCCH resource indicator for HARQ feedback for MSGB. The size of the PUCCH resource Indicator field may be 4 bits. Timing Advance Command: The Timing Advance Command field may indicate the index value TA used to control the amount of timing adjustment that the MAC entity has to apply. The size of the Timing Advance Command field may be 12 bits. C-RNTI: The C-RNTI field indicates the identity that is used by the MAC entity upon completion of Random Access. The size of the C-RNTI field may be 16 bits.

In an example, a network may group (e.g., multiplex) MAC subPDUs comprising random access responses and/or back-off indicators for multiple UEs in a single MAC PDU. A PDSCH (e.g., Msg2/MsgB PDSCH) comprising the MAC subPDUs may be scheduled by a DCI scrambled by RA-RNTI/MsgB-RNTI. MAC subheaders in the MAC PDU may identify the RAPID of the transmitted preambles. For example, multiple UEs may select different preambles while selecting/using the same PRACH occasion for transmitting the preambles. As a result, the RA-RNTI/MsgB-RNTI values associated with the preamble transmission by multiple UEs may be the same. Examples of RNTI calculation for random access response (for 2-step and 4-step RACH) are given below, which are determined based on the physical resources in time and frequency of the RACH occasion used for preamble transmission.

For coverage enhancement, RA-RNTI associated with the PRACH in which the Random Access Preamble is transmitted, is computed as:

$$RA\text{-}RNTI=1+t\_id+10*f\_id+60*(SFN\_id \bmod(Wmax/ 10))$$

where $t\_id$ may be an index of a first subframe of the specified PRACH ($0 \le t\_id < 10$), $f\_id$ may be an index of the specified PRACH within that subframe, in ascending order of frequency domain ($0 \le f\_id < 6$), $SFN\_id$ may be an index of a first radio frame of the specified PRACH, and Wmax may be 400, maximum possible RAR window size in subframes for UEs in enhanced coverage.

An example of RA-RNTI may be as follows:

$$RA\text{-}RNTI=1+s\_id+14 \times t\_id+14 \times 80 \times f\_id+14 \times 80 \times 8 \times ul\_carrier\_id$$

where $s\_id$ may be an index of a first OFDM symbol of the PRACH occasion (e.g., $0 \le s\_id < 14$), $t\_id$ may be an index of a first slot of the PRACH occasion in a system frame (e.g., $0 \le t\_id < 80$), $f\_id$ may be an index of the PRACH occasion in the frequency domain (e.g., $0 \le f\_id < 8$), and $ul\_carrier\_id$ may be a UL carrier used for a preamble transmission (e.g., 0 for an NUL carrier, and 1 for an SUL carrier).

A MsgB-RNTI associated with a PRACH occasion in which a random access preamble is transmitted, may be computed as:

$$MSGB\text{-}RNTI=1+s\_id+14 \times t\_id+14 \times 80 \times f\_id+14 \times 80 \times 8 \times ul\_carrier\_id+14 \times 80 \times 8 \times 2$$

where $s\_id$ may be an index of a first OFDM symbol of the PRACH occasion (e.g., $0 \le s\_id < 14$), $t\_id$ may be an index of a first slot of the PRACH occasion in a system frame (e.g., $0 \le t\_id < 80$), $f\_id$ may be an index of the PRACH occasion in the frequency domain (e.g., $0 \le f\_id < 8$), and $ul\_carrier\_id$ may be a UL carrier used for a preamble transmission (e.g., 0 for an NUL carrier, and 1 for an SUL carrier).

In an example, a network may not group (e.g., multiplex) MAC subPDUs comprising random access responses and/or back-off indicators for multiple UEs in a single MAC PDU. For example, different characteristic of uplink and/or downlink channels designed for some UEs/UE types in the cell may prevent their RAR/MsgB MAC sub-PDUs to be included/multiplexed in a MAC PDU comprising RAR/MsgB MAC sub-PDUs of other UEs. For example, separate BWPs/channels/RACH resources configured for some UEs/UE types may have different overload/congestion conditions, and thus different back-of indicator values from other UEs in the cell, which may prevent their BI MAC sub-PDUs to be included in a MAC PDU comprising BI MAC sub-PDUs of other UEs.

For example, Reduced Capability (RedCap) UEs may require modified handling of different uplink and/or downlink signals and channels. For example, due to the reduced capability (e.g., reduced supported bandwidth, and/or limited antennas, and/or restricted processing capabilities, and/or prolonged processing time, etc.) the RedCap UE may not be able to effectively use cell-specific resources that have been designed for legacy UEs without those hardware restrictions. For example, RedCap UEs may not be able to support a CORESET and/or search space and/or DL/UL BWP; and/or monitor/receive PDCCH and/or PDSCH; and/or transmit via a PRACH and/or PUSCH and/or PUCCH, that are configured with a bandwidth larger than the maximum supported bandwidth of RedCap (e.g., 20 MHz in FR1 and 100 MHz in FR2). In another example, RedCap UEs may not be able to receive a downlink channel and transmit an uplink channel subsequently wherein the time gap in between the downlink reception and the uplink transmission is shorter than a relaxed processing time supported by RedCap UEs. In another example, due to limited antennas and/or other restrictions, RedCap UE may not be able to transmit/receive using similar configuration parameters as legacy UEs; for example, coverage recovery techniques may be required for RedCap channels and/or signals for a comparable performance with legacy UEs.

For a RedCap UE in RRC_CONNECTED mode, the network may be able to configure UE-specific parameters and schedule resources in an appropriate/suitable way for the specific RedCap restriction/reduced capabilities. However, during initial access, it may not be as simple, because the resources and/or parameters are not UE-specific, but common (e.g., cell-specific and/or group-specific). For example, broadcast PDSCH (SIB), common CORESET #0, RA search space, common PRACH/Msg1/MsgA resources, Msg2/MsgB PDCCH/PDSCH, Msg3 PUSCH, Msg4 PDCCH/PDSCH, etc., configured for legacy UEs may not be supportable by RedCap UEs due to one or more reduced capabilities. Network may have to configure separate parameters/resources/channels for RedCap and/or modify legacy configurations/channels such that RedCap UEs can also support them. For example, network may limit a bandwidth of initial DL/UL BWPs and/or CORESET #0 and/or common PRACH/PDCCH/PDSCH/PUSCH/PUSCH resources. For example, the network may schedule transmissions and receptions via common channels during initial access with relaxed timing and/or coverage recovery techniques. However, this may dramatically degrade a performance of legacy UEs. For example, a data rate of legacy UEs may drop and/or their latency and/or power consumption may significantly increase. Also, a congestion in common BWPs/channels may be increased considering the increased number of UEs (legacy plus RedCap) and the enforced restrictions on resources.

In a cell supporting RedCap UEs, early identification of RedCap UEs from legacy UEs may be desired for the network to differentiate/tailor one or more configuration parameters and/or resources for RedCap signals and channels during initial access. Identification of RedCap UEs may be done during Msg1 (PRACH) transmission. The options may comprise separate initial UL BWP, and/or separate PRACH resources, and/or PRACH preamble partitioning. Early identification of RedCap UE type(s) during transmission of Msg1 may be necessary for: coverage recovery (including link adaptation) for one or more of: Msg2

PDCCH/PDSCH, Msg3 PUSCH and PDCCH scheduling Msg3 reTx, Msg4 PDCCH/PDSCH or PUCCH in response to Msg4, Msg5 PUSCH and associated PDCCH (e.g., if it is determined that coverage recovery for RedCap UEs is necessary for one of more of these channels); identifying UE minimum processing times capabilities for PDSCH processing and PUSCH preparation (e.g., if relaxations to UE min processing times are defined for N1 and N2); identifying UE capability for UL modulation order for Msg3 and Msg5 scheduling (e.g., if relaxations to max UL modulation order (i.e., UL modulation order restricted to lower than 64 QAM) are introduced); or identifying UE max bandwidth capability for Msg3 and Msg5 scheduling and PUCCH in response to Msg4.

Identification of RedCap UE type(s) during transmission of Msg1 may enable efficient handling of different UE minimum processing times between RedCap and non-Red-Cap UEs for: minimum timing between PDSCH carrying RAR (e.g., Msg2/MsgB PDSCH) and start of Msg3 PUSCH; minimum timing between PDSCH carrying Msg4 and the corresponding HARQ-ACK feedback; minimum timing between PDCCH with the reTx grant and the corresponding Msg3 PUSCH retransmission, e.g., if relaxed UE minimum processing times are introduced for RedCap UEs. Identification of RedCap UE type(s) during transmission of Msg1 may enable coverage recovery, including link adaptation, for any one or more of: broadcast PDCCH, PDSCH associated with Msg2, PDSCH associated with Msg4, or PUSCH associated with Msg3, e.g., if coverage recovery is needed for these channels. The option of configuring separate initial UL BWPs, in addition to the above advantages, may enable addressing congestion (if congestion occurs) in the initial UL BWP that may otherwise need to be restricted to the mandatory required BW for RedCap UEs in the band/FR. As a result of early identification of RedCap UEs, legacy (e.g., non-RedCap) UEs may not suffer restricted configurations and degraded performance.

In an example, a network may identify RedCap UEs during Msg1/MsgA transmission, e.g., based on dedicated preamble and/or dedicated PRACH occasion and/or dedicated initial UL BWP. For example, a first type wireless device (e.g., a RedCap UE) may use a first time/frequency/code resource for a first preamble. The first time/frequency/code resource may be determined based on a first PRACH configuration and/or a first UL BWP. A second type wireless device (e.g., a non-RedCap UE) may use a second time/frequency/code resource for a second preamble. The second time/frequency/code resource may be determined based on a second PRACH configuration and/or a second UL BWP.

In an example, in response to the identification, the network may not group (e.g., multiple) RARs (e.g., Msg2 or MsgB) of RedCap and non-RedCap UEs in a same/single PDSCH. A base station may transmit a first PDSCH comprising one or more RARs for the first type wireless device. The base station may transmit a second PDSCH, different from the first PDSCH, comprising one or more second RARs for the second type wireless device. In an example, the network may not schedule a Msg2/MsgB PDSCH using a same/single DCI for RedCap and non-RedCap UEs. The base station may schedule a first DCI scheduling the first PDSCH. The base station may schedule a second DCI, different from the first DCI, scheduling the second PDSCH.

Separate transmissions of RARs (or separate initial access procedure) among different types of wireless devices may be beneficial as requirements on different types of wireless device may be different.

For example, Msg2/MsgB PDCCH and/or PDSCH for RedCap may require coverage recovery techniques, with a smaller bandwidth of the RedCap UEs compared to non-RedCap UEs. For example, Msg2/MsgB PDCCH (broadcast PDCCH) of RedCap UEs may require compact DCI format and/or repetition (e.g., more than non-RedCap repetitions), and/or smaller bandwidth and/or frequency hopping. For example, Msg2/MsgB PDSCH of RedCap UEs may require repetition (e.g., more than non-RedCap UEs) and/or TBS scaling and/or smaller bandwidth and/or frequency hopping to compensate for one or more reduced capabilities. Additional features necessary for the first type wireless devices (e.g., RedCap UEs) may require separate transmissions of RARs (or independent initial access procedure) between RedCap UEs and non-RedCap UEs.

In an example, TBS restriction and scaling may be beneficial for increased wireless device operation efficiencies, which also leads to a wireless device cost reduction. Reducing TBS for DL and UL leads to reduced requirement on DL/UL processing, Polar/LDPC decoding and HARQ buffering. For example, a number of or complexity of channel decoding related modules (e.g., LDPC decoding, HARQ buffering) and/or MIMO related modules (e.g., Post-FFT data buffering, receiver processing block) of the wireless device may be reduced. Restricting/scaling the TBS may result in restricting a maximum number of physical resource blocks (PRBs) for a PDSCH/PUSCH, which is beneficial for coverage enhancement of these channels. For example, TBS reduction (e.g., in addition to bandwidth reduction, modulation order reduction, and/or # of MIMO layers reduction) can be beneficial for UEs with low data rate requirements. In an example, the reduced 20 MHz bandwidth and 64 QAM modulation order may lead to rather large TB sizes compared to peak rate requirements for some of the identified RedCap use-cases. Such TBS reduction could be defined as optional feature instead of baseline (e.g., for low-end UEs).

Currently, TBS scaling is supported for broadcast paging and RAR to effectively achieve lower spectral efficiencies. For example, a TBS scaling factor of 0.5 or 0.25 can be dynamically indicated in the DCI scheduling RAR for TBS determination. However, the existing TBS scaling factors might not be enough for restricting a TB size of a PDSCH comprising the RAR associated with some wireless devices (e.g., low-end RedCap UEs). For example, RedCap devices and/or IIOT devices might have very small data transmissions, and/or not require a maximum data rate. However, there might be different types of UEs in a cell, and scheduling a RAR for different types of UEs might require different considerations.

For example, if the RAR for all UEs in a cell are scaled down based on the low-end/redcap/IIOT UEs, using a common/same TBS scaling factor, then other UEs (e.g., high-end UEs) performance may be deteriorated. Therefore, it is desirable to enable the network to schedule RARs for different types of UEs in the cell using a wide range of TBS scaling factors. Embodiments propose a first set of values (e.g., a first table) defined/configured/used for TBS scaling for the low-end devices and a second set of values (e.g., a second table) defined/configured/used for TBS scaling for the high-end devices. Based on the embodiments, the network can effectively use the available TB S scaling factors to schedule RARs for all types of UEs in the cell with respect to their capabilities/feature/requirements that are identified by the network via the preamble transmission.

In an example, network may not use a same/single MAC subPDU for indicating back-off indicator and/or RAR to RedCap and non-RedCap UEs. For example, the content/ fields of the MAC subPDU for RedCap UEs may not be the same as those for non-RedCap UEs. For example, a BI value for RedCap may be different. For example, timing advance command and/or UL grant for RedCap may be different (e.g., following different scheduling criteria). For example, RedCap UEs may require longer PDSCH processing and/or PUSCH preparation time for Msg3 PUSCH transmission. For example, the frequency resource allocation for RedCap Msg3 PUSCH may follow a restricted bandwidth (e.g., with and/or without hopping). For example, Msg3 PUSCH for a RedCap UE may require less/more number of repetitions than non-RedCap a UE.

Supporting the requirements for RedCap UE may enable/ enhance initial access of these UEs. Separating one or more configurations and/or channels for RedCap UEs during initial access may avoid degrading the non-RedCap UE performance due to the RedCap restrictions. A simple solution to support independent initial access procedure for different types of UEs may be to have the network configure an independent initial DL/UL BWP for each type of UEs. In an example, the network may configure a first initial DL/UL BWP for non-RedCap UEs and a second initial UL/DL BWP, different from the first initial DL/UL BWP, for RedCap UEs. Based on configuring independent initial DL/UL BWP among or for respective different types of UEs, UL and/or DL signals and channels during an initial access procedure of RedCap UEs may be separated from those of the legacy UEs. For example, the base station may be able to provide different features and/or configuration parameters related to an initial access among different types of UEs. For example, the base station may be able to configure/indicate independent coresets, PRACH configurations, enable/disable of repetitions during the initial access, and/or PUCCH resources (e.g., CORESET #0, RA search space, PRACH resources, Msg2/MsgB PDCCH, Msg2/MsgB PDSCH, Msg3 PUSCH, Msg3 retransmission PDCCH, Msg4 PDCCH/PDSCH, Msg5 PUCCH, etc) between RedCap UEs and non-RedCap UEs.

However, separating an initial UL/DL BWP may require increased complexity and overhead for the network, not only to configure them, but also to maintain them and manage the signaling and resource allocation across them at the same time. Moreover, this approach may require more resources allocated for supporting multiple UL/DL BWPs when the network supports multiple types of UEs. Enhanced solutions without requiring separate initial DL/UL BWP for RedCap UEs are needed.

In an example, the network may configure shared initial UL/DL BWPs for different types of UEs (e.g., RedCap and legacy UEs), and separate CORESET(s)/search space(s), to enable transmitting dedicated Msg2/MsgB PDCCH and/or PDSCH for RedCap UEs. Alternatively, to maintain a flexible resource allocation, e.g., depending on a load of each UE type in the cell, the network may configure shared CORESET(s)/search spaces for, e.g., RedCap and legacy UEs. In an example, the network may configure separate search spaces for legacy and RedCap UEs, but the PDCCH monitoring occasions of the separate search spaces may overlap. In an example, different RA-RNTI/MsgB-RNTI formulas may be defined for RedCap UEs, however, a RA-RNTI/MsgB-RNTI space may be limited and not enough to support dedicated values for RedCap UEs, e.g., without colliding/overlapping with values for legacy UEs.

In an example, a first type wireless device (e.g., a RedCap UE) may share an initial DL/UL BWP with a second type (e.g., non-RedCap UE) wireless device. To enable different features for the first type wireless device and the second type wireless device, a base station and a wireless device may determine a DCI format used for an initial access procedure based on a type of the wireless device.

In an example, a wireless device, of a first type of a plurality of types of wireless devices, may receive one or more RRC messages comprising configuration parameters of an initial access procedure (e.g., a random access procedure) for wireless devices of the first type. For example, the plurality of types may comprise the first type and a second type. For example, the first type may be a RedCap UE. For example, the second type may be a non-RedCap UE.

In some embodiments, the wireless device may transmit a preamble based on the configuration parameters. The wireless device may determine, in response to the wireless device being the first type, a first DCI format of a plurality of DCI formats. For example, the wireless device of the first type may select the first DCI format to be used for receiving and processing DCIs received from a base station. For example, the plurality of DCI formats may comprise a DCI format 1_0. The DCI format 1_0 may be used for the second type of wireless device. For example, the plurality of DCI formats may comprise a DCI format 1_3. The DCI format 1_3 may be used for the first type of wireless device. The first DCI format may comprise one or more information fields specific to the random access procedure of the first type of wireless device. For example, the one or more information fields may comprise a number of repetition indicated for a Msg 3. For example, the one or more information fields may comprise a number of repetition for a control transmission or a transport block transmission. For example, the one or more information fields may comprise a TBS scaling parameter. Based on the determining the first DCI format, the wireless device may receive a DCI indicating a RAR corresponding to the preamble. The wireless device may determine the one or more information fields based on the configuration parameters. For example, the configuration parameters may indicate one or more features to be enabled for the initial access of the first type wireless device. The wireless device may receive the RAR based on the one or more information fields.

In some embodiments, the network may use different DCI formats to schedule separate information and/or apply separate transmission techniques (e.g., coverage recovery, relaxed processing time, etc.) to Msg2/MsgB PDCCH and/ or PDSCH of a first type (e.g., RedCap UEs) from a plurality of types of wireless devices. For example, a legacy UE (which may be a second type of wireless devices) may monitor a first DCI format for random access response, while a RedCap UE (e.g., the first type of wireless devices) may monitor a second DCI format (e.g., in a same/over-lapped search space) for a random access response. In an example, one or more information fields indicated by the second DCI format (and not the first DCI format) may be needed for non-RedCap UEs. In an example, it may be desirable to reduce a number of DCI formats (e.g., sizes/bit lengths of DCI formats) such that a PDCCH blind decoding, and thus, power consumption of a wireless device is not increased.

There is a need to enable effective/dedicated separation of one or more initial access resources and/or signals for receiving random access response by a RedCap UE (e.g., identified during Msg 1/MsgA transmission). For example, there is a need to enable dedicated Msg2/MsgB PDCCH and/or PDSCH in a shared/overlapped search space, such that specific transmission features/techniques/parameters for the PDCCH/PDSCH (e.g., repetition, TBS scaling, etc.) are enabled, and/or different information fields/bits within the DCI/PDSCH (e.g., parameters needed for RedCap resource allocation) can be indicated to RedCap UEs. The present disclosure provides one or more solutions for partitioning radio resources of different types of wireless devices including between RedCap UE and non-RedCap UE to enable receiving dedicated random access response and/or back-off indicator that is designed for/addressed to one or more RedCap UEs.

Embodiments may enable dedicated control information (DCI scheduling Msg2/MsgB) for scheduling of RedCap random access response, e.g., while one or more enhancements/recovery/adaptation techniques are considered/configured for RedCap initial access. The embodiments may propose one or more DCI formats specific to RedCap UEs, and/or specific interpretation/determination of information fields of a common (existing) DCI format in a way tailored for enhancements/recovery of RedCap UEs. The embodiments may enable efficient (e.g., reducing latency) random access procedure for RedCap UEs, while reducing the impact on legacy UEs, and avoiding increasing signaling overhead and/or resource consumption.

One or more UE types/categories may be defined for wireless devices. The one or more UE types/categories may be defined based on an operating frequency band and/or one or more capabilities of the UE. The one or more capabilities may comprise: reduced bandwidth; reduced antennas; relaxed processing time; restricted processing capabilities such as modulation and coding capability, etc. A UE type/category may be associated with one or more of the capabilities considered for RedCap devices, and/or one or more enhancements considered for coverage recovery/enhancement and/or small data transmission and/or a combination thereof. A first capability associated with a UE type/category may be mandatory for RedCap UEs. A second capability associated with a UE type/category may be optional for RedCap UEs. A third capability associated with a UE type/category may be mandatory for legacy UEs. A fourth capability associated with a UE type/category may be optional for legacy UEs.

Throughout this disclosure, a "first type of UE" and/or a "first-type UE" may refer to RedCap UE and/or NR-Light (NR-lite) and/or enhanced UE (e.g., supporting coverage enhancement). For example, proposals for "RedCap UE" may be applied to other types of special UEs (e.g., as opposed to legacy/non-RedCap/non-enhanced UEs of NR Rel. 16 and before), for example, to an "enhanced UE" and/or UEs supporting small data transmission, etc. In an example, an enhanced UE may require separate signaling/ design from legacy UEs to enable use of the enhanced features (e.g., higher data rates, power, processing capabilities, etc.). In an example, being a first-type UE may refer to a use case scenario of the wireless device. For example, an eMBB, URLLC, NR-Light, eMTC, mMTC, or NB-IoT device may have different capabilities and may be associated with different UE types/categories.

Per one or more embodiments of the present disclosure, a first type UE may receive one or more RRC messages comprising configuration parameters of a cell. The configuration parameters may indicate that first type devices are allowed to access the cell (e.g., based on cell barring information). The configuration parameters may comprise first parameters indicating at least one initial UL BWP of the cell. An initial UL BWP may be dedicated to first type UEs.

An initial UL BWP may be common/shared between legacy UEs and first type UEs. The first parameters may indicate one or more RACH configurations comprising RACH resources for the at least one initial UL BWP. RACH resources may comprise periodic RACH occasions for transmitting preambles. A RACH configuration may be dedicated to first type UEs. A RACH configuration may be common/ shared between legacy UEs and first type UEs. For example, first parameters may indicate a first RACH configuration on a first initial UL BWP. For example, second parameters may indicate a second RACH configuration on a second initial UL BWP. For example, the first initial UL BWP may be dedicated to first type UEs. The initial UL BWP may have a first bandwidth comprising a number of RBs. The first bandwidth may be equal to or less than a bandwidth supported by a first type UE (e.g., 20 MHz in FR1 and 100 MHz in FR2).

For example, the first parameters may indicate for a RACH configuration: one or more preambles, each associated with one or more SSBs, wherein one or more first preambles if the preambles may be dedicated/specific to first-type UEs, and in an example, the one or more preambles of the RACH configuration may be common/shared between legacy UEs and first-type UEs; RACH resources comprising time resources of RACH occasions and frequency resources of RACH occasions, wherein a RACH occasion may be associated with at least one preamble, and a RACH occasion may be dedicated/specific to first-type UEs, and in an example, the RACH occasions of the RACH configuration may be common/shared between legacy UEs and first-type UEs.

In an example, the first parameters may comprise one or more parameters indicating one or more enhancements and/or specific handling of initial access signals and/or channels associated with a random access procedure. For example, the one or more parameters may indicate that a coverage recovery may be applied to at least one channel/ message of a random access procedure, comprising: Msg1 PRACH, MsgA PRACH, MsgA PUSCH, Msg2 PDCCH, Msg2 PDSCH, MsgB PDCCH, MsgB PDSCH, Msg3 PUSCH, PDCCH scheduling Msg3 retransmission, Msg4 PDCCH, Msg4 PDSCH, Msg5 PUCCH, etc. For example, the one or more parameters may indicate one or more repetition numbers for transmission of one or more of the above signals/channels for first-type UEs. For example, the one or more repetition numbers may be dedicated to random access procedure of the first-type UEs and/or may be different from one or more second repetition numbers configured/indicated for random access procedure of second-type UEs (e.g., legacy UEs, if configured). For example, the one or more parameters may indicate one or more modulation orders and/or modulation and coding scheme (MCS) tables for transmission of one or more of the above messages/ channels specific/dedicated to first-type UEs. For example, the one or more modulation orders and/or MCS tables may be dedicated to random access procedure of the first-type UEs and/or may be different from one or more second modulation orders and/or MCS tables configured/indicated for random access procedure of second-type UEs (e.g., legacy UEs, if configured). For example, the one or more parameters may indicate one or more transport block (TB) scaling values/factors for transmission of one or more of the above messages/channels for first-type UEs. For example, the one or more TB scaling values/factors may be dedicated to random access procedure of the first-type UEs and/or may be different from one or more second TB scaling values/factors configured/indicated for random access procedure of second-type UEs (e.g., legacy UEs, if configured). In an example, the one or more parameters may indicate at least one bandwidth scaling factor for one or more of the above messages/channels for first-type UEs. For example, the first-type UE may determine a frequency domain resource allocation based on an indicated field in a DCI and the bandwidth scaling factor. In an example, the one or more parameters may indicate a frequency hopping for one or more of the above messages/channels for first-type UEs.

In an example, the one or more parameters may indicate a first processing time for the first-type UEs (e.g., a N1 minimum PDSCH processing time, and/or a N2 minimum PUSCH preparation time), that may be different from a second processing time of a second-type UEs (e.g., normal/legacy UEs). The first processing time may depend on a numerology of the initial UL/DL BWP. For example, a first PDSCH processing (decoding) time and/or a first PUSCH preparation time may be indicated for the first-type UEs of different capability(ies), e.g., different from a second PDSCH processing (decoding) time and/or a second PUSCH preparation time associated with second-type UEs (e.g., legacy UEs). In an example, the one or more parameters may indicate a first RAR/MsgB window size for the random access procedure of the first-type UEs that may be longer than/different from a second RAR/MsgB window size of second-type UEs (e.g., legacy UEs). In an example, the one or more parameters may indicate a first RSRP threshold for the random access procedure of the first-type UEs (e.g., for SUL and/or for 2-step RA and/or for coverage enhancement determination), that may be different from a second RSRP threshold configured for the random access procedure of second-type UEs (e.g., legacy UEs). In the above examples, the parameters indicated by the one or more parameters may be specific to the first-type UEs and may not be configured for second-type/legacy UEs.

The configuration parameters in the RRC message may comprise second parameters indicating an initial DL BWP of the cell. The initial DL BWP may have a first bandwidth comprising a number of RBs. The first bandwidth may be larger than a maximum supported bandwidth of first-type UEs. The initial DL BWP may comprise one or more CORESETs. A CORESET may be associated with one or more search spaces (e.g., CSS). A search space may comprise periodic PDCCH monitoring occasions for receiving one or more DCIs. For example, a search space may be dedicated to first type UEs. For example, a search space may be common/shared between legacy UEs and first type UEs. For example, the second parameters may indicate for the search space: a search space ID, an ID of an associated CORESET, a periodicity and an offset for PDCCH monitoring slots, a duration of the search space (e.g., number of consecutive slots that a search space lasts in every occasion), monitoring symbols within a slot, a number of PDCCH candidates per aggregation level, a search space type (e.g., UE-specific or common), and one or more DCI formats associated with the search space. A DCI format may correspond to a size (e.g., bit length) of DCI. A wireless device may have to perform blind decoding in every PDCCH candidate/monitoring occasion of a search space for receiving DCI(s) corresponding to configured DCI formats.

For example, the second parameters may indicate a random access (RA) search space. The RA search space may be a common search space. The RA search space may be dedicated to first-type UEs and may overlap with a second RA search space configured for second-type UEs (e.g., legacy UEs). A wireless device may initiate a random access procedure (e.g., 4-step RA or 2-step RA). The wireless device may be a of first type, or may be a first-type UE. For example, the wireless device may have reduced capability(ies) (e.g., RedCap UE), and/or may be associated with coverage enhancement features. The wireless device may transmit a preamble to the base station. For example, the preamble may be specific/dedicated to first-type wireless devices. For example, the preamble may be shared among first-type UEs and second-type (e.g., legacy) UEs. The wireless device may transmit the preamble via a first RACH occasion (RO). The first RO may be dedicated to first-type UEs. For example, the first parameters of the RACH configuration may indicate one or more first RACH resources (e.g., time resources and/or frequency resources of one or more first ROs) dedicated to first-type UEs. For example, the second-type/legacy UEs may not use the one or more first ROs. For example, the base station may determine/identify a type of the wireless device based on the preamble transmission. For example, the base station may determine/identify that the wireless device is a first-type UE based on the preamble and/or the first RO being dedicated to the first-type UEs.

In response to the preamble transmission, the UE may monitor one or more PDCCH monitoring occasions of the search space (e.g., RA search space) for receiving one or more DCIs indicating a random access response (RAR) and/or MsgB. The UE may monitor the PDCCH monitoring occasions during a RAR/MsgB window (e.g., while the window is running). The UE may monitor the monitoring occasions for a DCI format with CRC scrambled by a first identifier, e.g., RA-RNTI/MsgB-RNTI. The UE may determine the identifier based on time resources and frequency resources of the first RO used for preamble transmission. A first type UE and a second type (e.g., legacy) UE may use a same formula for determining the RA-RNTI/MsgB-RNTI values. In an example, if the one or more first ROs dedicated to first type UEs are not shared with legacy UEs, then the values of RA-RNTI/MsgB-RNTI used by first-type UEs and legacy UEs may be partitioned. In an example, first type UE and second type UE may determine one or more information fields of the DCI format scrambled by the RA-RNTI/MsgB-RNTI differently, e.g., based on different rules/parameters. In an example, the DCI reception (e.g., determination of information fields of the DCI format) for the legacy UEs and the first-type UEs may not be confused, e.g., when the RNTI of the DCI is partitioned. For example, the base station may transmit a DCI dedicated to first-type UEs, and based on the separate values of the RNTIs, a second type/legacy UE may not receive the DCI, and thus, may not try to decode it and determine the information fields, so no confusion may arise for the legacy UEs.

In some embodiments, a UE (first type UE and/or legacy UE) may monitor PDCCH for RAR(s)/MsgB(s) identified by the RA-RNTI/MsgB-RNTI while the RAR/MsgB window is running. For example, a first-type UE may monitor the PDCCH monitoring occasions for a first DCI format with CRC scrambled by RA-RNTI/MsgB-RNTI associated with a first RO used for preamble transmission. For example, a legacy UE may monitor the PDCCH monitoring occasions for a second DCI format with CRC scrambled by RA-RNTI/MsgB-RNTI associated with a second RO used for preamble transmission. For example, the first DCI format may comprise one or more first information fields for scheduling a PDSCH comprising RARs/MsgBs specific to first-type UEs (e.g., Msg2 PDSCH and/or MsgB PDSCH). In an example, the RARs/MsgBs may be specific to first-type UEs. In an example, the scheduling of the PDSCH may be specific to first-type UEs.

For example, the second DCI format may comprise one or more second information fields for scheduling a PDSCH comprising RARs/MsgBs for legacy UEs (e.g., Msg2

PDSCH and/or MsgB PDSCH). The one or more first information field may indicate different parameters/information from the one or more second information fields. For example, a first information field from the one or more first information fields may indicate a same information (e.g., frequency domain resource allocation, time domain resource allocation, MCS, TB scaling, etc.) as a second information field from the one or more second information fields. For example, a size/length of the first information field in the first DCI format may be different from a size/length of the second information field in the second DCI format.

For example, the one or more first information fields of the first DCI format may indicate information for enhanced/specific scheduling of Msg2/MsgB PDSCH. The enhanced/specific scheduling of Msg2/MsgB PDSCH may be for wireless devices of the first-type (e.g., RedCap UEs and/or enhanced UEs supporting coverage enhancement). For example, the one or more first information fields of the first DCI format may indicate a number of repetitions for the Msg2/MsgB PDSCH. For example, the one or more first information fields of the first DCI format may indicate a redundancy version (RV) for the Msg2/MsgB PDSCH. For example, the one or more first information fields of the first DCI format may indicate a new data indicator (NDI) for the Msg2/MsgB PDSCH. For example, the one or more first information fields of the first DCI format may indicate a MCS index/TB scaling (based on a first MCS/TB scaling table dedicated/predefined/configured for first-type UEs) for the Msg2/MsgB PDSCH. For example, the one or more first information fields of the first DCI format may indicate a scaling value for a duration of RAR/MsgB window. For example, the one or more second information fields of the second DCI format may not indicate a repetition number and/or RV and/or NDI for the Msg2/MsgB PDSCH.

In an example, the first-type UE and the legacy UE may monitor the PDCCH monitoring occasions for a DCI format (e.g., a same DCI format) with CRC scrambled by RA-RNTI/MsgB-RNTI associated with a corresponding RO used for preamble transmission. In an example, one or more information fields of the (same) DCI format may be different for the legacy UE and the first-type UE. For example, the DCI format (with a certain size/length) may comprise one or more first information fields for the first-type UEs. For example, the DCI format (with the certain size/length) may comprise one or more second information fields for the second-type (e.g., legacy) UEs. For example, the DCI format may comprise one or more first information fields if the configuration parameters in the SIB indicate an enhancement/specific scheduling/parameter and/or a first value for a first parameter of the random access procedure; e.g., for Msg2/MsgB scheduling of first-type UEs. For example, the DCI format may not comprise one or more first information fields if the configuration parameters in the SIB do not indicate an enhancement/specific scheduling/parameter and/or the first value for a first parameter of the random access procedure; e.g., for Msg2/MsgB scheduling of first-type UEs. For example, the DCI format (with the certain size/length) may comprise one or more second information fields if the configuration parameters in the SIB do not indicate an enhancement/specific scheduling/parameter for the random access procedure; e.g., for Msg2/MsgB scheduling of first-type UEs, and/or indicate a different value for the first parameter. For example, the DCI format may comprise one or more first information fields in response to a cell supports first-type UEs. For example, a wireless device of the first-type UEs may determine whether the supports first-type UEs based on a cell barring information in a SIB. The SIB may not indicate the cell barring, then the wireless device may determine that the cell supports the first-type UEs. For example, the DCI format may comprise the one or more first information fields based on one or more pre-configured information available on the wireless device's hardware.

In an example, a size/length of a first information field in the DCI format indicating a specific information under a first condition may be different from a size/length of a second information field in the DCI format indicating the same specific information under a second condition. The CRC of the DCI format may be scrambled by a same RNTI under the first condition and the second condition (e.g., RA-RNTI, MsgB-RNTI). For example, the first condition may be that the UE is a first-type UE. For example, the second condition may be that the UE is a second-type (e.g., legacy and/or non-first-type) UE. For example, the first condition may be that the RRC (e.g., SIB) message comprises a first parameter and/or indicates a first value for the first parameter. For example, the second condition may be that the RRC (e.g., SIB) message does not comprise the first parameter and/or indicates a second value for the first parameter. The first parameter may indicate a specific (e.g., specific to first-type UEs) Msg2/MsgB PDCCH repetition. The first parameter may indicate a specific entry (e.g., specific to first-type UEs) of a MCS/TB scaling table. The first parameter may indicate a specific (e.g., specific to first-type UEs) processing time (e.g., PDSCH processing time and/or PUSCH preparation time). The first parameter may indicate a specific (e.g., specific to first-type UEs) bandwidth and/or frequency domain scaling for a Msg2/MsgB PDSCH.

Figure 23:
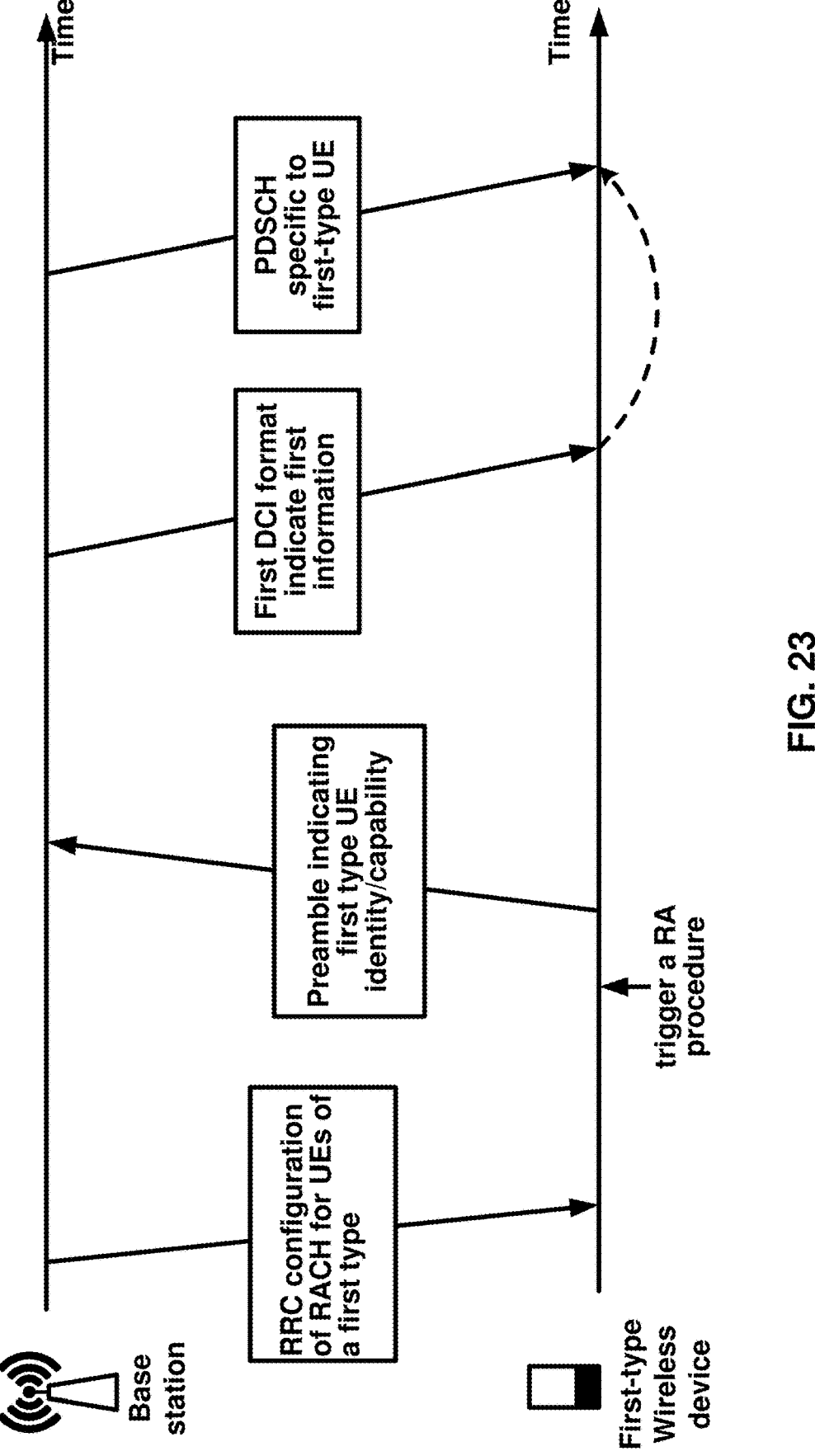
FIG. 23 shows an example of a random access procedure for a first-type UE, according to some embodiments.

FIG. 23 shows an example of random access procedure for a first-type UE (wireless device), according to some embodiments. As shown in FIG. 23, the first-type UE may receive an RRC message comprising configuration parameters of RACH resources. The RACH resources may indicate one or more resources (e.g., preamble and/or RACH occasions) dedicated to first-type UEs. The first-type UE may trigger a random access procedure (e.g., 2-step RA or 4-step RA). The first type UE may transmit a first preamble via a first RACH occasion (RO) to the base station as a Msg1 or part if a MsgA transmission. The first preamble and/or the first RO may indicate that the Msg1/MsgA is transmitted by a wireless device of the first-type. For example, the first preamble and/or the first RO may be configured for wireless devices of a first-type with a first capability/identity. In response to receiving the first preamble via the first RO, the base station may transmit a PDCCH addressed to a first RNTI (e.g., RA-RNTI/MsgB-RNTI) associated with the first RO. The wireless device may monitor PDCCH monitoring occasions for receiving a first DCI format (e.g., based on a first size/bit length). The RRC configuration parameters may configure/indicate the first DCI format for the first-type UEs in a common search space (e.g., RA search space). The first DCI format may comprise one or more information fields indicating one or more first information for scheduling an RAR/MsgB for the first-type UE(s). For the example, the one or more first information may enable an enhanced scheduling of Msg2/MsgB specific to capabilities and/or requirements and/or enhancements of wireless devices of the first-type. The first-type UE may receive a DCI based on the first DCI format. The DCI may schedule a Msg2/MsgB PDSCH. The PDSCH may be specific to first type UEs. For example, the DCI/first DCI format may indicate a repetition number and/or RV and/or NDI for the Msg2/MsgB PDSCH, specific to first-type UEs.

A legacy UE, in response to preamble transmission, may monitor PDCCH monitoring occasions for receiving a second DCI format (e.g., based on a first size/bit length). The second DCI format may be addressed to the first RNTI (RA-RNTI/MsgB-RNTI). The RRC configuration parameters may configure/indicate the second DCI format for the legacy UEs in a common search space (e.g., RA search space). The second DCI format may comprise one or more information fields indicating one or more second information for scheduling an RAR/MsgB for the legacy UE(s). For the example, the one or more second information may not enable an enhanced scheduling of Msg2/MsgB specific to capabilities and/or requirements and/or enhancements of wireless devices of the first-type. The legacy UE may receive a DCI based on the second DCI format. The DCI may schedule a Msg2/MsgB PDSCH. The PDSCH may be specific to legacy UEs. For example, the DCI/second DCI format may not indicate a repetition number and/or RV and/or NDI for the Msg2/MsgB PDSCH.

Figure 24:
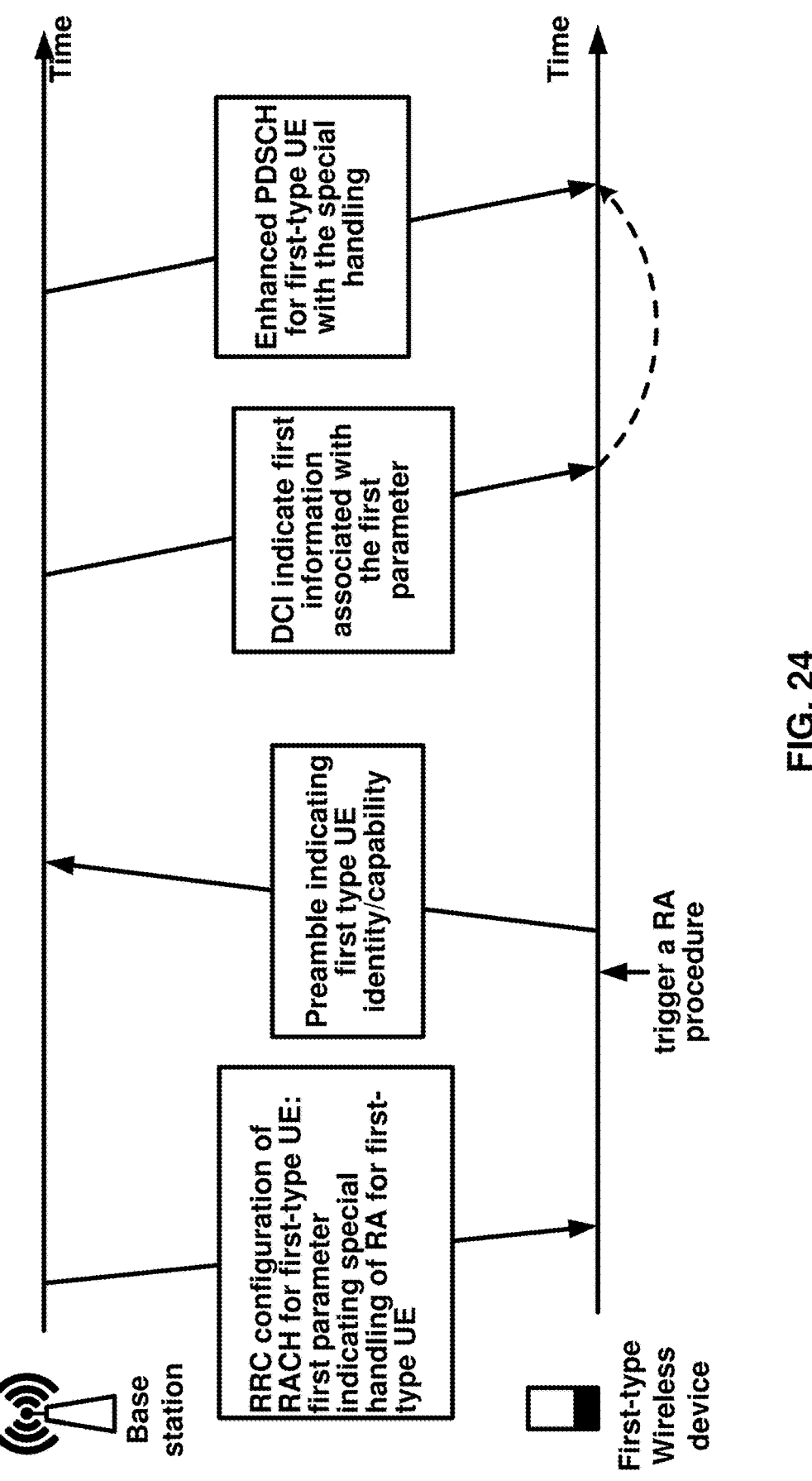
FIG. 24 shows an example of a random access procedure for a first-type UE, according to some embodiments.

FIG. 24 shows an example of random access procedure for a first-type UE (wireless device), according to some embodiments. As shown in FIG. 24, the first-type UE may receive an RRC message comprising configuration parameters of RACH resources. The RACH resources may indicate one or more resources (e.g., preamble and/or RACH occasions) dedicated to first-type UEs. The configuration parameters may comprise a first parameter. The configuration parameters may comprise one or more first parameters. The first parameter(s) may indicate that one or more enhancement specific to the random access procedure of the first-type UEs is enabled/activated/configured. The first parameter(s) may indicate a special handling of one or more channels/signals/messages of the random access procedure for the first-type UEs.

For example, the first parameter(s) may indicate a repetition/slot aggregation for Msg2/MsgB PDCCH and/or PDSCH of first-type UEs. For example, the first parameter(s) may indicate that a first DCI format, dedicated to first-type UEs, is configured for a search space. For example, the first parameter(s) may indicate a CORESET bundling and/or separate aggregation level for PDCCHs of the first-type UEs. For example, the first parameter(s) may indicate that a frequency hopping (e.g., based on a specific method, e.g., intra-slot/inter-slot hopping and/or BWP hopping) is enabled/activated/configured for Msg2/MsgB PDCCH and/or PDSCH of first-type UEs. For example, the first parameter(s) may indicate a first MCS table (e.g., lower MCS values/table) for PDSCH (e.g., Msg2/MsgB PDSCH) of first type UEs. For example, the first parameter(s) may indicate an increased repetition/aggregation factor for Msg2/MsgB PDSCH reception of first-type UEs compared to normal/legacy/second-type UEs. For example, the first parameter(s) may indicate a cross-slot/cross-repetition channel estimation for Msg2/MsgB PDSCH of the first type UEs. For example, the first parameter(s) may indicate an increased granularity of PRB bundling for Msg2/MsgB PDCCH/PDSCH of the first type UEs compared to normal/legacy/second type UEs. For example, the first parameter(s) may indicate a bandwidth scaling factor for Msg2/MsgB PDCCH/PDSCH of the first type UEs. For example, the first parameter(s) may indicate a relaxed/increased processing time (e.g., a PDSCH processing time table and/or PUSCH preparation time table) for the first type UEs compared to normal/legacy/second type UEs. In an example, the first parameter may indicate that a search space comprising PDCCH monitoring occasions for receiving a DCI scheduling random access response/MsgB, is configured with/supports the first DCI format.

The first-type UE may trigger a random access procedure (e.g., 2-step RA or 4-step RA). The first type UE may transmit a first preamble via a first RACH occasion (RO) to the base station as a Msg1 or part if a MsgA transmission. The first preamble and/or the first RO may indicate that the Msg1/MsgA is transmitted by a wireless device of the first-type. For example, the first preamble and/or the first RO may be configured for wireless devices of a first-type with a first capability/identity. In response to receiving the first preamble via the first RO, the base station may transmit a PDCCH addressed to a first RNTI (e.g., RA-RNTI/MsgB-RNTI) associated with the first RO. The wireless device may monitor PDCCH monitoring occasions for receiving a first DCI format (e.g., based on a first size/bit length). For example, the wireless device may monitor PDCCH based on the first DCI format if the first parameter(s) is configured (e.g., the RRC message comprises the first parameter(s)). For example, the wireless device may monitor PDCCH based on a second DCI format if the first parameter(s) is not configured (e.g., the RRC message does not comprise the first parameter(s)). For example, the second DCI format may be a legacy/common DCI format (e.g., fallback DCI, DCI format 1_0).

As shown in FIG. 24, the first DCI format may comprise one or more information fields indicating one or more first information for scheduling an RAR/MsgB for the first-type UE(s). The one or more information fields may be associated with the first parameter(s) indicated in the RRC message for the special handling/enhancement(s). For the example, the one or more first information may enable an enhanced scheduling of Msg2/MsgB specific to capabilities and/or requirements and/or enhancements of wireless devices of the first-type. The first-type UE may receive a DCI based on the first DCI format. The DCI may schedule a Msg2/MsgB PDSCH. The PDSCH may be an enhanced PDSCH, e.g., specific to first type UEs. For example, the DCI/first DCI format may indicate a repetition number and/or RV and/or NDI for the Msg2/MsgB PDSCH, specific to first-type UEs.

In some embodiments, a first type UE may monitor a PDCCH based on a first DCI format among a plurality of DCI formats. In an example, a second type UE (e.g., legacy UE) may monitor the PDCCH based on a second DCI format of the plurality of DCI formats. The second DCI format may be different from the first DCI format. For example, a length of the first DCI format may be shorter than a length of the second DCI format. For example, the first DCI format may be a compact DCI.

In some embodiments, a first plurality of DCI fields of the first DCI format and a second plurality of DCI fields of the second DCI format may be determined based on one or more predefined rules. For example, given a bandwidth of an initial DL BWP/CORESET #0 associated with the first/second DCI format, a size/length and/or structure of the first/second DCI format may be determined based on one or more predefined/fixed rules. For example, the first DCI format may comprise one or more first information fields (e.g., DCI fields). For example, a DCI based on the first DCI format may be scrambled by a first RNTI (e.g., RA-RNTI and/or MsgB-RNTI). For example, the second DCI format may comprise one or more second information fields. For example, a second DCI based on the second DCI format may be scrambled by the first RNTI. The one or more first information fields may comprise the one or more second information fields (e.g., indicate same information). In an example, a size/length of at least one of the one or more first information fields may be different (e.g., smaller or larger) than a size/length of at least one of the one or more second information fields indicating the same information (e.g., FDRA, TDRA, MCS, TB scaling, etc.).

FIG. 25A shows an example of the second DCI format, according to some embodiments. The second DCI format may be a common/legacy DCI format. The second DCI format may be a DCI format 1_0. The second DCI format may comprise the following information fields: FDRA, TDRA, VRB to PRB mapping, MCS, TB scaling, SFN, and Reserved. A size of the second DCI format may be determined based on a fixed rule (e.g., based on a bandwidth of the initial DL BWP and/or CORESET #0).

FIG. 25B shows an example of the first DCI format, according to some embodiments. The first DCI format may be dedicated to first type UEs. A first type UE may monitor a PDCCH for the first DCI format, e.g., addressed to a first RNTI (e.g., RA-RNTI/MsgB-RNTI) when a corresponding search space is configured with the first DCI format and/or when the RRC/SIB parameters indicate an enhancement for the random access procedure of the first type UEs (e.g., for Msg2/MsgB PDSCH/PDCCH). As shown in FIG. 25B, the first DCI format may comprise one or more of the following information fields for scheduling of PDSCH. For example, the information fields may comprise for Msg2/MsgB PDSCH: FRDA, TDRA, VRB to PRB mapping, MCS, TB scaling, SFN, repetition, RV, NDI, frequency hopping information, DMRS information, bandwidth scaling information and/or PRB bundling information. One or more information fields of the first DCI format may enable one or more enhancements and/or special scheduling/handling of the Msg2/MsgB e.g., for the first type UEs. A size of the first DCI format may be fixed, e.g., based on a bandwidth of the initial DL BWP and/or CORESET #0 and/or a maximum supported bandwidth of the first-type UEs. In some embodiments, for example as shown in FIG. 25A and FIG. 25B, the legacy DCI format and the first DCI format may have the same length and one or more common DCI fields as well as one or more different DCI fields. Accordingly, the first DCI format having one or more different DCI fields may be applied to first-type UEs (e.g., RedCap UEs) having specific characteristics (e.g., reduced/limited supported bandwidth, reduced/limited number of antennas, relaxed processing time, categorized as NR-light, etc.).

FIG. 25C shows an example of first DCI format, according to some embodiments. As shown in FIG. 25C, an information field of the first DCI format may have different size/length under one or more conditions. A size/bit width of one or more information fields of the first DCI format may be predefined and/or configured by one or more RRC parameters. For example, a first information field (e.g., FDRA or MCS) may comprise x bits under a first condition as shown in FIG. 25B, and the first information field may comprise y bits under a second condition as shown in FIG. 25C. The one or more conditions may be based on whether the RRC/SIB message indicates one or more first configuration parameters. For example, the first condition may be that a bandwidth scaling and/or frequency hopping is configured for the first type UEs. For example, the second condition may be that a bandwidth scaling and/or frequency hopping is not configured for the first type UEs. In an example, the DCI format may comprise one or more second information fields under the one or more conditions.

In an example, a compact DCI format may be designed/used for wireless devices of the first type (e.g., DCI format 1_4 or DCI format 1_3 for scheduling of PDSCH in a cell, and/or DCI format 0_4 or DCI format 0_3 for scheduling of PUSCH in a cell). A CRC of the compact DCI format may be scrambled by different RNTIs. In an example, the CRC of the compact DCI may be scrambled by RA-RNTI and/or MsgB-RNTI. For example, the first DCI format may comprise one or more second information fields when scrambled by a second RNTI (e.g., P-RNTI, SI-RNTI, C-RNTI, CS-RNTI, MCS-C-RNTI, TC-RNTI).

A first type UE may receive an RRC message comprising configuration parameters of RACH resources for wireless devices of the first type. The RACH resources may indicate one or more resources (e.g., preamble and/or RACH occasions) dedicated to first-type UEs. The configuration parameters may comprise a first parameter. The configuration parameters may comprise one or more first parameters. The first parameter(s) may indicate that one or more enhancement specific to the random access procedure of the first-type UEs is enabled/activated/configured. The first parameter(s) may indicate a special handling of one or more channels/signals/messages of the random access procedure for the first-type UEs. For example, in response to the first parameter, the first-type UE may monitor a PDCCH for receiving a DCI based on the first DCI format, e.g., if a corresponding search space is configured with the first type DCI format. For example, in response to the first parameter, the first-type UE may monitor a PDCCH for receiving a DCI based on the second (e.g., legacy) DCI format, e.g., if a corresponding search space is not configured with the first type DCI format. For example, in response to not receiving the first parameter and/or receiving the first parameter indicating a second value, the first-type UE may monitor a PDCCH for receiving a DCI based on the second DCI format, e.g., if a corresponding search space is configured with the first type DCI format. For example, the first parameter(s) may indicate that a search space comprising the PDCCH monitoring occasion is configured with the first DCI format. For example, in response to the first parameter(s) indicating that the corresponding search space comprises/is configured with the first DCI format, the first-type UE may monitor the PDCCH for receiving a DCI based on the first DCI format; otherwise, the first-type UE may monitor the PDCCH for receiving the DCI based on the second DCI format.

In example, the first-type UE may receive a DCI scrambled by a first RNTI (RA-RNTI/MsgB-RNTI) based on the first DCI format. For example, the first-type UE may determine one or more information fields of the first DCI format based on the first parameter(s) indicated in the RRC/SIB message. For example, the first-type UE may determine a size/bit width of a first information field based on the first parameter(s). For example, the size of the first information field may be zero under a first condition (e.g., if the first parameter is/is not configured, and/or if the first parameter indicates a first value). For example, the size of the first information field may be non-zero (one or more bits) under a second condition (e.g., if the first parameter is not/is configured, and/or if the first parameter indicates a second value). The first-type UE may receive a PDSCH (e.g., Msg2/MsgB PDSCH) scheduled by the DCI based on the one or more information fields.

A first type UE may receive one or more RRC messages comprising configuration parameters of RACH resources for wireless devices of the first type. The RACH resources may indicate one or more resources (e.g., preamble and/or RACH occasions) dedicated to first-type UEs. The first-type UE may transmit a preamble to the base station. For example, the preamble may be specific/dedicated to first-type wireless devices. For example, the preamble may be shared among first-type UEs and second-type (e.g., legacy) UEs. The wireless device may transmit the preamble via a first RACH occasion (RO). The first RO may be dedicated to first-type UEs. For example, the first parameters of the RACH configuration may indicate one or more first RACH resources (e.g., time resources and/or frequency resources of one or more first ROs) dedicated to first-type UEs.

In response to the preamble transmission, the UE may monitor one or more PDCCH monitoring occasions of the search space (e.g., RA search space) for receiving one or more DCIs indicating a random access response (RAR) and/or MsgB. The UE may monitor the PDCCH monitoring occasions during a RAR/MsgB window (e.g., while the window is running). The UE may monitor the monitoring occasions for a DCI format with CRC scrambled by a first identifier, e.g., RA-RNTI/MsgB-RNTI. The UE may determine the identifier based on time resources and frequency resources of the first RO used for preamble transmission. In an example, the first-type UE and the legacy UE may monitor the PDCCH monitoring occasions for a DCI format (e.g., a same DCI format) with CRC scrambled by RA-RNTI/MsgB-RNTI associated with a corresponding RO used for preamble transmission.

Per one or more embodiments, one or more information fields of the (same) DCI format may be different for the legacy UE and the first-type UE. For example, the DCI format (with a certain size/length) may comprise one or more first information fields for the first-type UEs. For example, the DCI format (with the certain size/length) may comprise one or more second information fields for the second-type (e.g., legacy) UEs. For example, in response to receiving the DCI based on the DCI format, a first type UE may determine one or more first information fields based on one or more first sizes/lengths (e.g., predefined and/or configured/indicated by RRC). For example, in response to receiving the DCI based on the DCI format, a second type (e.g., legacy) UE may determine one or more second information fields based on one or more second sizes/lengths (e.g., predefined and/or configured/indicated by RRC). The first information fields and the second information fields may be the same. The first information fields may comprise the second information fields. A first size and a second size of the same information in the DCI format may be different for the first type UE and the second type UE.

For example, the DCI format may comprise one or more first information fields if the configuration parameters in the RRC message/SIB indicate an enhancement/specific scheduling/parameter and/or a first value for a first parameter of the random access procedure; e.g., for Msg2/MsgB scheduling of first-type UEs. For example, the DCI format may not comprise one or more first information fields if the configuration parameters in the SIB do not indicate an enhancement/specific scheduling/parameter and/or the first value for a first parameter of the random access procedure; e.g., for Msg2/MsgB scheduling of first-type UEs. For example, the DCI format (with the certain size/length) may comprise one or more second information fields if the configuration parameters in the SIB do not indicate an enhancement/specific scheduling/parameter for the random access procedure; e.g., for Msg2/MsgB scheduling of first-type UEs, and/or indicate a different value for the first parameter. For example, the first information fields may be specific to first type UEs, and/or second information fields may be common/shared among first type UEs and second type UEs.

In an example, a size/length of a first information field in the DCI format indicating a specific information under a first condition may be different from a size/length of a second information field in the DCI format indicating the same specific information under a second condition. The CRC of the DCI format may be scrambled by a same RNTI under the first condition and the second condition (e.g., RA-RNTI, MsgB-RNTI). For example, the first condition may be that the UE is a first-type UE. For example, the second condition may be that the UE is a second-type (e.g., legacy and/or non-first-type) UE. For example, a first type UE may determine a first size/bit width for a first information field of the DCI format. For example, a second type UE may determine a second size/bit width for the first information field of the DCI format. The first size may be based on the second size. The first size may be predefined. The first size may be indicate by one or more RRC parameters (e.g., in the SIB). For example, the first condition may be that the RRC (e.g., SIB) message comprises a first parameter and/or indicates a first value for the first parameter. For example, the second condition may be that the RRC (e.g., SIB) message does not comprise the first parameter and/or indicates a second value for the first parameter. The first parameter may indicate a specific (e.g., specific to first-type UEs) Msg2/MsgB PDCCH repetition. The first parameter may indicate a specific entry (e.g., specific to first-type UEs) of a MCS/TB scaling table. The first parameter may indicate a specific (e.g., specific to first-type UEs) processing time (e.g., PDSCH processing time and/or PUSCH preparation time). The first parameter may indicate a specific (e.g., specific to first-type UEs) bandwidth and/or frequency domain scaling for a Msg2/MsgB PDSCH.

FIG. 26A shows an example of DCI format for a legacy UE, according to some embodiments. The DCI format for the legacy UE may comprise the following information fields: FDRA, TDRA, VRB to PRB mapping, MCS, TB scaling, SFN, and Reserved. A size of the second DCI format may be fixed (e.g., based on a bandwidth of the initial DL BWP and/or CORESET #0).

FIG. 26B shows an example of the DCI format with additional information field(s) for a first type UE, according to some embodiments. As shown in FIG. 26B, the DCI format may indicate to the first type UE one or more of the information fields indicated to the legacy UE. For example, one or more fields may be common in the DCI format for the first type UE and the legacy UE, e.g.: FDRA, TDRA, VRB to PRB mapping, MCS, TB scaling, SFN. For example, a size/length of an information field in the DCI format for the first type UE may be the same as/equal to the size/length of the (same) information field in the DCI format for the legacy UE. For example, one or more second (e.g., additional) information fields may be indicated by the DCI format to the first type UE, e.g.: repetition, RV, NDI, etc. For example, a size of the one or more second information fields for a legacy UE may be zero. For example, a size of the Reserved field may be shorter/zero for a first type UE.

FIG. 26C shows an example of the DCI format with different sizes of information field(s) for the first type UE, according to some embodiments. For example, a size/length of an information field in the DCI format for the first type UE may be shorter/longer than the size/length of the (same) information field in the DCI format for the legacy UE. For example, the first type UE may determine a size of the MCS field based on an RRC parameter, e.g., indicating a second MCS table for first type UEs, wherein the second MCS table is different from a first table used by legacy UEs. For example, the second MCS table may be predefined for the first type UEs.

A wireless device may receive one or more radio resource control (RRC) messages comprising configuration parameters. The wireless device may be of a first type among a plurality of types of wireless devices. The one or more RRC messages may comprise configuration parameters of a random access procedure for wireless devices of the first type. The wireless device may transmit a preamble based on the configuration parameters. The wireless device may determine, in response to the wireless device being of the first type, a first downlink control information (DCI) format of a plurality of DCI formats. The first DCI format may comprise one or more information fields specific to the random access procedure of the wireless devices of the first type. The wireless device may receive, based on the first DCI format, a DCI indicating a random access response (RAR) corresponding to the preamble. The wireless device may determine the one or more information fields based on the configuration parameters. The wireless device may receive the RAR based on the one or more information fields.

The first type of wireless device may be associated with one or more reduced/limited capabilities. The one or more reduced capabilities may comprise: reduced/limited supported bandwidth; reduced/limited number of antennas; relaxed processing time; and/or relaxed processing capability. The processing capability may comprise: a maximum modulation order; a maximum number of multiple input-multiple output layers; a maximum transport block size; and/or a maximum number of hybrid automatic repeat request processes.

The configuration parameters may indicate random access channel (RACH) resources comprising RACH occasions dedicated to the wireless devices of the first type. The wireless device may transmit the preamble via a first RACH occasion. The first RACH occasion may indicate that the wireless device is of the first type. The configuration parameters may indicate random access channel (RACH) resources comprising one or more preambles dedicated to the wireless devices of the first type. The preamble may be one of the one or more preambles, indicating that the wireless device is of the first type.

The RRC message may comprise second configuration parameters of a search space configured with the first DCI format. The first DCI format may be a compact DCI format dedicated to the wireless devices of the first type. The first DCI format may be for scheduling of physical downlink shared channel (PDSCH) for the wireless devices of the first type in a cell. The wireless device of the first type may determine the first DCI format in response to the configuration parameters indicating an enhancement for the random access procedure of the wireless devices of the first type. The wireless device of the first type may determine a second DCI format for receiving the DCI in response to the configuration parameters not indicating an enhancement for the random access procedure of the wireless devices of the first type. The enhancement may comprise at least one of: coverage recovery for at least one of: a first physical downlink control channel (PDCCH) scheduling the random access response; a first physical downlink shared channel (PDSCH) comprising the random access response; a physical uplink shared channel (PUSCH) for connection request; and/or a second PDCCH scheduling a retransmission of the PUSCH; and/or relaxed processing time from the first PDSCH to the PUSCH.

The configuration parameters may indicate at least one repetition for the DCI. The configuration parameters may indicate at least one repetition for a PDSCH comprising the RAR. The configuration parameters may indicate that one or more preambles comprising the preamble are dedicated to the wireless devices of the first type. The configuration parameters may indicate that the wireless devices of the first type are allowed to access a cell associated with the random access procedure. The configuration parameters indicate a first processing time for signaling of the wireless devices of the first type. The configuration parameters may indicate a first modulation order for uplink and/or downlink of the wireless devices of the first type. The configuration parameters may indicate at least one scaling value for a transport block comprising the random access response. The configuration parameters may indicate a reduced bandwidth for at least one of: the first physical downlink control channel (PDCCH) scheduling the random access response; the first physical downlink shared channel (PDSCH) comprising the random access response; the physical uplink shared channel (PUSCH) for connection request; and/or the second PDCCH scheduling a retransmission of the PUSCH.

The one or more information fields in the DCI may indicate a frequency domain resource allocation, based on a bandwidth capability of the wireless devices of the first type. The wireless device may determine, based on the frequency domain resource allocation, frequency resources of a physical downlink channel comprising the RAR. The one or more information fields in the DCI may indicate a modulation and coding scheme, based on a modulation order/table of the wireless devices of the first type. The wireless device may decode, based on the modulation and coding scheme, a transport block of a physical downlink channel comprising the RAR. The one or more information fields in the DCI may indicate a scaling value for a transport block in a physical downlink channel comprising the RAR. The wireless device may determine, based on the scaling value, a transport block size of the physical downlink channel comprising the RAR. The one or more information fields in the DCI may indicate a repetition number for a transport block in a physical downlink channel comprising the RAR. The wireless device may receive the physical downlink channel comprising the RAR based on the repetition number. The one or more information fields in the DCI may indicate a redundancy version for a transport block in a physical downlink channel comprising the RAR. The one or more information fields in the DCI may indicate a new data indicator for the transport block. The wireless device may receive the physical downlink channel comprising the RAR based on the redundancy version and the new data indicator.

The configuration parameters may increase a coverage of one or more channels of the random access procedure for the wireless devices of the first type. A cyclic redundancy check of the first DCI format may be scrambled by a first radio network temporary identifier (RNTI). The first RNTI may be a random access RNTI (RA-RNTI) associated with a random access channel used for transmission of the preamble. The first RNTI may be a message B RNTI (MsgB-RNTI) associated with a random access channel used for transmission of the preamble. The random access procedure may be a four-step random access procedure. The random access procedure may be a two-step random access procedure. The configuration parameters may indicate a number of repetitions for the preamble transmission of the wireless devices of the first type. The configuration parameters may indicate a first duration, dedicated to the wireless devices of the first type, for the RAR window. The first duration for the RAR window of the wireless devices of the first type may be longer than a second duration of the RAR window of wireless devices of a second type other than the first type.

A wireless device of a first type among a plurality of types of wireless devices, may receive a radio resource control (RRC) message comprising configuration parameters of a random access procedure for the first type of wireless devices. The wireless device may transmit a preamble based on the configuration parameters. The wireless device may determine, in response to the wireless device being of the first type, a first DCI format of a plurality of DCI formats. The first DCI format may comprise one or more information fields determined based on the configuration parameters. The wireless device may receive, based on the first DCI format: a downlink control information (DCI) indicating a random access response corresponding to the preamble; and/or the random access response.

A wireless device of a first type among a plurality of types of wireless devices, may receive a radio resource control (RRC) message. The RRC message may comprise: first configuration parameters of a random access procedure for the first type of wireless devices; and second configuration parameters of a search space associated with a first downlink control information (DCI) format. The wireless device may transmit a preamble based on the first configuration parameters. The wireless device may receive, based on the first DCI format, a DCI comprising one or more information fields indicating a random access response corresponding to the preamble. The wireless device may determine, in response to the wireless device being of the first type, the one or more information fields of the first DCI format. The wireless device may receive the random access response based on the one or more information fields.

A wireless device associated with a first type among a plurality of types of wireless devices, may receive a radio resource control (RRC) message comprising: first configuration parameters of a first DCI format; second configuration parameters of random access resources for/associated with the first type of wireless devices; and a first parameter indicating repetition for a downlink channel of the first type wireless devices. The wireless device may transmit a preamble using the random access resources. The wireless device may receive, based on the first DCI format, a downlink control information (DCI) indicating: the downlink channel comprising a random access response for the preamble; and a repetition number for the downlink channel. The wireless device may receive the random access response based on the repetition number.

What is claimed is:

1. A method comprising:
receiving, by a wireless device having a first feature of a set of features, at least one system information block indicating random-access resources for wireless devices having the first feature, wherein:
    the random-access resources are associated with a first set of transport block scaling factors among a plurality of sets of transport block scaling factors; and
    the plurality of sets of transport block scaling factors comprises:
        the first set of transport block scaling factors; and
        a second set of transport block scaling factors associated with wireless devices having a second feature of the set of features;
receiving, in response to transmission of a preamble indicated by the random-access resources, a downlink control information (DCI) indicating reception of a transport block comprising a response to the preamble, wherein the DCI comprises a field for scaling the transport block;
determining, based on the field for scaling the transport block and the wireless device having the first feature, a transport block scaling factor from the first set of transport block scaling factors; and receiving, based on the transport block scaling factor, the transport block.

2. The method of claim 1, wherein the at least one system information block comprises parameters of a first random access configuration that indicates the random-access resources associated with the first set of transport block scaling factors.

3. The method of claim 1, wherein the at least one system information block further comprises parameters of a second random-access configuration, associated with the second set of transport block scaling factors, for wireless devices having the second feature, and wherein the first set of transport block scaling factors is selected, based on the wireless device having the first feature, from the first set of transport block scaling factors and the second set of transport block scaling factors.

4. The method of claim 3, wherein determining the transport block scaling factor comprises:
selecting, based on the wireless device having the first feature and the reception of the DCI, the first set of transport block scaling factors, from the first set of transport block scaling factors and the second set of transport block scaling factors, for transport block scaling factor determination, wherein the transport block scaling factor is determined, based on the field for scaling the transport block.

5. The method of claim 1, wherein the first feature identifies the wireless device as a reduced capability wireless device.

6. The method of claim 5, wherein the reduced capability wireless device is configured to support one or more of:
a bandwidth of the wireless device being less than a bandwidth threshold;
a quantity of antennas of the wireless device being less than an antenna quantity threshold;
a number of downlink multiple-input multiple-output (MIMO) layers of the wireless device being less than a downlink MIMO layers threshold;
a modulation order supportable by the wireless device being less than a modulation order threshold; or
a duplex operation supported by the wireless device being non-simultaneous transmission and reception in separate frequency bands.

7. The method of claim 1, wherein the field comprises a value indicating an index of the transport block scaling factor in a set of transport block scaling factors selected by the wireless device.

8. The method of claim 1, wherein receiving the transport block comprises determining, based on the transport block scaling factor, a transport block size of the transport block comprising the response.

9. A wireless device comprising:
one or more processors, and
memory storing instructions that, when executed by the one or more processors, cause the wireless device to:
    receive at least one system information block indicating random-access resources for wireless devices having a first feature of a set of features, wherein:
        the wireless device has the first feature;
        the random-access resources are associated with a first set of transport block scaling factors among a plurality of sets of transport block scaling factors; and
        the plurality of sets of transport block scaling factors comprises:

the first set of transport block scaling factors; and a second set of transport block scaling factors associated with wireless devices having a second feature of the set of features;

receive, in response to transmission of a preamble indicated by the random-access resources, a downlink control information (DCI) indicating reception of a transport block comprising a response to the preamble, wherein the DCI comprises a field for scaling the transport block;

determine, based on the field for scaling the transport block and the wireless device having the first feature, a transport block scaling factor from the first set of transport block scaling factors; and receive, based on the transport block scaling factor, the transport block.

10. The wireless device of claim 9, wherein the at least one system information block comprises parameters of a first random-access configuration that indicates the random-access resources and that is associated with the first set of transport block scaling factors.

11. The wireless device of claim 10, wherein the at least one system information block further comprises parameters of a second random-access configuration, associated with the second set of transport block scaling factors, for wireless devices having the second feature, and wherein the first set of transport block scaling factors is selected, based on the wireless device having the first feature, from the first set of transport block scaling factors and the second set of transport block scaling factors.

12. The wireless device of claim 11, wherein determining the transport block scaling factor comprises:

selecting, based on the wireless device having the first feature and the reception of the DCI, the first set of transport block scaling factors, from the first set of transport block scaling factors and the second set of transport block scaling factors, for transport block scaling factor determination, wherein the transport block scaling factor is determined, based on the field for scaling the transport block.

13. The wireless device of claim 9, wherein the first feature identifies the wireless device as a reduced capability wireless device.

14. The wireless device of claim 13, wherein the reduced capability wireless device is configured to support one or more of:

a bandwidth being less than a bandwidth threshold;

a quantity of antennas being less than an antenna quantity threshold;

a number of downlink multiple-input multiple-output (MIMO) layers being less than a downlink MIMO layers threshold;

a modulation order being less than a modulation order threshold; or a duplex operation being non-simultaneous transmission and reception in separate frequency bands.

15. The wireless device of claim 9, wherein the field comprises a value indicating an index of the transport block scaling factor in a set of transport block scaling factors selected by the wireless device.

16. The wireless device of claim 9, wherein receiving the transport block comprises determining, based on the transport block scaling factor, a transport block size of the transport block comprising the response.

17. A non-transitory computer-readable medium comprising instructions that, when executed by one or more processors of a wireless device, cause the wireless device to:

receive, at least one system information block (SIB) indicating random-access resources for wireless devices having a first feature of a set of features, wherein:

the wireless device has the first feature;

the random-access resources are associated with a first set of transport block scaling factors among a plurality of sets of transport block scaling factors; and the plurality of sets of transport block scaling factors comprises:

the first set of transport block scaling factors; and a second set of transport block scaling factors associated with wireless devices having a second feature of the set of features;

receive, in response to transmission of a preamble indicated by the random-access resources, a downlink control information (DCI) indicating reception of a transport block comprising a response to the preamble, wherein the DCI comprises a field for scaling the transport block;

determine, based on the field for scaling the transport block and the wireless device having the first feature, a transport block scaling factor from the first set of transport block scaling factors; and receive, based on the transport block scaling factor, the transport block.

18. The non-transitory computer-readable medium of claim 17, wherein the first feature identifies the wireless device as a reduced capability wireless device.

19. The non-transitory computer-readable medium of claim 17, wherein the at least one system information block further comprises parameters of a second random-access configuration, associated with the second set of transport block scaling factors, for wireless devices having the second feature, and wherein the first set of transport block scaling factors is selected, based on the wireless device having the first feature, from the first set of transport block scaling factors and the second set of transport block scaling factors.

20. The non-transitory computer-readable medium of claim 19, wherein determining the transport block scaling factor comprises:

selecting, based on the wireless device having the first feature and the reception of the DCI, the first set of transport block scaling factors, from the first set of transport block scaling factors and the second set of transport block scaling factors, for transport block scaling factor determination, wherein the transport block scaling factor is determined, based on the field for scaling the transport block.

* * * * *